United States Patent
Torres Soto et al.

(10) Patent No.: US 12,045,758 B2
(45) Date of Patent: Jul. 23, 2024

(54) INFORMED MOBILITY PLATFORM FOR A CUSTOMER SERVICE SUPERVISOR OR USER WITHIN A DISTRIBUTION FACILITY

(71) Applicant: United States Postal Service, Washington, DC (US)

(72) Inventors: Adyani Torres Soto, Washington, DC (US); Robert Charles Moran, Crofton, MD (US); Jodi Lee Webb, Batavia, IL (US); John Patrick Byrne, Bethesda, MD (US); Edward H. Ryan, Millersville, MD (US); Ilse H. Fogl, Raleigh, NC (US)

(73) Assignee: United States Postal Service, Washington, DC (US)

( * ) Notice: Subject to any disclaimer, the term of this patent is extended or adjusted under 35 U.S.C. 154(b) by 400 days.

(21) Appl. No.: 16/865,190

(22) Filed: May 1, 2020

(65) Prior Publication Data
US 2020/0349504 A1 Nov. 5, 2020

Related U.S. Application Data

(60) Provisional application No. 62/843,125, filed on May 3, 2019, provisional application No. 62/843,103, filed on May 3, 2019.

(51) Int. Cl.
*G06Q 10/08* (2024.01)
*G05B 23/02* (2006.01)
(Continued)

(52) U.S. Cl.
CPC ......... *G06Q 10/08* (2013.01); *G05B 23/0216* (2013.01); *G06F 3/0484* (2013.01);
(Continued)

(58) Field of Classification Search
CPC ............. G06Q 50/28; G06Q 10/06312; G06Q 10/06315; G06Q 10/0635; G06Q 10/0639;
(Continued)

(56) References Cited

U.S. PATENT DOCUMENTS 7,323,991 B1 1/2008 Eckert et al.
2002/0040313 A1 4/2002 Hunter et al.
(Continued)

FOREIGN PATENT DOCUMENTS

CN 111624967 9/2020

OTHER PUBLICATIONS

Shamsuzzoha, Ahm & Helo, Petri. (2011). Real-time Tracking and Tracing Systems: Potentials for the Logistics Network. Proceedings of the 2011 International Conference on Industrial Engineering and Operations Management. 22-24. (Year: 2011).*
(Continued)

*Primary Examiner* — Shannon S Campbell
*Assistant Examiner* — Manal A. Alsamiri
(74) *Attorney, Agent, or Firm* — Knobbe Martens Olson & Bear LLP

(57) ABSTRACT

Systems and methods for informed mobility platform for a customer service supervisor within a distribution facility are disclosed. One embodiment may be a supervisor mobile terminal including a transceiver circuit, a user interface and a controller. The transceiver circuit may wirelessly communicate with a server computer a plurality of sets of data relating to the customer service activities. The user interface may display at least one set of the plurality of sets of data and receive an instruction to modify the at least one set of data the plurality of sets of data. The controller may control the user interface to modify the at least one set of data based on the instruction and control the transceiver circuit to
(Continued)

wirelessly communicate the modified data with the server computer such that the at least one set of data stored in the server computer is updated with the modified data.

22 Claims, 93 Drawing Sheets

(51) Int. Cl.
| | |
|---|---|
| G06F 3/0484 | (2022.01) |
| G06Q 10/0631 | (2023.01) |
| G06Q 10/0635 | (2023.01) |
| G06Q 10/0639 | (2023.01) |
| G06Q 10/0833 | (2023.01) |
| G06Q 10/0835 | (2023.01) |
| G06Q 10/1091 | (2023.01) |
| G06Q 30/02 | (2023.01) |
| G06Q 50/26 | (2024.01) |
| G06Q 50/60 | (2024.01) |

(52) U.S. Cl.
CPC .. *G06Q 10/06312* (2013.01); *G06Q 10/06315* (2013.01); *G06Q 10/0635* (2013.01); *G06Q 10/0639* (2013.01); *G06Q 10/0833* (2013.01); *G06Q 10/0835* (2013.01); *G06Q 10/1091* (2013.01); *G06Q 30/0281* (2013.01); *G06Q 50/60* (2024.01); *G06Q 50/26* (2013.01)

(58) Field of Classification Search
CPC .......... G06Q 10/0833; G06Q 10/0835; G06Q 10/1091; G06Q 30/0281; G06Q 50/32; G06Q 50/26; G05B 23/0216; G06F 3/0484

See application file for complete search history.

(56) References Cited

U.S. PATENT DOCUMENTS

| | | | |
|---|---|---|---|
| 2006/0184403 A1* | 8/2006 | Scott | G06Q 99/00 705/338 |
| 2008/0015884 A1 | 1/2008 | Jamula | |
| 2010/0262278 A1 | 10/2010 | Winkler | |
| 2013/0184035 A1* | 7/2013 | Roberts, Sr. | G06Q 10/08 455/566 |
| 2014/0277593 A1* | 9/2014 | Nixon | G06F 3/04817 700/11 |
| 2015/0379459 A1 | 12/2015 | Russell et al. | |
| 2016/0328781 A1 | 11/2016 | Patel-Zellinger et al. | |
| 2017/0064497 A1 | 3/2017 | Thomas et al. | |
| 2018/0033244 A1 | 2/2018 | Northrup et al. | |
| 2018/0060831 A1 | 3/2018 | Swift | |
| 2018/0081374 A1* | 3/2018 | Nimchuk | G06Q 10/08355 |
| 2018/0293527 A1* | 10/2018 | Amirjalayer | G06Q 10/087 |
| 2018/0349857 A1 | 12/2018 | Dahir et al. | |
| 2019/0034851 A1 | 1/2019 | Swieter et al. | |
| 2019/0050784 A1 | 2/2019 | Millhouse et al. | |
| 2019/0066042 A1* | 2/2019 | Conlon | H04W 4/029 |
| 2019/0212157 A1* | 7/2019 | Wu | H04W 4/029 |
| 2019/0370888 A1 | 12/2019 | Walker et al. | |
| 2021/0248525 A1 | 8/2021 | Ramakrishnaraja et al. | |

OTHER PUBLICATIONS

Cattuto, Ciro, et al. "Dynamics of Person-to-Person Interactions from Distributed RFID Sensor Networks." PloS one 5. 7 (2010): e 11596. (Year: 2010).

* cited by examiner

630

630

Welcome, Abraham.

Are you still scheduled to work in the AFCS200, AFSM100, DOCS, DIOSS, LCTS, PSS zones today?

CONFIRM — 3510

Need to change your Operation?

Select your new operation(s) from the list below.

( AFCS200 x )  ( AFSM100 x )  ( DOCS x )  ( DIOSS x )  ( LCTS x )  ( PSS x )  ●

SUBMIT CHANGES — 3520

1012

1014

| Capture Volume | | Curtail | | | |
|---|---|---|---|---|---|
| 🔍 Search Routes | | | Inches \| Pieces | Routes 22305 ⌄ | |
| Routes ↑ | Letters (Manual) | Flats (Manual) | Parcels* | SPRS | |
| 05001 | | | | | › |
| 05002 | | | | | › |
| ▦ 05003 | 42 | 135 | 40 | 70 | 👆 › |
| ▦ 05004 | 110 | 93 | 21 | 50 | › |
| 05005 | 45 | 90 | 30 | 40 | › |
| ▦ 05006 | 42 | 135 | 40 | 70 | › |

Performance Engagement Carrier List

Search Routes

| Route ↑ | Carrier | Office Proj. LT | Office Agreed LT (1510) | Street Proj. RT | Street Agreed RT (1520) |
|---|---|---|---|---|---|
| 01001 | Carrier 1<br>Clocked in | 09:01 | ☑ | 13:18 | ☐ |
| 01002 | Carrier 2<br>Clocked in | 08:53 | ☐ | 15:36 | ☐ |
| 01003 | Carrier 3<br>Clocked in | 08:55 | ☐ | 16:49 | ☐ |
| 01004 | Carrier 4<br>Clocked in | 08:59 | ☐ | 16:23 | ☐ |
| 01005 | Carrier 5<br>Clocked in | 09:17 | ☑ | 16:20 | ☑ |
| 01006 | Carrier 6<br>Clocked in | 08:56 | ☐ | 16:01 | ☐ |
| 01007 | Carrier 7<br>Clocked in | 10:54 | ☐ | 16:21 | ☐ |
| 01007 | Carrier 8<br>Clocked in | 09:29 | ☐ | 16:17 | ☐ |
| 01008 | Carrier 9<br>Clocked in | 08:54 | ☑ | 15:54 | ☐ |
| 01009 | Carrier 10<br>Clocked in | 09:16 | ☐ | 16:50 | ☐ |
| 01013 | Carrier 11<br>Clocked in | 08:58 | ☑ | 15:30 | ☐ |
|  | Carrier 12 |  | — |  | — |

Performance Engagement - Carrier 1

1610

| Carrier Details | Today's Conditions | Past Performance | Notes |

Route
1

Carrier
Carrier 1

Missed Scans
3

Late Returns (days / month)
15 / 30

Unscheduled Leave
15

Other Exception
2

Notes from PM Supervisor
She missed 3 scans (Friday, Sept 07)

Action items — 1612

☑ Update Overtime Admin - Offered overtime

☑ Update Overtime Admin - Accepted

← Performance Engagement - Carrier 1

Carrier Details    Today's Conditions ⟵ 1710    Past Performance    Notes

Scheduled Begin Tour: 7:30 AM
Total Casing Time: 0:51
Ltr 13 PPM: 4
Flt 8 PPM: 41
PO 20 PPM: 6

Begin Tour: 7:34 AM
+ casing + Pattern Bse
Street Expect.: 6:49 AM
Casing Time - Street Expect: 7:39 AM
Time less than 8 hours: 0:21

Office Proj. Leave Time: 9:16 AM
Street Proj. Return Time: 3:44 PM

Pivots Planning

From                    Assigned To

1016

Pivots Planning

From — Assigned To

Routes: 0101 – Carrier 1     Assign Routes To: 0102 – Carrier 2

| Territory/ Zip code | Routes | Territory/ Zip code | Routes |
|---|---|---|---|
| 91203 | C001 | 91203 | C005 |

Projected Office Hours: 2:21   Base Street Hours: 5:58   Projected Office Hours: 1:00   Base Street Hours: 3:00

Return Time Variance: 0:19     Return Time Variance: 3:00

FIG. 20

| Route: 001 | | | Route: 002 | |
|---|---|---|---|---|
| Address | Mins | | Address | Mins |
| ☑ 120 Wilson Ave | 10 | | ☑ 120 Wilson Ave | 10 |
| ☑ 200 Wilson Ave | 20 | | ☑ 200 Wilson Ave | 20 |
| ☐ 320 Central Ave | 25 | | ☐ 123 Maryland Ave | 15 |
| ☐ 325 Central Ave | 30 | | ☐ 130 Maryland Ave | 20 |
| ☐ 600 Orange st | 10 | | ☐ 150 Maryland Ave | 10 |
| ☐ 200 Orage st | 15 | | Total | 75 |
| Total | 110 | | | |

| Total Mail Delivered | Today | 6 week Carrier Avg | | 3999 |
|---|---|---|---|---|
| | Tuesday 9/11/2018 | Tuesday's 7/31 - 9/10/18 | All days 7/31 - 9/10/18 | Monday 2/5/2018 |
| Cased Letters | 59 | 45 | 54 | 43 |
| Cased Flats | 322 | 359 | 276 | 424 |
| DPS | 950 | 718 | 880 | 1301 |
| FSS | 0 | 0 | 0 | 0 |
| Sequenced | 421 | 421 | 0 | 422 |
| % PD's delivered () | 0 | 0 | 100% | |
| Parcels | 30 | 22 | 22 | 30 |

INFORMED MOBILITY PLATFORM FOR A CUSTOMER SERVICE SUPERVISOR OR USER WITHIN A DISTRIBUTION FACILITY

RELATED APPLICATIONS

This application claims priority to and the benefit of Provisional Application Nos. 62/843,103 and 62/843,125, both filed on May 3, 2019 in the U.S. Patent and Trademark Office, the entire contents of which are incorporated herein by reference.

FIELD

The described technology generally relates to systems and methods for informed mobility platform for a customer service supervisor or a user within a distribution network facility.

DESCRIPTION OF THE RELATED TECHNOLOGY

A distribution network facility usually has multiple employees working inside and outside the facility. For example, the employees include multiple staff members and at least one supervisor. The staff members generally include a truck driver who drops off mail items at the facility, an operator who processes the mail items within the facility and a carrier who picks up the mail items inside the facility and delivers them outside the facility. The supervisor may manage and/or supervise the staff members in connection with mail processing and/or customer service activities for their mail delivery facility.

Supervisors may manage their facilities based on, for example, interaction with their employees in person or via a computer network. Supervisors typically use their desktop computers for their facility management, for example, overviewing mail delivery operations, accessing employee data and monitoring the performance of their employees.

SUMMARY

The systems and methods of this disclosure each have several innovative aspects, no single one of which is solely responsible for its desirable attributes. Without limiting the scope as expressed by the claims that follow, its more prominent features will now be discussed briefly.

One aspect is a supervisor mobile terminal for electronically managing item processing activities associated with a mail delivery facility, the supervisor mobile terminal comprising: a transceiver circuit configured to wirelessly communicate with a server computer a plurality of sets of data relating to the item processing activities; a user interface configured to display at least one set of the plurality of sets of data and receive an instruction to modify the at least one set of data; and a controller in data communication with the transceiver circuit and the user interface, and configured to: control the user interface to modify the at least one set of data based on the instruction; and control the transceiver circuit to wirelessly communicate the modified data with the server computer such that the at least one set of data stored in the server computer is updated with the modified data.

In the above supervisor mobile terminal, the controller is configured to control the transceiver circuit to wirelessly access the server computer so as to update the at least one set of data with the modified data. In the above supervisor mobile terminal, the controller is configured to control the transceiver circuit to wirelessly transmit the modified data to the server computer so as to update the at least one set of data with the modified data. In the above supervisor mobile terminal, the item processing activities relate to one or more of: workforce, workload performance, or training and safety associated with the mail deliver facility.

In the above supervisor mobile terminal, the workforce relates to one or more of: a review of clock rings of the workforce, an audit of overtime hours of the workforce, or a view of schedules of the workforce by area. In the above supervisor mobile terminal, the workload performance relates to one or more of: tracking a mail volume, monitoring equipment performance trends, or accessing data reports. In the above supervisor mobile terminal, the training and safety relates to one or more of: accessing required trainings, or digitally submitting report of injury forms.

In the above supervisor mobile terminal, the controller is configured to control the user interface to simultaneously display both a message sending tab and the at least one set of data, and control the transceiver circuit to send a message to a carrier mobile terminal of a carrier associated with one or more of the item processing activities, using the message sending tab, the above supervisor mobile terminal, the mail delivery facility is a USPS facility, and wherein the supervisor mobile terminal is configured to be operated by a supervisor working in the USPS facility.

The above supervisor mobile terminal further comprises a proximity sensor configured to sense a type of mail facility equipment, wherein the controller is configured to control the user interface to display data relevant to the sensed facility equipment. In the above supervisor mobile terminal, the controller is configured to receive information regarding a type of mail facility equipment from a proximity sensor configured to be attached to a supervisor of the mail delivery facility having the supervisor mobile terminal, and control the user interface to display data relevant to the received information.

Another aspect is a method of electronically managing, at a supervisor mobile terminal, item processing activities associated with a distribution facility, the method comprising: wirelessly communicating, via a transceiver circuit of the supervisor mobile terminal, with a server computer, a plurality of sets of data relating to the item processing activities; displaying, at a user interface of the supervisor mobile terminal, at least one set of the plurality of sets of data; receiving, at the user interface, an instruction to modify the at least one set of data; controlling the user interface to modify the at least one set of data based on the instruction; and wirelessly communicating the modified data with the server computer such that the at least one set of data stored in the server computer is updated with the modified data.

In the above method, the wirelessly communicating comprises wirelessly accessing the server computer so as to update the at least one set of data with the modified data. In the above method, the wirelessly communicating comprises wirelessly transmitting the modified data to the server computer so as to update the at least one set of data with the modified data. In the above method, the item processing activities relate to one or more of: workforce, workload performance, or training and safety associated with the mail delivery facility.

In the above method, the workforce relates to one or more of: a review of clock rings of the workforce, an audit of overtime hours of the workforce, or a view of schedules of the workforce by area. In the above method, the workload performance relates to one or more of: tracking a mail volume, monitoring equipment performance trends, or accessing data reports. In the above method, the training and safety relates to one or more of: accessing required trainings, or digitally submitting report of injury forms.

Another aspect is a server computer for electronically managing item processing activities associated with a distribution facility, the server computer comprising: a transceiver circuit configured to wirelessly communicate, with a supervisor mobile terminal, a plurality of sets of data relating to the item processing activities; a memory configured to store the plurality of sets of data; and a controller in data communication with the transceiver circuit and the memory, and configured to: control the transceiver circuit to wirelessly receive a modified version of at least one set of the plurality of sets of data from the supervisor mobile terminal; and control the memory to update the at least one set of data with the modified version of the data.

In the above server computer, the controller is further configured to selectively send the updated data to a carrier mobile terminal of a carrier associated with one or more of the item processing activities. In the above server computer, the controller is further configured to wirelessly send the updated data to the carrier mobile terminal when the updated data satisfies a predetermined criteria. In the above server computer, the controller is further configured to determine that the updated data satisfies the predetermined criteria when the updated data is relevant to i) the carrier mobile terminal or ii) responsibilities or performance of the carrier.

In the above server computer, the memory is further configured to store information relevant to the carrier terminal and responsibilities or performance of the carrier, and wherein the controller is further configured to determine that the updated data is relevant to i) the carrier mobile terminal or ii) the responsibilities or performance of the carrier based on the information stored in the memory. In the above server computer, the item processing activities relate to one or more of: workforce, workload performance, or training and safety associated with the mail delivery facility.

In the above server computer, the workforce relates to one or more of: a review of clock rings of the workforce, an audit of overtime hours of the workforce, or a view of schedules of the workforce by area. In the above server computer, the workload performance relates to one or more of: tracking a mail volume, monitoring equipment performance trends, or accessing data reports. In the above server computer, the training and safety relates to one or more of: accessing required trainings, or digitally submitting report of injury forms.

The above server computer further comprises one or more of: a data management system (DIVIS) processor configured to identify locations of carriers real-time and support carriers on their delivery routes; a delivery operation information system (DOTS) processor configured to manage delivery unit operations including daily office work and route adjustments; a GEO-delivery processor configured to create virtual geographic zones guiding delivery personnel to stay on schedule and on their routes; an overtime (OT) admin processor configured to manage overtimes of carriers; a time and attendance collection system (TACS) processor configured to maintain clock rings and employee information; and a regional intelligent mail server (RIMS) processor configured to provide local intelligent mail server (LIM) capability to delivery units.

Another aspect is a supervisor mobile terminal for electronically managing customer service activities associated with a distribution facility, the supervisor mobile terminal comprising: a transceiver circuit configured to wirelessly communicate with a server computer a plurality of sets of data relating to the customer service activities; a user interface configured to display at least one set of the plurality of sets of data and receive an instruction to modify the at least one set of data the plurality of sets of data; and a controller in data communication with the transceiver circuit and the user interface, and configured to: control the user interface to modify the at least one set of data based on the instruction; and control the transceiver circuit to wirelessly communicate the modified data with the server computer such that the at least one set of data stored in the server computer is updated with the modified data.

In the above supervisor mobile terminal, the controller is configured to control the transceiver circuit to wirelessly access the server computer so as to update the at least one set of data with the modified data. In the above supervisor mobile terminal, the controller is configured to control the transceiver circuit to wirelessly transmit the modified data to the server computer so as to update the at least one set of data with the modified data. In the above supervisor mobile terminal, the customer service activities comprise one or more of: managing office, managing street, miscellaneous activities, or navigation bar items associated with the mail delivery facility. In the above supervisor mobile terminal, the managing office comprises one or more of: reviewing checklists, capturing manual mail volume, or completing morning engagement tasks.

In the above supervisor mobile terminal, the plurality of sets of data relating to the reviewing checklists comprise one or more of: a delivery operation information system (DOIS)/GEO assignments data, a scan point management system (SPMS) scan status data, a collection system delivery routing system (CSDRS) report data, a last carrier data, an employee engagement question data, a time and attendance collection system (TACS) report/overtime (OT) admin data, an exception events data, a scanning exceptions data, a street observation data, or a regional intelligent mail server (RIMS) messaging data.

In the above supervisor mobile terminal, the managing street comprises one or more of: monitoring carriers, reviewing exception events, or reporting accidents. In the above supervisor mobile terminal, the miscellaneous activities comprise one or more of: measuring key performance indicators (KPIs), tracking unit performance, or accessing training and engagement tools. In the above supervisor mobile terminal, the navigation bar items comprise one or more of: monitoring alerts, creating and store notes, or accessing instant message or email.

In the above supervisor mobile terminal, the plurality of sets of data relating to the managing office comprise one or more of: item assignments status, item scan status, the number of incoming trucks, an estimated mail volume to be processed on a given day, a total current manual volume, carrier mail delivery routes, a mail volume to be delivered by a carrier, redistribution of carrier workload, a carrier leave time, a carrier return time, or supervisor notes. In the above supervisor mobile terminal, the managing street comprises one or more of: carrier monitoring, finding a carrier, managing exception events, reporting accidents, observing a carrier's work practices delivery services, or observing a carrier's driving practices.

In the above supervisor mobile terminal, the carrier monitoring comprises street observations relating to delivery being early, late, on time, or approaching late. In the above supervisor mobile terminal, the carrier monitoring comprises searching routes and delivery status for carriers. In the above supervisor mobile terminal, in finding the carrier, the controller is configured to control the transceiver circuit to wirelessly access the server computer so as to obtain information regarding the carrier. In the above supervisor mobile terminal, the controller is configured to control the user interface to simultaneously display both a message sending tab and the at least one set of data, and control the transceiver circuit to send a message to a carrier mobile terminal of a carrier associated with one or more of the customer service activities, using the message sending tab.

In the above supervisor mobile terminal, the mail delivery facility is a USPS facility, and wherein the supervisor mobile terminal is configured to be operated by a supervisor working in the USPS facility. The above supervisor mobile terminal further comprises a proximity sensor configured to sense a type of mail facility equipment, wherein the controller is configured to control the user interface to display data relevant to the sensed facility equipment. In the above supervisor mobile terminal, the controller is configured to receive information regarding a type of mail facility equipment from a proximity sensor configured to be attached to a supervisor of the mail delivery facility having the supervisor mobile terminal, and control the user interface to display data relevant to the received information.

Another aspect is a method of electronically managing, at a supervisor mobile terminal, customer service activities associated with a distribution facility, the method comprising: wirelessly communicating, via a transceiver circuit of the supervisor mobile terminal, with a server computer, a plurality of sets of data relating to the customer service activities; displaying, at a user interface of the supervisor mobile terminal, at least one set of the plurality of sets of data; receiving, at the user interface, an instruction to modify the at least one set of data; controlling the user interface to modify the at least one set of data based on the instruction; and wirelessly communicating the modified data with the server computer such that the at least one set of data stored in the server computer is updated with the modified data.

In the above method, the customer service activities comprise one or more of: managing office, managing street, miscellaneous activities, or navigation bar items associated with the mail delivery facility. In the above method, the managing office comprises one or more of: reviewing checklists, capturing manual mail volume, or completing morning engagement tasks. In the above method, the managing street comprises one or more of: monitoring carriers, reviewing exception events, or reporting accidents. In the above method, the miscellaneous activities comprise one or more of: measuring key performance indicators (KPIs), tracking unit performance, or accessing training and engagement tools. In the above method, the navigation bar items comprise one or more of: monitoring alerts, creating and store notes or accessing instant message or email.

Another aspect is a supervisor mobile terminal for electronically managing customer service activities associated with a distribution facility, the supervisor mobile terminal comprising: a transceiver circuit configured to wirelessly communicate with a server computer a plurality of sets of data relating to the customer service activities, wherein the customer service activities comprise at least one abnormal mail delivery event relating to a carrier working for the mail delivery facility; a user interface configured to display the plurality of sets of data; and a controller in data communication with the transceiver circuit and the user interface, and configured to: control the user interface to display at least one set of the plurality of sets of data; determine whether the at least one set of the plurality of sets of data includes or relates to the at least one abnormal mail delivery event; and in response to determining that the at least one set of the plurality of sets of data includes or relates to the at least one abnormal mail delivery event, control the transceiver circuit to wirelessly send a message to a carrier mobile terminal of the carrier so as to address the at least one abnormal mail delivery event.

In the above supervisor mobile terminal, wherein the customer service activities comprise one or more of: managing office, managing street, miscellaneous activities, or navigation bar items associated with the mail delivery facility. In the above supervisor mobile terminal, the managing office comprises one or more of: reviewing checklists, capturing manual mail volume, or completing morning engagement tasks. In the above supervisor mobile terminal, the managing street comprises one or more of: monitoring carriers, reviewing exception events, or reporting accidents. In the above supervisor mobile terminal, the miscellaneous activities comprise one or more of: measuring key performance indicators (KPIs), tracking a unit performance, or accessing training and engagement tools.

In the above supervisor mobile terminal, the navigation bar items comprise one or more of: monitoring alerts, creating and store notes, or accessing instant message or email. In the above supervisor mobile terminal, the managing street comprises one or more of: carrier monitoring, finding a carrier, managing exception events, reporting accidents, observing a carrier's work practices delivery services, or observing a carrier's driving practices. In the above supervisor mobile terminal, the carrier monitoring comprises street observations relating to delivery being early, late, on time or approaching late. In the above supervisor mobile terminal, the abnormal mail delivery event comprises one or more of: late mail delivery, a mail delivery expected to be late, a heavy traffic, a car accident near a carrier's delivery area, or a delivery route deviation.

The above supervisor mobile terminal further comprises a memory configured to store types of abnormal mail delivery events, wherein the controller is configured to determine whether the at least one set of the plurality of sets of data includes or relates to the abnormal mail delivery event based on the types of abnormal mail delivery events stored in the memory. In the above supervisor mobile terminal, the transceiver circuit is configured to receive information regarding the abnormal mail delivery event from the server computer, and wherein the controller is configured to determine whether the at least one set of the plurality of sets of data includes or relates to the abnormal mail delivery event based on the information received from the server computer.

In the above supervisor mobile terminal, the controller is configured to control the transceiver circuit to automatically send the message to the carrier mobile terminal in response to determining that the at least one set of the plurality of sets of data includes or relates to the at least one abnormal delivery event. In the above supervisor mobile terminal, the message includes one or more of: a text message, a voice message, a mail message, a sound source message or an image message.

Another aspect is a server computer for electronically managing customer service activities associated with a distribution facility, the server computer comprising: a transceiver circuit configured to wirelessly communicate, with a supervisor mobile terminal, a plurality of sets of data relating to the customer service activities; a memory configured to store the plurality of sets of data; and a controller in data communication with the transceiver circuit and the memory, and configured to: control the transceiver circuit to wirelessly receive a modified version of at least one set of the plurality of sets of data from the supervisor mobile terminal;

and control the memory to update the at least one set of data with the modified version of the data.

In the above server computer, the controller is further configured to selectively send the updated data to a carrier mobile terminal of a carrier associated with one or more of the customer service activities. In the above server computer, the controller is further configured to wirelessly send the updated data to the carrier mobile terminal when the updated data satisfies a predetermined criteria. In the above server computer, the controller is further configured to determine that the updated data satisfies the predetermined criteria when the updated data is relevant to i) the carrier mobile terminal or ii j responsibilities or performance of the carrier.

The above server computer further comprises one or more of: a data management system (DMS) processor configured to identify locations of carriers real-time and support carriers on their delivery routes; a delivery operation information system (DOIS) processor configured to manage delivery unit operations including daily office work and route adjustments; a GEO-delivery processor configured to create virtual geographic zones guiding delivery personnel to stay on schedule and on their routes; an overtime (OT) admin processor configured to manage overtimes of carriers; a time and attendance collection system (TACS) processor configured to maintain clock rings and employee information; and a regional intelligent mail server (RIMS) processor configured to provide local intelligent mail server (LIM) capability to delivery units.

BRIEF DESCRIPTION OF TIM DRAWINGS

The above-mentioned aspects, as well as other features, aspects, and advantages of the described technology will now be described in connection with various implementations or embodiments, with reference to the accompanying drawings. The illustrated implementations or embodiments, however, are merely examples and are not intended to be limiting. Throughout the drawings, similar symbols typically identify similar components, unless context dictates otherwise. Note that the relative dimensions of the following figures may not be drawn to scale.

FIG. 15 illustrates another example image data or screenshot displayed in the user interface of the supervisor terminal showing the Capture Mail Volume tile of the Manage Office tab according to some embodiments.

FIG. 16 illustrates another example image data or screenshot displayed in the user interface of the supervisor terminal showing the Capture Mail Volume tile of the Manage Office tab according to some embodiments.

FIG. 17B illustrates another example image data or screenshot displayed in the user interface of the supervisor terminal showing the Morning Engagement tile of the Manage Office tab according to some embodiments.

FIG. 18 illustrates another example image data or screenshot displayed in the user interface of the supervisor terminal showing the carrier detail section of the Morning Engagement tile of the Manage Office tab according to some embodiments.

FIG. 19 illustrates another example image data or screenshot displayed in the user interface of the supervisor terminal showing the today's conditions section of the Morning Engagement tile of the Manage Office tab according to some embodiments.

FIG. 20 and FIG. 21 illustrate an example image data or screenshot displayed in the user interface of the supervisor terminal showing the Pivot Planning section of the Morning Engagement tile of the Manage Office tab according to some embodiments.

FIG. 22 and FIG. 23 illustrate an example image data or screenshot displayed in the user interface of the supervisor terminal showing the Past Performance section of the Morning Engagement tile of the Manage Office tab according to some embodiments.

FIG. 30D illustrates an example image data or screenshot displayed in the user interface of the supervisor terminal showing the "report accident" tile of the Manage Street tab according to some embodiments.

FIG. 31 illustrates an example image data or screenshot displayed in the user interface of the supervisor terminal showing the "observation of driving practices" tile of the Manage Street tab according to some embodiments.

FIG. 53 illustrates another example image data or screenshot displayed in the user interface of the supervisor terminal showing the workforce/time clock page according to some embodiments.

FIG. 63 illustrates an example image data or screenshot displayed in the user interface of the supervisor terminal showing a home screen page according to some embodiments.

DETAILED DESCRIPTION

Figure 1:
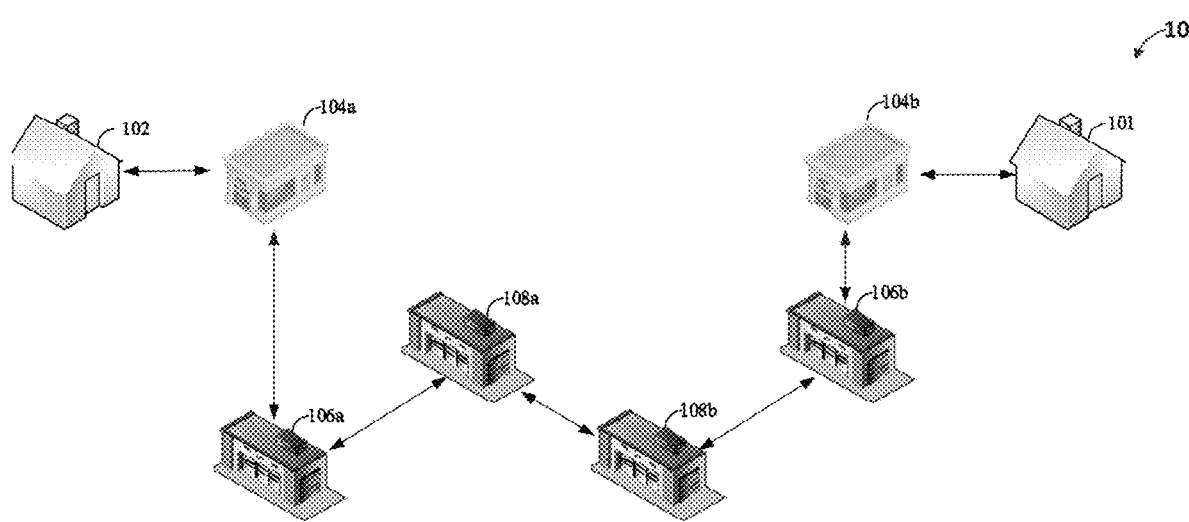
FIG. 1 illustrates a diagram of a distribution system or network used to distribute items between shippers and recipients.

Provided herein are various embodiments of systems and methods for informed mobility platform for a supervisor or a user within a distribution facility. In certain embodiments, systems for informed mobility platform disclosed herein include a supervisor mobile terminal for electronically managing mail processing (hereinafter to be interchangeably used with item processing) and/or customer service activities inside and/or outside a mail delivery facility (hereinafter to be interchangeably used with an item distribution facility or a distribution facility) so as to provide mail facility supervisors with access to support office, field, and other miscellaneous activities from a mobile device. For example, the described technology can provide mail facility supervisors with the ability to capture manual mail volume and conduct morning engagement walkthroughs with carriers from the plant floor, and also provide the ability for supervisors to monitor carriers from a mobile device while in the field. Also provided are methods for informed mobility platform for a supervisor or user within a mail delivery facility. Also provided is a server that interacts with the supervisor mobile terminal to enable the informed mobility platform.

At least some of the disclosed embodiments can provide mail processing supervisors and/or customer service supervisors (hereinafter to be interchangeably used with supervisors) with immediate insight into operational data anytime, anywhere, and also enable improved decision-making while on the plant floor or out in the field. At least some of the disclosed embodiments can also help supervisors manage their operations more effectively. At least some of the disclosed embodiments can also enable and equip frontline supervisors with the right information and right technology at the right time to make informed business decisions. At least some of the disclosed embodiments can also provide enhanced productivity through the mobile delivery of targeted, actionable operations information. At least some of the disclosed embodiments can also leverage near-real-time prescriptive operational views for decision-making. At least some of the disclosed embodiments can further allow users to interact with a limited functionality version of the platform. At least some of the disclosed embodiments can further enable supervisors to make informed business decisions from anywhere in their facility. At least some of the disclosed embodiments can further allow for improvements based on user feedback.

At least some of the disclosed embodiments can also achieve a significant improvement in delivery metrics, processing metrics, and/or delivery and processing metrics. For example, regarding the delivery metrics, the number of working hours of city carriers can decrease whereas the percentage of carriers returning on time (e.g., by 6 pm) can increase. Furthermore, regarding the processing metrics, the number of average minutes after clearance time can decrease whereas the percentage of carrier trips on time can increase. Moreover, regarding the delivery and processing metrics, the number of total overtime hours can decrease whereas the utilization/usage rate can increase and the user satisfaction can also increase.

Some embodiments may also enhance communications between carriers and supervisors, and provide supervisors with an anytime, anywhere mobile capability to view alerts and monitor carriers. Some embodiments may further improve ability to take proactive action based on insight, and improve operational performance and efficiency with mobile application technology.

In the following detailed description, reference is made to the accompanying drawings. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference in the specification to "one embodiment," "an embodiment", or "in some embodiments" means that a particular feature, structure, or characteristic described in connection with the embodiment is included in at least one embodiment of the described technology. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used herein, the term "item" or "mail item" may refer to discrete articles in the distribution network, such as mail pieces, letters, flats, magazines, periodicals, packages, parcels, goods handled by a warehouse distribution system, baggage in a terminal, such as an airport, etc., and the like. The term item can also refer to trays, containers, conveyances, crates, boxes, bags, and the like. As used herein, the term "carrier" may refer to an individual assigned to a route who delivers the items to each destination. The term may also refer to other delivery resources, such as trucks, trains, planes, automated handling and/or delivery systems, and other components of the distribution network. The described technology also relates to systems and methods to analyze items sent from or received in a geographic area to identify potential information regarding the item that may provide additional revenue streams for the distribution network. The term "distribution system" may correspond to a collection of components that form a distribution network, as operated by a distribution entity. Accordingly, the terms "distribution system," "distribution network," and "distribution entity" may be used interchangeably to refer to the same or similar components or entities.

Additionally, as used herein, the term "resident" may refer to any individual or entity that resides, works, visits, or is associated with a physical delivery point. For example, as used herein, a person at his or her office is a resident, as is a student or teacher at a school. As used herein, a resident can be an entity capable of sending items from a delivery point and receiving items at a delivery point. Additionally, the term "residence" may refer to any building having an assigned physical delivery point, such as a house, an office building, an apartment, a factory, a school, etc. As used herein, a residence can be any location capable of being a destination for items within the distribution network or it can be a return delivery point for items in the distribution network.

Overview of Item Delivery System and Item Delivery Procedure

An item distribution system or distribution network, such as the United States Postal Service (USPS), the United. Parcel Service (UPS), Federal Express (Fed-Ex), or other shipping or item delivery service, may deliver items, such as letters, flats, parcels, packages, and bulky items to a plurality of delivery points or destinations. The USPS will be used in the described technology to describe some exemplary embodiments, but the described technology is not limited thereto. When referencing generically to any of the services listed above or any item distribution service in addition to those listed above, the phrase "item distribution service," "delivery service," or "distribution system" will be used to indicate such generalities. The terms mail or mailpiece may be used to illustrate exemplary embodiments, but these terms are not intended to be limiting.

A distribution network may comprise multiple levels. For example, a distribution network may comprise regional distribution facilities, hubs, and unit delivery facilities, or any other desired level. A nationwide distribution network, for example, may comprise one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or many unit delivery facilities, and can sort and deliver items to the unit delivery facilities with which it is associated. In the case of the USPS, the unit delivery facility may be associated with a ZIP Code. The unit delivery facility receives items from local senders, and from hub level facilities or regional distribution facilities. The unit delivery facility also sorts and stages the items intended for delivery to destinations within the unit delivery facility's coverage area.

FIG. 1 illustrates a diagram of a distribution system 10 that can be used to distribute items between shippers 102 and recipients 101. The distribution system 10 may be employed by an item delivery service to distribute items received and to be delivered across a geographic area. The distribution system 10 shows various distribution points or facilities. In some embodiments, the distribution system 10 may include more or fewer distribution points or facilities than shown in distribution system 10. For example, the distribution system 10 includes unit delivery facilities 104a and 104b (e.g., post offices or drop-off locations). The distribution system 10 may also include semi-regional facilities 106a and 106b (e.g., sectional center facilities) and regional facilities 108a and 108h (e.g., network distribution centers or distribution hubs).

Each of the facilities 104a-108b may include at least one supervisor. Some facilities may include multiple levels of supervisors. For example, a head or chief supervisor (facility supervisor), one or more intermediate supervisors (e.g., item processing equipment supervisor, dock managing supervisor, etc.) and one or more front line supervisors (letter supervisor, package supervisor, etc.). These supervisors may have different responsibilities. In this disclosure, a supervisor may mean any one of the above supervisors.

The unit delivery facilities 104a and 104b may correspond to a facility that receives and delivers items destined to recipients within a given geographic area. Customer service supervisors, carriers and clerks may work in the unit delivery facilities 104a and 104b. In some embodiments, the unit delivery facilities 104a and 104b may also sort items before delivery. While customer service supervisors generally work in the unit delivery facilities 104a and 104b, mail processing supervisors and operators may also work in the unit delivery facilities 104a and 104b, for example, when the unit delivery facilities 104a and 104b have the capability to sort items before delivery. Carriers may pick up items from the unit delivery facility 104b and deliver the items to the recipients 101. In some embodiments, carriers may also pick up items from the shippers 102 and drop them off at the unit delivery facility 104a. Truck drivers may move items between the unit delivery facilities 104a and 104b, and the semi-regional facilities 106a and 106b. Truck drivers may also move items between the semi-regional facilities 106a and 106b, and the regional facilities 108a and 108b.

In the case of the USPS, the unit delivery facilities 104a and 104b may be associated with a region covered by a ZIP code m (a trademark of the USPS). In these embodiments, the unit delivery facilities 104a and 104b may receive items from the semi-regional facility 106a that serves it. These items received from the semi-regional facilities 106a and 106b may be delivered by the unit delivery facilities 104a and 104b (e.g., via a mail carrier route, etc) to the appropriate destination within its covered geographic area. Accordingly, as discussed above, the unit delivery facilities 104a and 104b may also sort and stage the items intended for delivery to destinations/recipients within the delivery unit's coverage area.

The unit delivery facilities 104a and 104b may also serve to induct items into the distribution system 10. When serving as an intake facility, items that are inducted at the unit delivery facilities 104a, 104b into the distribution system 10 may be sent to the semi-regional facilities 106a and 106b, In some embodiments, the unit delivery facilities 104a and 104b may receive items from local shippers, from semi-regional facilities 106a and 106b, or regional facilities 108a and 108b. While the delivery unit 104a is shown as the intake facility, any of the semi-regional and regional facilities 106a and 106b, and 108a and 108b, respectively, or other facilities not shown, may serve as the intake facility.

The semi-regional facilities 106a and 106b may receive and distribute items between multiple unit delivery facilities 104a and 104b and the associated regional facilities 108a and 108b. In the case of the LISPS, the semi-regional facilities 106a and 106b may each be associated with a geographic region covered by the first three numbers of a ZIP code. The semi-regional facility 106a may serve as a processing and distribution center for the respective multiple unit delivery facilities 104a and 104b within its respective geographic areas. In some embodiments, the semi-regional facility 106a, may receive items from the regional facility 108a for distribution to its respective delivery unit 104a. In some embodiments, the semi-regional facility 106a may receive items from its delivery unit 104a, for distribution to other delivery units 104b or the regional facility 108a. Mail processing supervisors may work with operators in the semi-regional facilities 106a and 106b.

The regional facilities 108a and 108b may receive and distribute items between multiple semi-regional facilities 106a and 106b and other regional facilities. In the case of the USPS, the regional facility 108a may be associated with a region covered by a state or a group of states, etc. The regional facilities 108a and 108b may serve as processing and distribution centers for the respective multiple semi-regional facilities 106a and 106b within their respective geographic areas. In some embodiments, the regional facility 108a may receive items from the semi-regional facility 106a for distribution to another semi-regional facility 106b that the regional facility 108a serves. In some embodiments, the regional facility 108a may receive items from its semi-regional facilities 106a and 106b for distribution to other regional facilities, e.g., the regional facility 108b. Mail processing supervisors may also work with operators in the regional facilities 108a and 108b.

When the item enters the distribution system 10 at the intake facility (e.g., regardless of delivery unit 104a, semi-regional facility 106a, and regional facility 108a), the item may be tracked through all sortation and distribution steps through which the item may pass. In some embodiments, such tracking may be individual to the item or be aggregate for volumes of items. The tracking may occur until the item is delivered to its destined recipient or until the item leaves a delivery unit 104b for delivery to its destined recipient.

In some embodiments, the distribution system 10, as shown, may be a national distribution network that includes multiple regional facilities 108a and 108b, multiple semi-regional facilities 106a and 106b, and multiple unit delivery facilities 104a and 104b, each having a defined coverage area, such as a geographic area and designated to receive and/or delivery items to/from recipients and senders in the geographic area.

As described herein, the distribution system 10 employed may comprise numerous pieces of mail processing equipment located in various facilities and at each level within the distribution system 10 (described and undescribed) that may scan identifiers on the items, take images of the items, interpret delivery point information from the scans or images of the items, automatically sort and route items according to the delivery point information indicated on the items, physical characteristics of the items, and/or postage characteristics. For example, these pieces of equipment identify delivery point information that is located on the items being processed and reference stored information associated with the identified delivery point information to assist in the sorting and routing of the item.

Overview of Item Sorting/Sequencing Equipment

A processing facility can use automated processing equipment to sort items. Where the distribution network is USPS, every day a processing facility receives a very high volume of items, such as letters and flats, which must be sorted and sequenced for delivery. Sorting and sequencing may be accomplished using automated sorting equipment which can scan, read, or otherwise interpret a destination end point from each item processed. The destination end point may be encoded in a computer readable code, such as a bar code printed on or affixed to the item. In some embodiments, the destination end point may be read by taking an image of the item and performing an optical character recognition (OCR) process on the image, and determining the delivery end point from the OCR'd address. In some embodiments, the automated sorting equipment can apply a computer readable code that encodes the delivery end point and may print or spray the computer readable code onto the item. In some embodiments, the processing facility uses sorting/sequencing apparatuses which can process about 30,000 items per hour. A typical USPS processing facility may also serve about 200 or more delivery routes, each with multiple delivery end points. Because of the high volume of mails and the large number of delivery routes, the processing facility uses large equipment which may have a large footprint within the processing facility.

Figure 2:
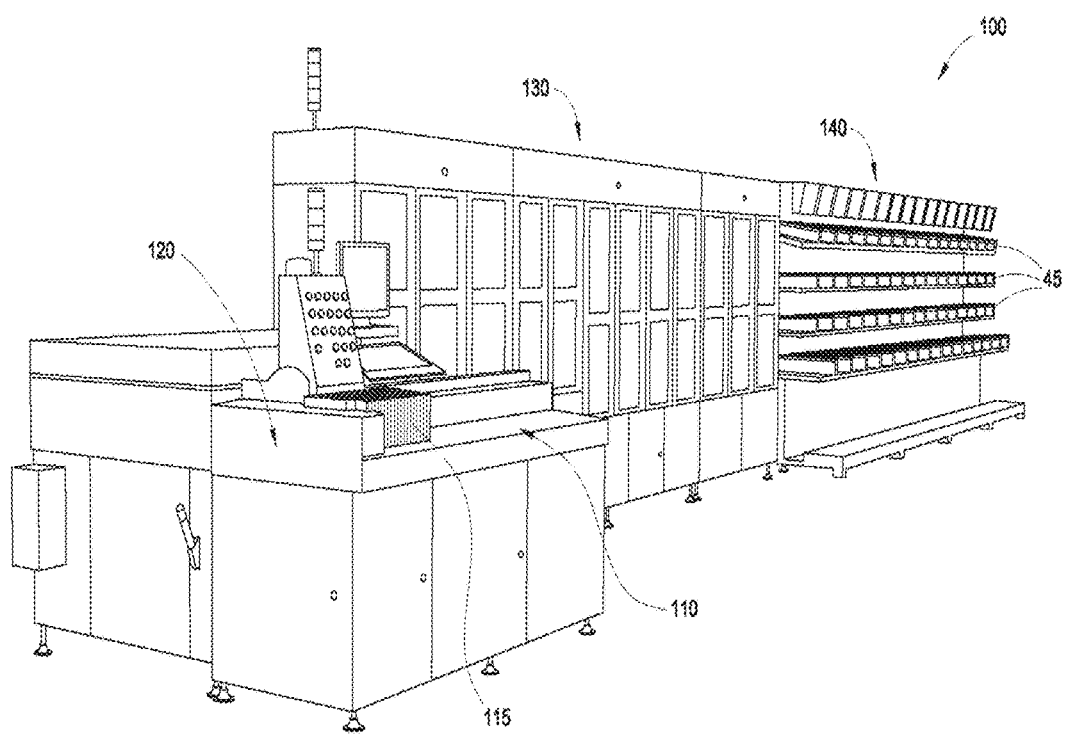
FIG. 2 illustrates an example of sorting/sequencing equipment that may be used in one or more of the facilities illustrated in FIG. 1.

FIG. 2 illustrates an example of sorting/sequencing equipment (or a sorter/sequencer) 100 that may be used in the semi-regional facilities 106a and 106b and regional facilities 108a and 108b illustrated in FIG. 1. The sorting/sequencing equipment may also be used in the unit delivery facilities 104a and 104b. Operators may work at the sorter/sequencer 100 and mail processing supervisors may supervise the operators. The sorter/sequencer 100 includes an intake system 110. The intake system 110 may be a counter, conveyor, or other receiving structure where a stack of items 115, such as letters, are brought to be fed into the sorter/sequencer 100. The intake system 110 may provide a surface or surfaces on which to place the stack of items 115 to stage the items for processing. The sorter/sequencer 100 has a scanning portion 120 that includes a scanner (not shown) which scans or reads a computer readable code or performs OCR of an image of part or all of an item 115 in order to identify various characteristics of the item(s) 115, such as class of service, addressee, and/or delivery end point. The sorter/sequencer 100 includes a processor (not shown) configured to control the operation of the sorter/sequence 100, including controlling the movement of items through the sorter/sequencer 100 via conveyor belts, pinch belts, and/or motors, controlling the scanning portion 120 to facilitate the intake, sorting, and sequencing the items 115. The processor is in communication with a memory (not shown) where information from the scanner is stored for further use. The memory can be part of the sorter/sequencer 100, or may be remote to the sorter/sequencer 100. The memory may be on a network with which the processor can communicate, and the memory may be shared by different components within a processing facility. The memory is configured to store the identity of each article processed, including information scanned, read, or interpreted from the letter, such as delivery end point, sender, class of service, postage, serial number, and the like. The memory is also configured to store the sequence of items in the item stream as they are scanned.

The sorter/sequencer 100 further includes a sorting portion 130. The sorting portion 130 may be a large storage and conveyor cabinet as shown, which has inside various components (not shown), for directing items 115 along particular pathways as the items 115 are sorted. The sorting portion 130 may be located adjacent to or otherwise near the intake system 110. In some embodiments, the items 115 may be moved or transported from the intake system 110 to the sorting portion 130 by an automated system including series of pinch belts, vacuum belts, or other conveying mechanisms. As the items are moved or transported from the intake system 110 to the sorting portion 130, the items are read or scanned, and destinations identified for each individual item 115. The processor then operates a system of motors, conveyors, and pinch belts to direct the item to the stacker portion 140.

The stacker portion 140 may be a structural system having a plurality of bins 45 arrayed, in some embodiments, in vertically disposed rows. Each bin 45 is configured to receive one or more items 115 from the sorting portion 130. Each bin 45 can be assigned to a particular delivery route or to one or more stop groups. If a particular facility services a large number of delivery routes, the number of bins 45 in the stacker portion 140 must also be large to contain the large number of bins 45, and will thus have a larger footprint. The items from each bin 45 may be put into one or more trays using an automatic sweeper (not shown), which pushes items from each bin 45 into an adjacent tray.

Overview of Item Processing and Customer Service Activities

Front-line supervisors such as mail processing supervisors and customer service supervisors in a delivery facility such as a USPS postal facility face pressing issues. For example, due to lags in data output, they do not have immediate access to real-time information that provides insight into the state of their operation. Furthermore, since the supervisors generally use stationary desktop computers for their facility supervision, they lose valuable time that can be used to manage their operation going to and from their offices to run reports. Moreover, the supervisors typically have multiple applications for data reports, so that they have to juggle multiple applications to get a clear picture of what is going on with their operations. Some embodiments of the described technology provide a mobile or tablet application designed to meet the specific needs of customer service supervisors and/or mail processing supervisors, by allowing for the supervisors to access existing data systems real-time on mobile devices such as tablets, so that the supervisors can make informed decisions from the floor without having to run reports on office desktops based on single platform housing all reports.

Figure 3A:
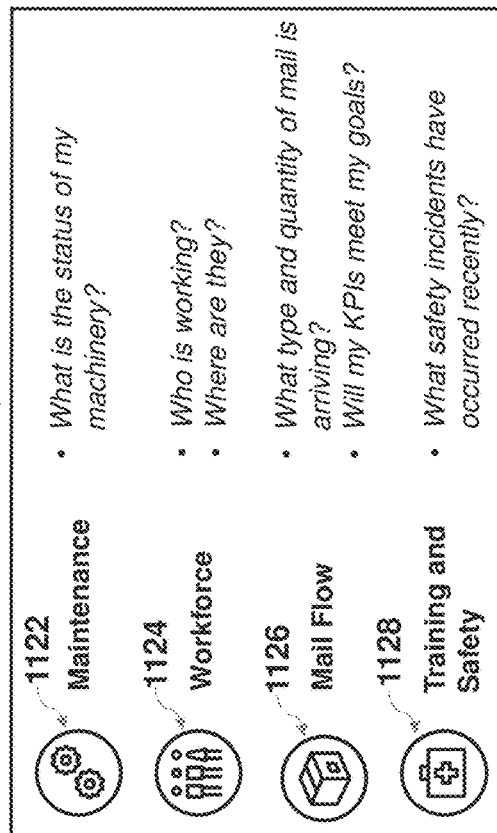
FIG. 3A illustrates a conceptual diagram showing example activities performed by customer service supervisors and mail processing supervisors according to some embodiments.
Figure 3A:
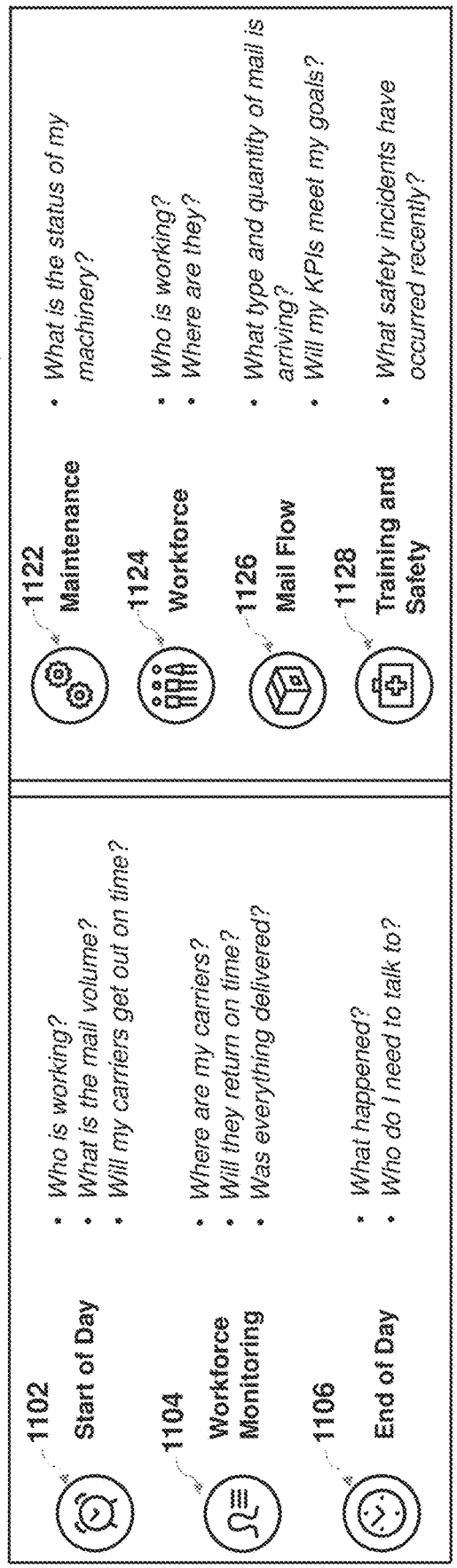

FIG. 3A illustrates a conceptual diagram showing example activities 1100 performed by customer service supervisors and mail processing supervisors according to some embodiments. The customer service supervisors may perform activities relating to customer service (hereinafter to be interchangeably used with customer service activities). The customer service activities may include, but not limited to, one or more of start of day 1102, workforce monitoring 1104 and end of day 1106. The start of day 1102 may include, but not limited to, one or more supervising activities relating to who is working (e.g., which carriers are working), what is the mail volume, or whether a customer service supervisor's carriers leaves on time. The workforce monitoring 1104 may include, but not limited to, one or more supervising activities relating to where the customer service supervisor's carriers are, whether the carriers will return on time, or whether everything was delivered. The end of day 1106 may include, but not limited to, one or more supervising activities relating to what happened, or who the supervisor needs to talk to at the end of the day.

The mail processing supervisors may perform activities relating to mail processing (hereinafter to be interchangeably used with mail processing activities). The mail processing activities may include, but not limited to, one or more of supervising activities relating to maintenance 1122, workforce 1124, mail flow 1126, and training and safety 1128. The maintenance 1122 may include, but not limited to, a supervising activity relating to what the status of a mail processing supervisor's machinery is. The workforce 1124 may include, but not limited to, one or more supervising activities relating to who is working (e.g., which operators are working) or where the operators are. The mail flow 1126 may include, but not limited to, one or more supervising activities relating to accessing data reports and tracking fleet location in near real-time. For example, the mail flow 1126 may include one or more supervising activities relating to what type and quantity of mail is arriving or whether the mail processing supervisor's key performance indicators (KPIs) meet his or her goals. The training and safety 1128 may include, but not limited to, a supervising activity relating to what safety incidents have occurred recently.

FIG. 3A shows merely an example list of customer service and mail processing activities 1100, and certain activities may be removed, other activities added, two or more activities combined or one activity can be separated into multiple activities depending on the specification and requirements. Furthermore, one or more of the customer service activities may be performed by the mail processing supervisors. Moreover, one or more of the mail processing activities may be performed by the customer service supervisors. Also, some activities may be performed by both the customer service supervisors and mail processing supervisors. This applies to FIG. 3B and FIG. 3C.

Figure 3B:
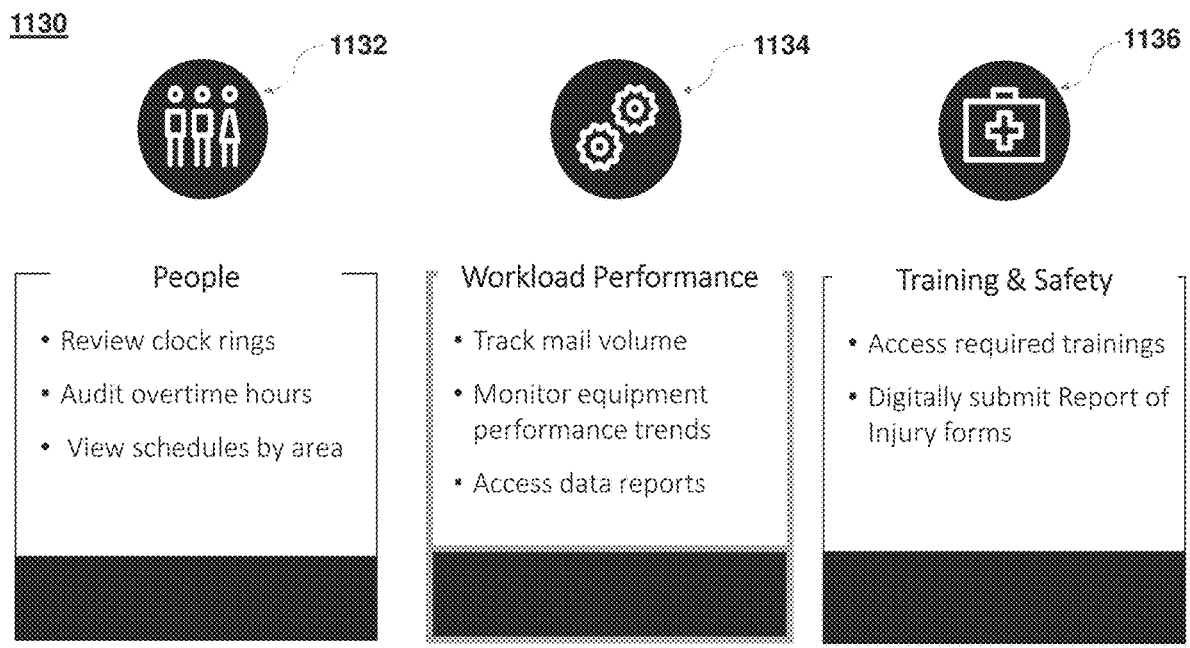
FIG. 3B illustrates a conceptual diagram showing example activities performed by mail processing supervisors according to some embodiments.

FIG. 3B illustrates a conceptual diagram showing example mail processing activities 1130 performed by mail processing supervisors according to some embodiments. The mail processing activities 1130 may include, but not limited to, one or more of supervising activities relating to people/workforce 1132, workload/facility performance 1134 or training and safety 1136. The people activity 1132 may include, but not limited to, one or more of reviewing clock rings, auditing overtime hours or viewing schedules by area (to be described in greater detail). The people activity 1132 may also include one or more of example activities relating to the workforce 1124 of FIG. 3A. The workload performance activity 1134 may include, but not limited to, one or more of tracking mail volume, monitoring equipment performance trends or accessing data reports (to be described in greater detail). The workload performance 1134 may also include one or more of example activities relating to the maintenance 1122 and the mail flow 1126 of FIG. 3A. The training and safety activity 1136 may include, but not limited to, one or more of accessing required trainings or digitally submitting report of injury forms (to be described in greater detail). The training and safety 1136 may also include one or more of example activities relating to the training and safety 1128 of FIG. 3A.

Figure 3C:
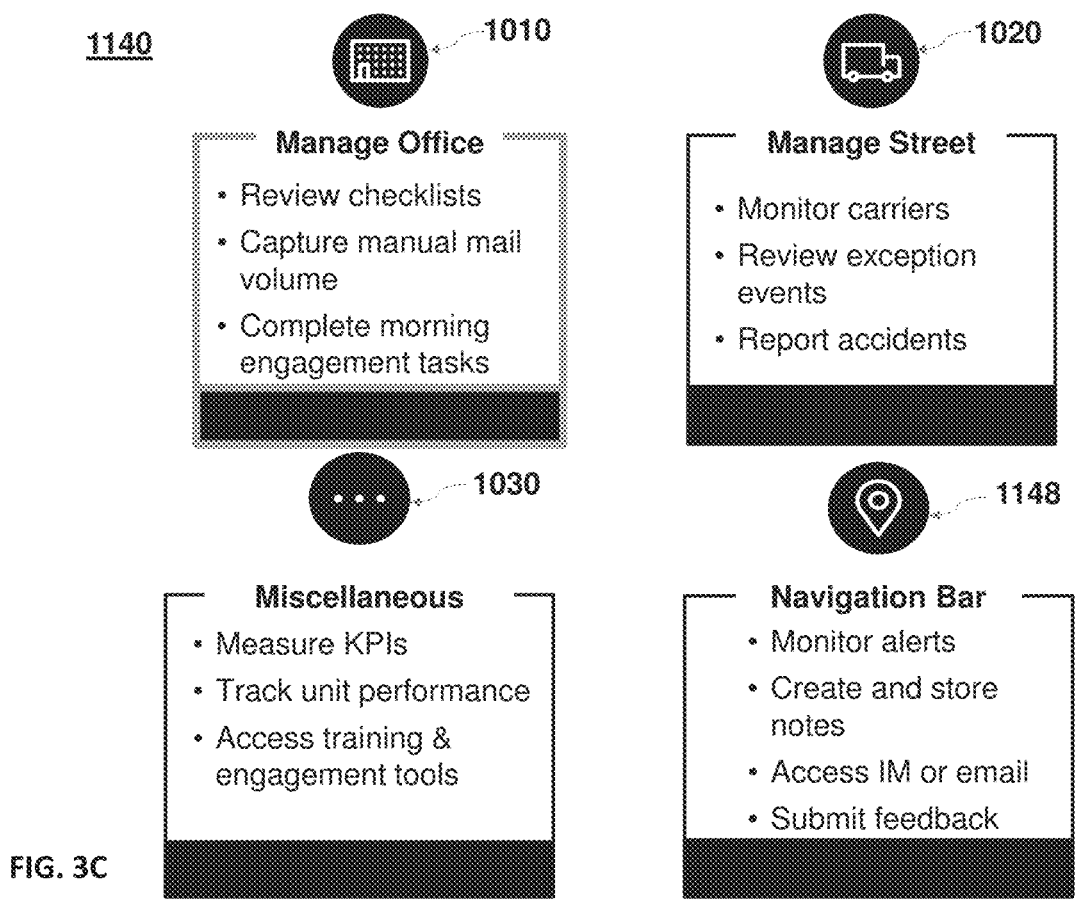
FIG. 3C illustrates a conceptual diagram showing example activities performed by customer service supervisors according to some embodiments.

FIG. 3C illustrates a conceptual diagram showing example customer service activities 1140 performed by customer service supervisors according to some embodiments. The customer service activities 1140 may include, but not limited to, one or more of supervising activities relating to manage office 1010, manage street 1020, miscellaneous 1030 and navigation bar 1148. The manage office activity 1010 may include, but not limited to, one or more of reviewing checklists, capturing manual mail volume or completing morning engagement tasks (to be described in greater detail). The manage street activity 1020 may include, but not limited to, one or more of monitoring carriers, reviewing exception events or reporting accidents. The miscellaneous activity 1030 may include, but not limited to, one or more of measuring KPIs, tracking unit performance or accessing training and engagement tools (to be described in greater detail). The navigation bar activity 1148 may include, but not limited to, one or more of monitoring alerts, creating and store notes or accessing instant message (IM) or email (to be described in greater detail).

Systems and Methods for Informed Mobility Platform

Figure 4:
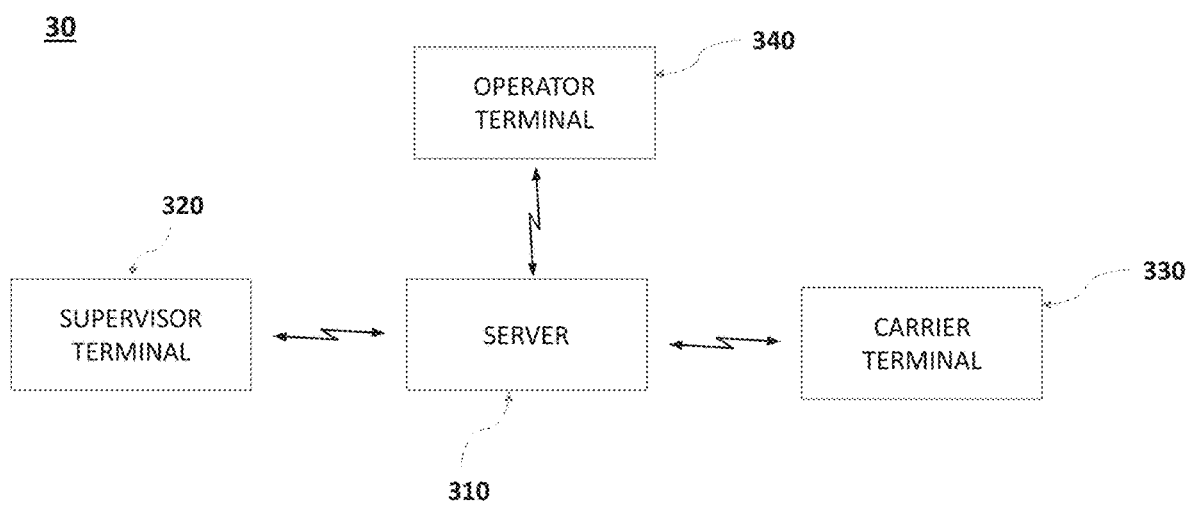
FIG. 4 is a block diagram of a system for informed mobility platform that may be used in one or more of the facilities illustrated in FIG. 1 according to some embodiments.

FIG. 4 is a block diagram of a system 30 for informed mobility platform that may be used in one or more of the facilities 104a-108b illustrated in FIG. 1 according to some embodiments. The system 30 includes a server 310, a supervisor terminal 320, a carrier terminal 330 and an operator terminal 340. The server 310 may be a stationary computer generally located within one or more of the facilities 104a-108b. However, the server 310 may be located outside the facilities 104a-108b, as long as the server 310 can wirelessly communicate data with the terminals 320-340.

The supervisor terminal 320, the carrier terminal 330 and the operator terminal 340 may belong to and be carried by a supervisor, a carrier and an operator, respectively. As discussed above, there may be different types of supervisors, for example, a mail processing supervisor who performs and/or supervises mail processing activities, a customer service supervisor who performs and/or supervises customer service activities, and other supervisors who performs and/or supervise tasks other than mail processing and customer service activities. In some embodiments, the supervisor terminal 320 may receive, store and process data relating to all of the mail processing, customer service and other activities. In other embodiments, the supervisor terminal 320 may receive, store and process data relating to only some of the mail processing, customer service and other tasks. For example, the supervisor terminal 320 may receive, store and process only the mail processing related data, or only the customer service related data or only the other tasks data. For the purpose of convenience, the described technology will focus on the supervisor terminal 320 handling the mail processing data and the customer service data (either collectively or separately).

The server 310 may include a look-up table or memory including data relating to mail processing activities and/or customer service activities, and determine certain data to be either mail processing or customer service, or both. At least one of the terminals 320-340 may also include a look-up table or memory including data relating to mail processing activities and/or customer service activities, and determine certain data to be either mail processing or customer service, or both.

The mail processing supervisor may perform and/or supervise mail processing activities. For example, operators may sort and sequence the items in mail sorting sequencing equipment that truck drivers drop off. The operators may have a mobile terminal that can scan sorted and sequenced items to input scanned data into a system of the server 310 or other computer that can be transmitted or saved to the server 310. Some operators, such as an operator running a machine, may not have a mobile computing device. However, other operators, such as those who are sorting packages by hand, may have mobile terminals. That is, whether an operator has a mobile terminal depends on the task of the operator. In this disclosure, the operator terminal 340 may be used by those operators who have a mobile computing device to perform their tasks.

The server 310, the supervisor terminal 320 and the operator terminal 340 may generally be located inside one or more of the facilities 104a-108b, while communicating data with each other, although the server 310 could be located outside the facilities as described above. The carrier terminal 330 may be located inside or outside the facility when communicating data with the server 310. For example, when a carrier has a meeting with his or her supervisor, or is being assigned daily delivery items (usually morning time, but could be afternoon time), the carrier is considered to be located within, for example, a unit facility. In this situation, the carrier terminal 330 would be located within the delivery facility. Once the carrier leaves the delivery facility for delivery, the carrier terminal 330 would be located outside the delivery facility.

The server 310 may communicate data with one or more of the supervisor terminal 320, the carrier terminal 330 and the operator terminal 340. The server 310 may wirelessly communicate data with the terminals 320-340. The wireless communication network may include, but not limited to, Bluetooth, Wi-Fi, NFC, Zigbee, a proprietary network, or other short range wireless data communication protocol. When the carrier is out for delivery, the server 310 may also wirelessly communicate data with the carrier terminal 330 via a long-range wireless communication network such as a cellular network, a long-range Wi-FI, wireless wide area network (WWAN), a GPS network, a proprietary network or other long-range wireless communication technology. The server 310 may include one or more of a delivery management system (DMS), a delivery operation information system (DOIS), a Geo-fence system, an overtime (OT) admin system, a time and attendance collection system (TACS), and a regional intelligent mail server (RIMS), all of which may be available from USPS.

The server 310 may include one or more of different types of servers, for example, a web server that provides access to websites over the Internet, a mail server that provides email services, and a file server that share files over a network. In this disclosure, wirelessly communicating data means one or more of the following scenarios: 1) the terminals 320-340 wirelessly accessing or connecting to the server 310 and downloading data from or inputting data into the website of the server 310 and 2) the server 310 wirelessly sending data to or receiving data from one or more of the terminals 320-340.

In some embodiments, at least one of the terminals 320-340 may include a proximity sensor (not shown) that can sense a type of mail facility equipment such as a sorter/sequencer or a delivery truck so that the terminals 320-340 can control their user interfaces to display data thereon relevant to the sensed facility equipment. For example, when the supervisor terminal 320 approaches a delivery truck in a unit facility, the proximity sensor may sense the delivery truck and send sensed information to a controller or processor of the supervisor terminal 320, the controller may control a user interface to display data relating to the sensed delivery truck (e.g., the number of incoming delivery trucks on a given day, leaving and arriving time of delivery trucks, etc.). In some embodiments, the supervisor terminal 320 includes a location component, such as a GPS location component. In some embodiments, the location component can be a mesh-network type location component. In some embodiments, the supervisor terminal 320 is associated with a unique serial number which can be read by a location sensing network, and/or can broadcast a unique identifier to a location network in order to identify the location of the supervisor terminal 320 within a distribution network facility. In some embodiments, the operator terminal 340 and the carrier terminal 330 can be similarly configured. The server 310 can be in communication with a facility location sensing system in order to identify the location of the supervisor terminal 320 within the facility. The facility location sensing system can be similar to that described in U.S. patent application Ser. No. 16/387,872, filed Apr. 18, 2019, and entitled, "Sensor Enabled Location Awareness System," the entire contents of which are hereby incorporated by reference.

The server 310 can identify the location of the supervisor terminal 320 within the facility, and the server can send or push to the supervisor terminal 320 location specific information for the supervisor to see, observe, and/or take action on. As an example, a supervisor who is touring the facility to which the supervisor is assigned can pass a piece of item processing equipment, or mail processing equipment (MPE). The server 310 can have a digital or virtual map of the facility, the processing equipment, and other item processing resources in the facility stored thereon, or accessible via a connection to a facility location sensing system. As the supervisor terminal 320 enters a location boundary associated with the item processing equipment, the server 310 an request and push to the supervisor terminal 320 equipment status or information for the item processing equipment near which the supervisor is located. The equipment status or information can include the equipment schedule, current operation state, historical information or operating history, current operators assigned to the equipment and their relative locations to the equipment, an error messages, efficiency metrics, goals, run schedules, batch information, item destinations, and any other desired information for that equipment.

In other embodiments, supervisors, carriers and operators generally carry or wear a proximity sensor that can sense a type of mail facility equipment and wirelessly send sensed data to their respective terminals 320-340 so that the terminals 320-340 can enable their user interfaces to display data relevant to the sensed facility equipment. In these embodiments, the proximity sensor can also sense a type of person who wears or carries another proximity sensor. For example, when a supervisor wearing a proximity sensor approaches a carrier who also wears a proximity sensor, the proximity sensor of the supervisor can recognize the mail carrier by communicating with the proximity sensor of the carrier, and send sensed data to the supervisor terminal 320 so that the terminal 320 can enable its user interface to display data relevant to the carrier (e.g., responsibilities and/or performance of the particular carrier). In some embodiments, the proximity sensor can be a beacon, tag, or other component which has a unique identifier that is broadcast and/or readable by a facility location sensing system. In this way, when a supervisor having a sensor approaches another resource, such as a carrier, operator, equipment, etc., the server 310 can determine or receive information indicating that the supervisor and other resource are in proximity to one another, and the server 310 can cause data to be communicated between the proximity sensors, between terminals, and/or can push information to a terminal. As another example, as a supervisor nears or enters an area of a facility, the supervisor terminal can receive relevant information for that area of the facility. If the supervisor enters a dock area, the supervisor terminal 320 can cause dock-related information to be displayed, such as incoming trucks, incoming volume, outgoing volume, dock schedules, operator locations and assignments, etc.

Each or at least one of the terminals 320-340 may include, but not limited to, a tablet, a laptop, a mobile phone, a smartphone, a personal digital assistant (PDA), or other portable computer that can wirelessly send and receive data. The terminals 320-340 may support a variety of operating systems including, but not limited to, Android (available from Google), iOs (Apple), Windows 10 Mobile (available from Microsoft), BlackBerry 10 (available from BlackBerry), Tizen (available from Lunux Foundation or Tizan Association), Sailfish OS (available from Sailfish Alliance), Ubuntu (available from UBports community), or any other commercially available smartphone or mobile phone operation system. At least one of the terminals 320-340 (e.g., supervisor terminal) can have one or more of the following characteristics: camera, ruggedized, battery, print capabilities, keyboard accessibility, and cellular/Wi-Fi network connectivity. In some embodiments, at least one of the terminals 320-340 may support periods of limited or no connectivity. During these periods, local data caching capabilities may enable continued usage. At least one of the terminals 320-340 can perform authentication, authorization, and secure network communication services using, for example, mobile device management (MDM) software or an enterprise mobility management (EMM) software such as MobileIron. At least one of the terminals 320-340, for example, the supervisor terminal 320, can include one or more of mobile ready applications and user centered features, including, but not limited to, Internet, MobileIron, USPS informed SCS, MITS-CPI (mobile insight tool suite—collection point insight), Auto Rotate, Wi-Fi manager, USPS Informed SDO (supervisor distribution operation), eApprover, USPS Webmail, Android System info, or PVIT (package volume information sticker). This paragraph applies to supervisor terminals 322 and 324 shown in FIG. 5.

Figure 11A:
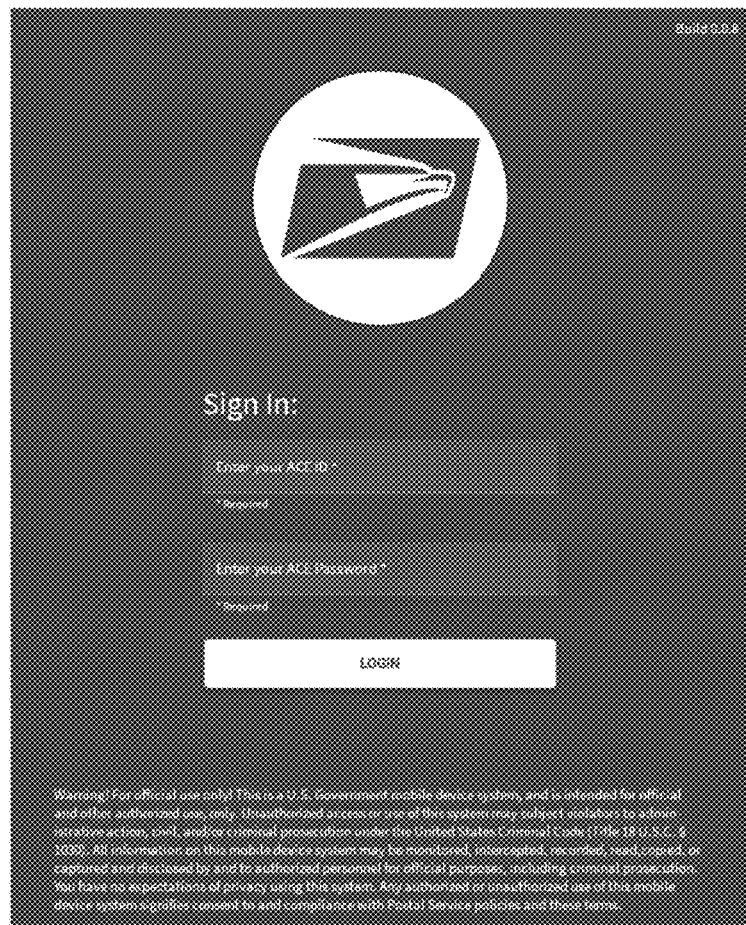
FIG. 11A illustrates an example image data or screenshot displayed in the user interface of the supervisor terminal showing a login page of the server according to some embodiments.
Figure 69:
FIG. 69 illustrates an example image data or screenshot displayed in the user interface of the supervisor terminal showing a machine screen page according to some embodiments.

In some embodiments, the server 310 can receive, store and process data relating to operators, carriers, truck drivers. For example, the data received, stored and processed by the server 310 can include, but not limited to, one or more of clock rings, overtime hours, and schedules of the staff members. In other embodiments, the server 310 can also receive, store and process data relating to maintenance of equipment of the unit delivery facility in order to, for example, track work orders and/or monitor equipment performance trends. In other embodiments, the server 310 can also receive, store and process data relating to a mail flow of the unit delivery facility in order to, for example, access data reports and/or track fleet location in near real-time. In other embodiments, the server 310 can also receive, store and process data relating to training and safety in order to, for example, access required trainings and/or digitally submit report of injury forms. In still other embodiments, the server 310 can also receive, store and process any other data relating to mail processing and customer service activities associated with a mail facility (hereinafter to be interchangeably used with any one of the facilities 104a-108h). In processing the received data, the server 310 may calculate or analyze the data to provide textual and/or graphical information to be provided to the supervisor terminal 320. Examples of the textual and/or graphical information processed by the server 310 and displayed on the supervisor terminal 320 are shown in FIGS. 11A-69 (to be described in more detail below).

A carrier can input data relating to mail processing or customer service via the carrier terminal 330. At least some of mail processing or customer service data input via the carrier terminal 330 may be processed by the server 310 to provide performance or status data relating to mail processing or customer service activities. The carrier may manually input data to the carrier terminal 330 which can be transmitted to the server 310. The carrier may also access the server 310 via a user interface thereof and enter data in the server 310 using the user interface. In some embodiments, the carrier terminal 330 may include a barcode reader or scanner that can sense barcodes attached to items, and automatically send sensed data to the server 310. The carrier terminal 330 can include a mobile delivery device (MDI)), which may be available from USPS, that allows carriers to track package delivery in real time via global positioning system (GPS). However, the carrier terminal 330 can include other mobile device discussed above that can scan items and wirelessly communicate data with the server 310 inside and outside the mail facility.

The operator may manually input data in the operator terminal 340 which can be transmitted to the server 310. At least some of mail processing or customer service related data input via the operator terminal 340 may be processed by the server 310 to provide performance or status data relating to mail processing or customer service activities. The operator may also access the server 310 via a user interface thereof and enter data in the server 310 using the user interface. In some embodiments, the operator terminal 340 may include a barcode reader or scanner that can sense barcodes attached to items, and automatically send sensed data to the server 310 to be stored in the server 310. In these embodiments, the operator can scan items while sorting them, and the scanned data can be sent to or stored in the server 310.

The supervisor terminal 320 can display data relating to mail processing and/or customer service activities received from the server 310. In some embodiments, the supervisor terminal 320 may allow the supervisor to modify some of the data displayed in the supervisor terminal 320, and the modified data may be sent from the supervisor terminal 320 to the server 310 so that updated data can be stored in the server 310, In other embodiments, the supervisor terminal 320 can receive mail processing and/or customer service data, from the server 310, that may relate to or include at least one abnormal mail delivery event (e.g., delay, accident, etc.) associated with a carrier (to be described in more detail below). In these embodiments, the supervisor terminal 320 may send a message to the carrier terminal 330 of the carrier to address the abnormal mail delivery event.

In some embodiments, the system 30 may include one or more of end-user displays (not shown) installed or positioned in one or more locations within or outside a mail facility such as 104a-108b. The end-user displays may communicate data with the server 310 and/or the supervisor terminal 320. The end-user displays may receive data from the server 310 or the supervisor terminal 320 so that at least some of the mail processing and/or customer service data shown in the supervisor terminal 320 can be displayed on the end-user displays. The end-user displays may be a television or large screen monitor mounted to a wall so that staff members working in the facility can easily see the data displayed on the monitor. A detailed structure and operation of the end-user displays is described in U.S. Provisional Application No. 62/793,660 filed on Jan. 17, 2019 which is incorporated herein by reference in its entirety.

Figure 5:
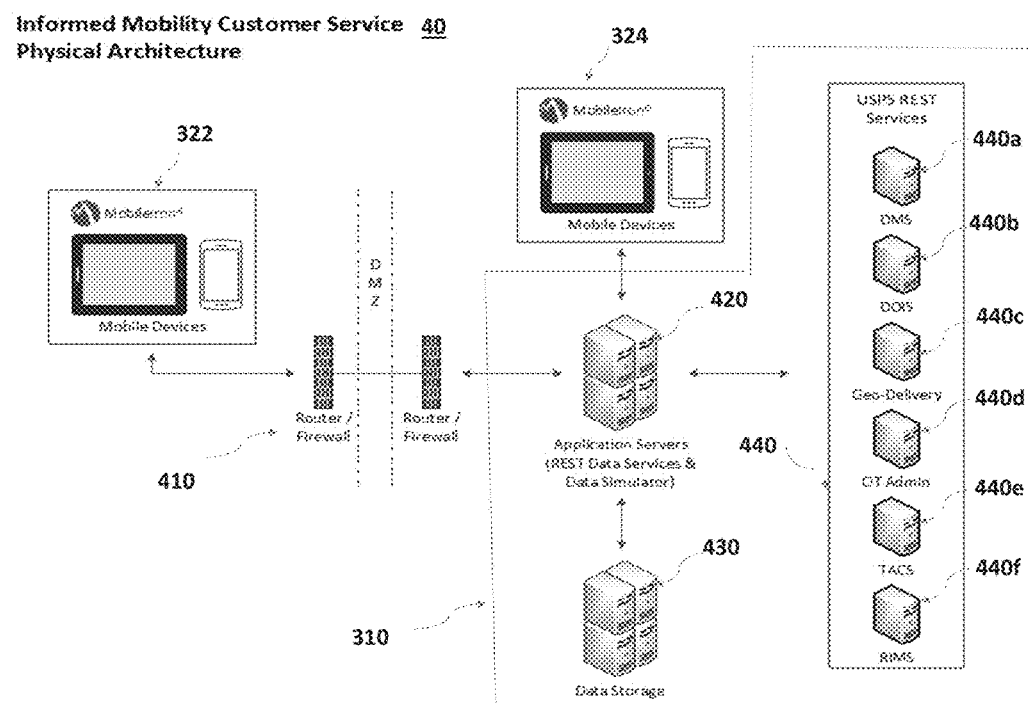
FIG. 5 is a block diagram of a system for informed mobility platform that may be used in one or more of the facilities illustrated in FIG. 1 according to other embodiments.

FIG. 5 is a block diagram of a system 40 for informed mobility platform that may be used in one or more of the facilities 104a-108b illustrated in FIG. 1 according to other embodiments. FIG. 5 is merely an example block diagram of the system 40, and certain elements may be removed, other elements added, two or more elements combined or one element can be separated into multiple elements depending on the specification and requirements. For the purpose of convenience, the carrier terminal 330 and the operator terminal 340 are not illustrated in FIG. 5.

The system 40 may include supervisor terminals 322 and 324, a firewall 410 and a server 310, The supervisor terminals 322 and 324 may process at least one of mail processing and customer service related data described above. The supervisor terminal 322 may wirelessly communicate data with the server 310 via the firewall 410, The supervisor terminal 324 may wirelessly communicate data with the server 310 without going through the firewall 410.

The server 310 may include an application server or main server 420, a data storage 430 such as a database, and an auxiliary server 440. The data storage 430 may store mail processing and customer service related data. At least some of the mail processing and customer service data may be initially provided from one or more of the carrier terminal 330, the operator terminal 340 and the auxiliary server 440. The initial mail processing and customer service data may be subsequently processed by the server 310 before being stored in the data storage 430 and before being provided to the supervisor terminals 322 and 324. The mail processing and customer service data stored in the data storage 430 may be subsequently updated by data sent from at least one of the supervisor terminals 322 and 324.

The auxiliary server 440 may store and process a specific type of data. For example, the auxiliary server 440 may include one or more of a DMS processor 440a, a DOTS processor 440b, a Geo-delivery processor 440c, an OT admin processor 440d, a TACS processor 440e, and a RIMS processor 440f, all of which may be available from USPS. Two or more of the processors 440a-440f can be combined into a single processor. At least one of the processors 440a-440f can be separated into more than one processors. At least one of the processors 440a-440f can be incorporated into the main server 420. At least one of the processors 440a-440f can support data confidentiality and integrity, and ensuring system and data availability.

The DMS processor 440a may receive the locations of carriers in real-time and can help support carriers on their delivery routes. The DOB processor 440b can improve the management of delivery unit operations, including managing daily office work and making route adjustments.

The GEO-delivery (or Geo-fence) processor 440c may use geo-fence technology in the delivery environment to increase carrier visibility to aid street management. The Geo-fence technology may leverage global positioning system signals to create virtual geographic zones ensuring that delivery personnel stay on schedule and on their routes. The OT admin processor 440d may manage overtimes of employees. The TACS processor 440e may maintain clock rings and employee information.

The RIMS processor 440f can provide local intelligent mail server (LIM) capability to all nearly all delivery units. The RIMS processor 440f can also provide users with new reports and map displays utilizing the GPS and geo-location scan data that is being collected and transmitted by the carrier terminal 330.

The application server 420 may communicate data with the data storage 430 and the auxiliary server 440 in order to process mail processing and customer service data initially received from the carrier terminal 330 and the operator terminal 340, store in the data storage 430, and send the processed data to the supervisor terminals 322 and 324. For example, the application server 420 may communicate data with the auxiliary server 440 in order to process the initially received mail processing and customer service data. Furthermore, the application server 420 may communicate data with the data storage 430 to store the processed mail processing and customer service data. Moreover, the application server 420 may retrieve mail processing and customer service data from at least one of the data storage 430 and the auxiliary server 440, and send the retrieved data to the supervisor terminals 322 and 324. The application server 420 may also receive modified data from at least one of the supervisor terminals 322 and 324 and store the modified data in the data storage 430.

Figure 6:
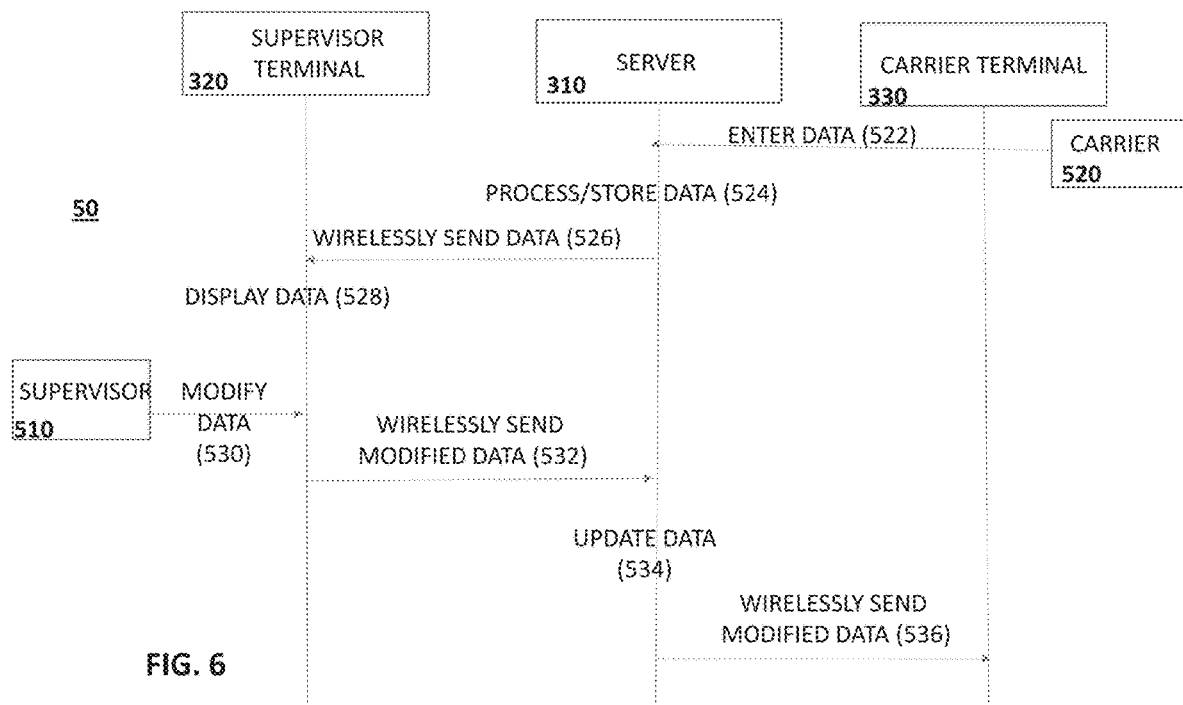
FIG. 6 is a process flow diagram of a method for informed mobility platform that may be used in one or more of the facilities illustrated in FIG. 1 according to some embodiments.

FIG. 6 is a process flow diagram 50 of a method for informed mobility platform that may be used in one or more of the facilities 104a-108b illustrated in FIG. 1 according to some embodiments. Although the process flow diagram 50 is described herein with reference to a particular order, in various embodiments, states herein may be performed in a different order, or omitted, and additional states may be added. This may apply to the processes 700 in FIG. 8A, 770 in FIG. 8B and 900 in FIG. 10. Furthermore, for the purpose of convenience, the operator terminal 340 is not illustrated in FIG. 6. However, the operator terminal 340 may provide at least some of mail processing and/or customer service data to the server 310 in a manner similar to the carrier terminal 330.

A carrier 520 enters or provides mail processing and/or customer service related data to the server 310 (522). As described above, the carrier terminal 330 can input data by key inputs or by scanning a barcode or other electronically readable code attached to an item. The carrier terminal 330 (e.g., MDD) may wirelessly communicate data with the server 310 inside and outside, for example, the unit facilities 104a and 104b.

The server 310 receives the mail processing and/or customer service data from the carrier terminal 330. In some embodiments, the server 310 may process and store the processed data in the data storage 430 (524). In other embodiments, the server 310 may store the received data in the data storage 430 (524) without processing. The server 310 may wirelessly send mail processing and/or customer service data stored in the data storage 430 to the supervisor terminal 320 (526).

The supervisor terminal 320 receives the mail processing and/or customer service data from the server 310. The supervisor terminal 320 displays at least part of the received data in its user interface (e.g., display panel) (528). Examples of the data displayed in the supervisor terminal 320 are illustrated in FIGS. 11A-69. The supervisor 510 may modify one or more items of the displayed data (to be described in greater detail below) (530). Examples of the modified data may include, but not limited to, one or more of changes or modification in one or more of the mail delivery route of the carrier 520, the starting time of the mail delivery or the amount of the mail to be delivered, item assignments status, item scan status, the number of incoming trucks, an estimated mail volume to be processed on a given day, a total current manual volume, carrier mail delivery routes, a mail volume to be delivered by a carrier, redistribution of carrier workload, a carrier leave time, a carrier return time, or supervisor notes. The supervisor terminal 320 wirelessly sends the modified data to the server 310 (532).

The server 310 receives the modified data from the supervisor terminal 320 and updates the corresponding data in the data storage 430 with the modified data (534). In some embodiments, the server 310 may determine that the corresponding data items of the mail processing and/or customer service data have been modified based on comparison of the data items that were initially sent to the supervisor terminal 320 and the corresponding modified data items that were received from the supervisor terminal 320. In doing so, the server 310 may perform the comparison based on comparing, for example, meta data or other header information of the data being transmitted to and received from the supervisor terminal 320. In other embodiments, the supervisor terminal 320 may notify the server 310 that the data items being sent to the server 310 have been modified by the supervisor terminal 320.

When it is determined that the modified data is relevant to responsibilities or performance of the carrier 520 or the carrier terminal 330, the server 310 may wirelessly send the modified data to the carrier terminal 330 (536). The server 310 may determine, based on previously stored information, whether the modified data is relevant to the responsibilities or performance of the carrier 520 or the carrier terminal 330.

Supervisor Mobile Terminal

Figure 7:
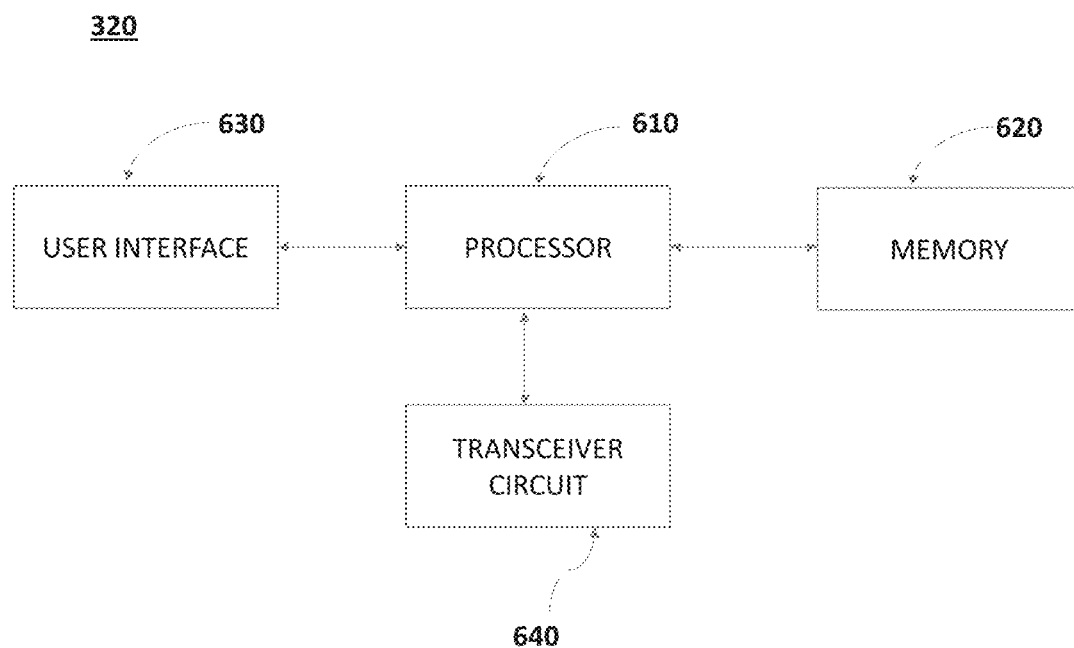
FIG. 7 is a block diagram of the supervisor terminal illustrated in FIG. 4 according to some embodiments.

FIG. 7 is a block diagram of the supervisor terminal 320 illustrated in FIG. 4 according to some embodiments. FIG. 7 is merely an example block diagram of the supervisor terminal 320, and certain elements may be removed, other elements added, two or more elements combined or one element can be separated into multiple elements depending on the specification and requirements. The supervisor terminal 320 includes a processor (or controller) 610, a memory 620, a user interface 630 and a transceiver circuit 640. In some embodiments, at least one of the processor 610, the memory 620, the user interface 630 and the transceiver circuit 640 can be implemented with corresponding elements (e.g., processor, memory, user interface or transceiver circuit) used in Android based smartphones or tablets, or iPhone or iPad. In other embodiments, at least one of the processor 610, the memory 620, the user interface 630 and the transceiver circuit 640 can be implemented with corresponding elements used in other portable mobile terminals. The processor 610 may communicate data and signals with and control the operations of the memory 620, the user interface 630 and the transceiver circuit 640.

The transceiver circuit 640 may wirelessly communicate data, under the control of the processor 610, relating to mail processing and/or customer service data between the supervisor terminal 320 and the server 310. For example, the transceiver circuit 640 may receive mail processing and/or customer service data from the server 310 and provide the received data to the processor 610. Furthermore, the transceiver circuit 640 may send modified data relating to mail processing and/or customer service data to the server 310 under the control of the processor 610. Although the transceiver circuit 640 may include functionality of both of a receiver and a transmitter in one unit, a separate receiver circuit and a separate transmitter circuit (both not shown) can also be used instead of the single transceiver circuit 640. In these embodiments, the receiver circuit may receive mail processing and/or customer service data from the server 310 and provide the received data to the processor 610. Furthermore, the transmitter circuit may send modified data relating to mail processing and/or customer service data to the server 310 under the control of the processor 610.

The memory 620 may communicate data with the processor 610. The memory 620 may store mail processing and/or customer service data received from the carrier terminal 330 and the operator terminal 340. The memory 620 may also store one or more modified data items that have been updated or changed via the user interface 630. The memory 620 may also store instructions to be performed by the processor 610 (e.g., processes 700 and 770 respectively shown in FIG. 8A and FIG. 8B).

The user interface 630 may display at least some of the mail processing and/or customer service data received via the transceiver circuit 640 under the control of the processor 610. The user interface 630 may also display at least some of the mail processing and/or customer service data stored in the memory 620 under the control of the processor 610. The user interface 630 may also receive an instruction to modify at least some of the data displayed thereon or a change in at least some of the displayed data. The user interface 630 may also display mail processing and/or customer service data that includes or relates to at least one abnormal mail delivery event described above.

The processor 610 may control the user interface 630 to modify at least some of the displayed data and control the transceiver circuit 640 to wirelessly transmit the modified data to the server 310 such that the server 310 updates the modified data therein. The server 310 may selectively send the updated data to the carrier terminal 330 depending on the relevance to the carrier terminal 330 or responsibilities or performance of the carrier 520 as described above.

Figure 8A:
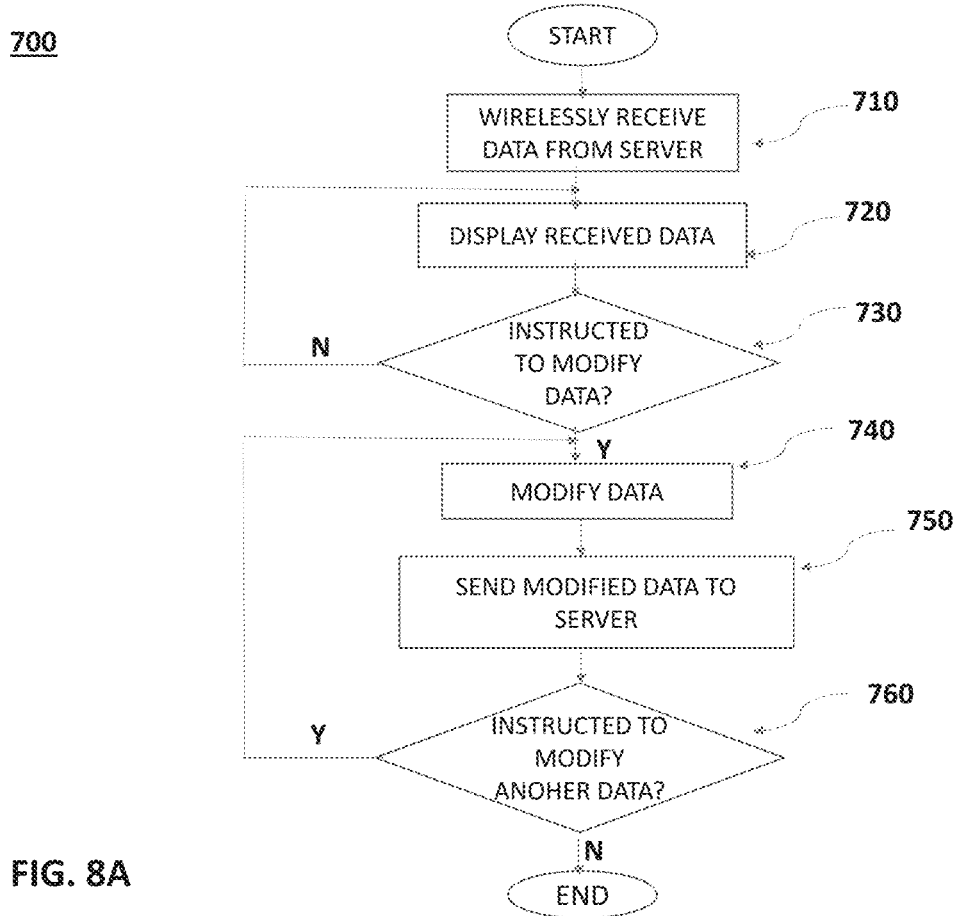
FIG. 8A is a flowchart of a method to be performed in the supervisor terminal illustrated in FIG. 4 according to some embodiments.

FIG. 8A is a flowchart of a method or process 700 to be performed in the supervisor terminal 320 illustrated in FIG. 7 according to some embodiments. The process 700 can be performed by the processor 610 of the supervisor terminal 320. The process 700 can be programmed with any type of programming languages including, but not limited to, Java (or JavaScript), React, Native, React Native, C++, Kotlin, Python, HTML5+CSS+JavaScript, or other mobile application languages. The process 700 can be stored in the memory 620 of the supervisor terminal 320. This applies to the process 770 shown in FIG. 8B.

In state 710, the supervisor terminal 320 may wirelessly receive, for example, via the transceiver circuit 640, mail processing and/or customer service related data from the server 310. As described above, the supervisor terminal 320 may wirelessly access or connect to the server 310 and download the mail processing and/or customer service data from the server 310. Since the supervisor terminal 320 wirelessly communicates data with the server 310, the supervisor 510 can receive processing and/or customer service data anywhere in the facility. In state 720, the supervisor terminal 320 displays the received mail processing and/or customer service data, for example, via the user interface 630. In state 730, it is determined whether the supervisor terminal 320 has been instructed to modify one or more items of the displayed data. In performing state 730, the processor 610 may determine whether a change to one or more items of the displayed data has been made. If so, the processor 610 may determine that the supervisor terminal 320 has been instructed to modify the one or more items of the displayed data. For example, when the supervisor 510 changes or starts to change one or more items of the displayed data via the user interface 630, the processor 610 may determine that the supervisor terminal 320 has been instructed to modify the one or more items of the displayed data. In state 730, if it is determined that the supervisor terminal 320 has not been instructed to modify one or more items of the displayed data, the states 720 and 730 may repeat.

In state 740, the supervisor terminal 320 modifies the one or more data items based on the instruction received via, for example, the user interface 630. In state 750, the supervisor terminal 320 wirelessly sends the modified data items to the server 310. In performing state 750, the processor 610 may control the transceiver circuit 640 to wirelessly transmit the modified data items to the server 310.

In state 760, it is determined whether the supervisor terminal 320 has been instructed to modify another item of the displayed data. In performing state 760, the processor 610 may determine whether a change to another item of the displayed data has been made. If so, the processor 610 may determine that the supervisor terminal 320 has been instructed to modify the other item of the displayed data. In state 760, if it is determined that the supervisor terminal 320 has been instructed to modify the other item of the displayed data, the states 740-760 repeat. In state 760, if it is determined that the supervisor terminal 320 has not been instructed to modify another data item, the process 700 may end. Again, since the supervisor terminal 320 is portable, the supervisor 510 can access and change one or more items of the displayed data anywhere in the facility and/or while moving or having conversation with staff members.

Figure 8B:
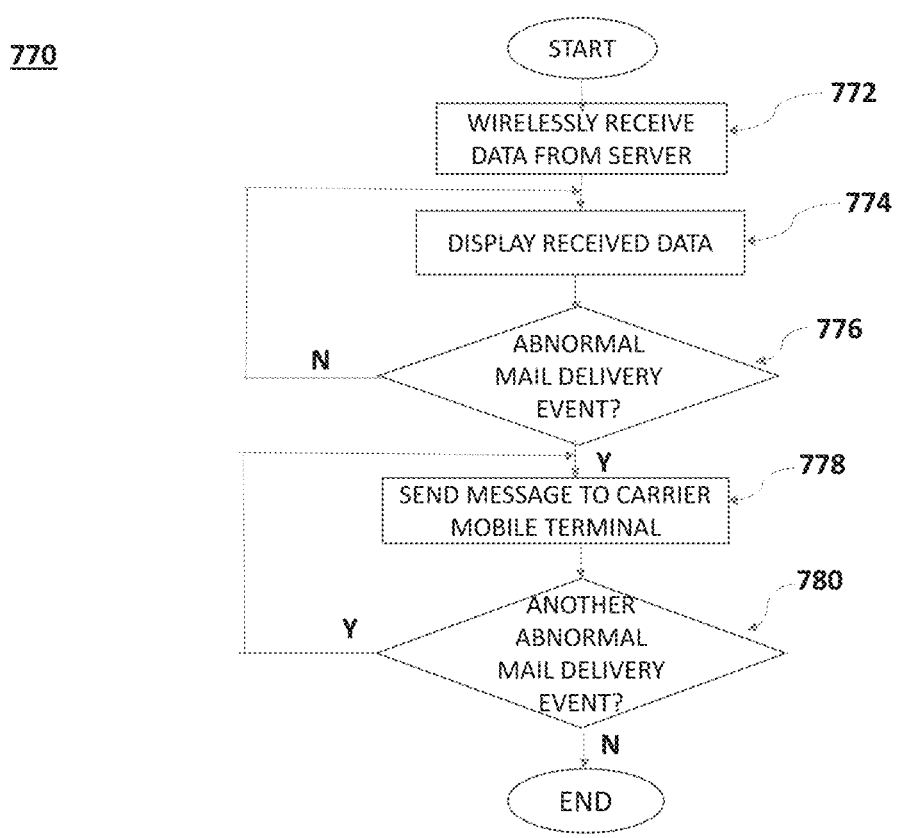
FIG. 8B is another flowchart of a method to be performed in the supervisor terminal illustrated in FIG. 4 according to some embodiments.

FIG. 8B is another flowchart of a method or process 770 to be performed in the supervisor terminal 320 illustrated in FIG. 7 according to some embodiments. The process 770 can be performed by the processor 610 of the supervisor terminal 320.

In state 772, the supervisor terminal 320 may wirelessly receive, for example, via the transceiver circuit 640, mail processing and/or customer service data from the server 310. The mail processing and/or customer service data may include data relating to at least one abnormal mail delivery event. The abnormal mail delivery event may include, but not limited to, one or more of late mail delivery, mail delivery expected to be late, heavy traffic, car accident near a carrier's delivery area, delivery route deviation or any other abnormal event determined by or stored in the server 310 or the supervisor terminal 320. In some embodiments, the supervisor terminal 320 may store in the memory 620 different types of abnormal mail delivery events, and determine whether the displayed data or received data include or relate to any of the types of abnormal mail delivery events stored in the memory 620. In other embodiments, the server 310 may indicate that certain data being sent to the supervisor terminal 310 may include or relate to an abnormal mail delivery event associated with a carrier, and the supervisor terminal 310 may determine based on the indication by the server 310 that an abnormal mail delivery event has occurred to the carrier.

In state 774, the supervisor terminal 320 displays the received mail processing and/or customer service data, for example, via the user interface 630. In state 776, it is determined whether the received data includes or relates to an abnormal mail delivery event. When it is determined in state 776 that the received data includes or relates to an abnormal mail delivery event, the supervisor terminal 310 may send a message to the carrier terminal 330 of the carrier 520 (state 778). In some embodiments, the supervisor terminal 310 may automatically send the message to the carrier terminal 330 of the carrier 520 upon determination that the received data includes or relates to an abnormal mail delivery event. In other embodiments, the supervisor terminal 310 may provide an option to send the message to the carrier terminal 330 of the carrier 520 upon determination that the received data includes or relates to an abnormal mail delivery event. In these embodiments, the supervisor terminal 310 may allow the supervisor 510 to selectively send the message to the carrier terminal 330 of the carrier 520. The message may include one or more of a text message, a voice message, a mail message, a sound source message or an image message. When it is determined in state 776 that the received data does not relate to nor does include an abnormal mail delivery event, the states 774 and 776 may repeat. Although not shown in FIG. 7B, when it is determined in state 776 that the received data does not include or does not relate to an abnormal mail delivery event, the process 770 may end.

In state 780, it is determined whether the received data includes or relates to anotherabnormal mail delivery event. When it is determined in state 780 that the received data includes or relates to an abnormal mail delivery event, the states 778 and 780 may repeat. When it is determined in state 780 that the received data does not relate to nor does include an abnormal mail delivery event, the process 770 may end. Although not shown in FIG. 8B, when it is determined in state 780 that the received data does not include or does not relate to the other abnormal mail delivery event, the state 780 may repeat.

Server Computer

Figure 9:
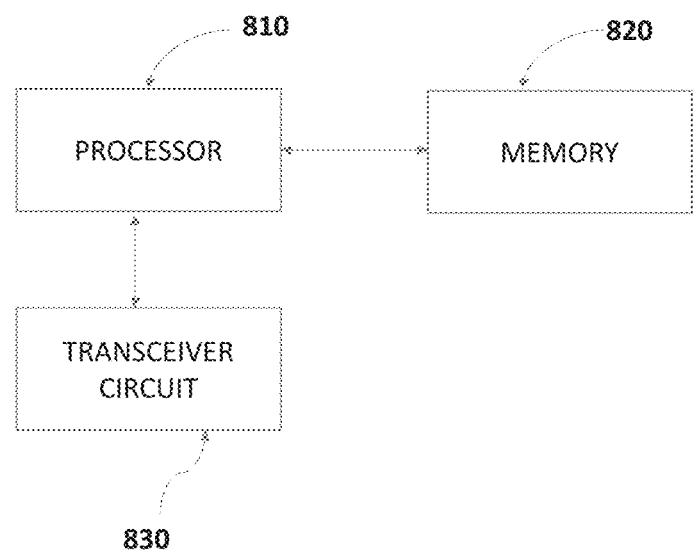
FIG. 9 is a block diagram of the server illustrated in FIG. 4 according to some embodiments.

FIG. 9 is a block diagram of the server 310 illustrated in FIG. 4 according to some embodiments. FIG. 9 is merely an example block diagram of the server 310, and certain elements may be removed, other elements added, two or more elements combined or one element can be separated into multiple elements depending on the specification and requirements. In some embodiments, the server 310 may include the application server 420. In other embodiments, the server 310 may include the application server 420 and the data storage 430. In other embodiments, the server 310 may include the application server 420 and at least one of the data storage 430 and the auxiliary server 440. In other embodiments, the server 310 may include the application server 420 and at least one of the processors 440a-440f of the auxiliary server 440.

The server 310 includes a processor (or controller) 810, a memory 820 and a transceiver circuit 830. The processor 810 may communicate data and/or signals with and controls the operations of the memory 820 and the transceiver circuit 830.

The transceiver circuit 830 may receive mail processing and/or customer service data from the carrier terminal 330. As described above, the carrier terminal 330 may wirelessly access or connect to the server 310 and enter, for example by key inputs, audio inputs or scanning, data relating to mail processing and/or customer service. The transceiver circuit 830 may receive mail processing and/or customer service data, when the carrier 520 enters the relevant data from the carrier terminal 330. The transceiver circuit 830 may wirelessly send mail processing and/or customer service data to the supervisor terminal 320. The transceiver circuit 830 may receive one or more data items of mail processing and/or customer service data that have been modified at the supervisor terminal 320 from the transceiver circuit 640 of the supervisor terminal 320. The transceiver circuit 830 may wirelessly transmit, under the control of the processor 810, one or more modified data items to the carrier terminal 330 when it is determined that the one or more modified data items are relevant to the carrier terminal 330 or responsibilities/performance of the carrier 520. The transceiver circuit 830 may wirelessly send mail processing and/or customer service data may include data relating to at least one abnormal mail delivery event to the supervisor terminal 320.

The memory 820 communicates data with the processor 810. The memory 820 stores mail processing and/or customer service data received from the carrier terminal 330. The memory 820 may also store mail processing and/or customer service data processed by the processor 810. The memory 820 may further store one or more modified data items received from the transceiver circuit 640 of the supervisor terminal 320. The memory 820 may also store instructions (e.g., the process 900 shown in FIG. 10) to be performed by the processor 810.

The processor 810 controls the operation of the transceiver circuit 830 for wirelessly sending to and receiving from, data, the supervisor terminal 320 and the carrier terminal 330. The processor 810 also controls the operation of the memory 820 for storing mail processing and/or customer service data received from the carrier terminal 330, processed by the processor 810, and modified data items received from the supervisor terminal 320. The processor 810 may determine whether the modified data items are relevant to responsibilities/performance of the carrier 520 or the carrier terminal 330. When it is determined that the modified data items are relevant to responsibilities/performance of the carrier 520 or the carrier terminal 330, the processor 810 may wirelessly send the modified data to the carrier terminal 330 via the transceiver circuit 830 so that the carrier 520 is notified about the modified data relating to his or her responsibilities/performance. The processor 810 may control the transceiver circuit 830 to wirelessly send mail processing and/or customer service data may include data relating to at least one abnormal mail delivery event to the supervisor terminal 320.

Figure 10:
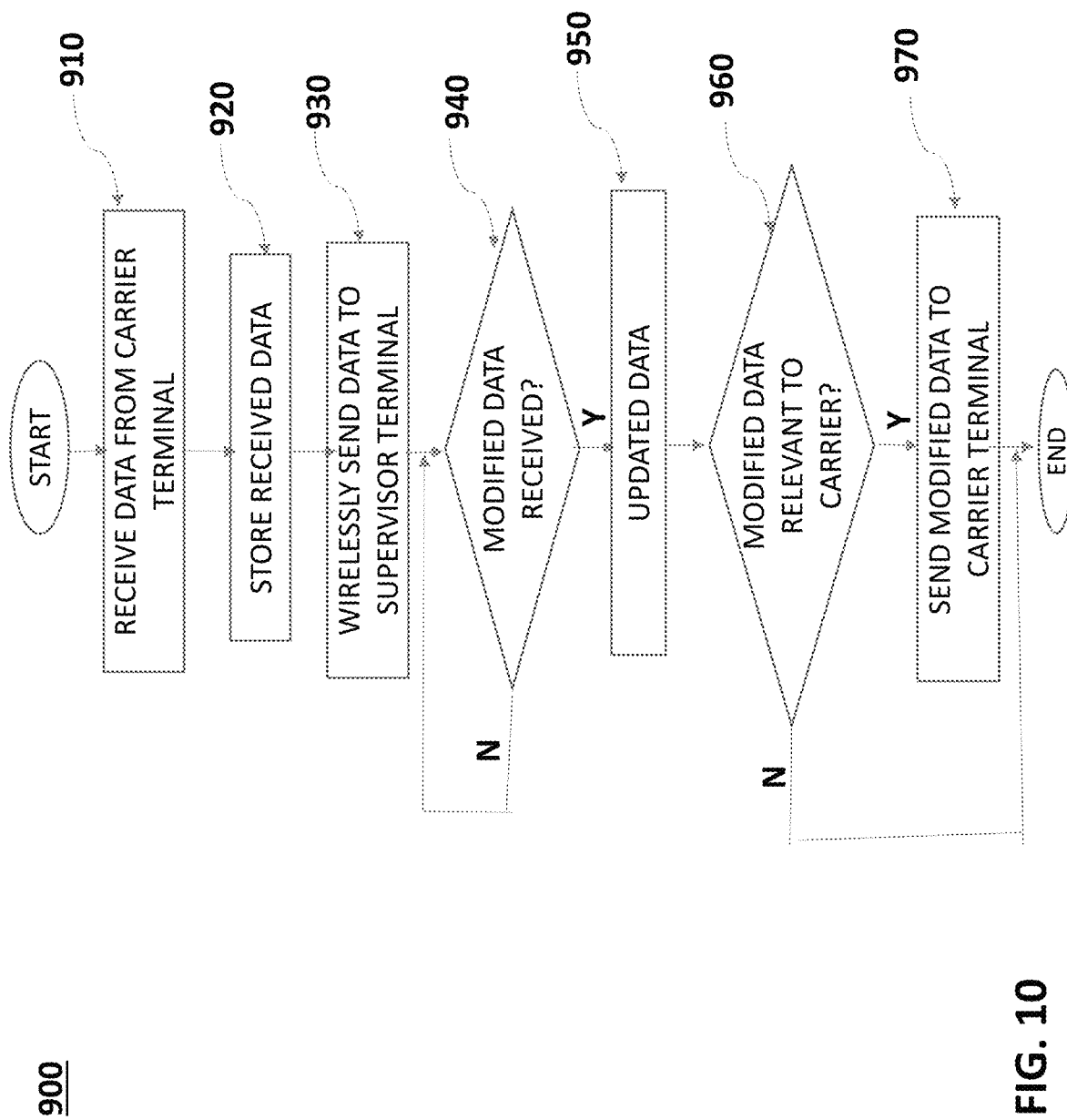
FIG. 10 is a flowchart of a method to be performed in the server illustrated in FIG. 4 according to some embodiments.

FIG. 10 is a flowchart of a method or process 900 to be performed in the server 310 illustrated in FIG. 9 according to some embodiments. The process 900 can be performed by the processor 810 of the server 310.

In state 910, the server 310 wirelessly receives, for example, via the transceiver circuit 830, mail processing and/or customer service related data from the carrier terminal 330. In state 920, the server 920 stores the received mail processing and/or customer service data, for example, on the memory 820. As described above, the server 920 may process the received mail processing and/or customer service data and store the processed data on the memory 820. In state 930, the server 310 wirelessly sends, for example, via the transceiver circuit 830, the received or processed mail processing and/or customer service data to the supervisor terminal 320. The data wirelessly sent to the supervisor terminal 320 may include the data received from the carrier terminal 330, the data previously stored in the memory 820 and/or the data previously processed and stored in the memory 820. The server 310 may also wirelessly send mail processing and/or customer service data may include data relating to at least one abnormal mail delivery event to the supervisor terminal 320 as described above.

In state 940, it is determined whether one or more modified data items of the mail processing and/or customer service data have been received from the supervisor terminal 320 via, for example, the transceiver circuit 830, In some embodiments, as shown in FIG. 10, if it is determined that one or more modified data items of the mail processing and/or customer service data have not been received from the supervisor terminal 320, the state 940 may repeat. In other embodiments, if it is determined that one or more modified data items of the mail processing and/or customer service data have not been received from the supervisor terminal 320, the procedure may end (not shown). If it is determined that one or more modified data items of the mail processing and/or customer service data have been received from the supervisor terminal 320, the server 310 updates corresponding data stored in the memory 820 (state 950). In performing state 950, the processor 810 of the server 310 may control the memory 820 to update the corresponding data items of the mail processing and/or customer service data stored in the memory 820 with the received modified data items.

In state 960, it is determined whether the modified data items are relevant to the carrier 520 or the carrier terminal 330. In some embodiments, the processor 810 of the server 310 may determine based on information previously stored in the memory 820, whether the modified data is relevant to the responsibilities/performance of the carrier 520 or the carrier terminal 330. For example, the memory 820 may include a look-up table that contains responsibilities/performance of the carrier 520 and/or relevance data for the carrier terminal 330 that can be compared with the modified data items that have been received from the supervisor terminal 320.

If it is determined in state 960 that the received modified data items are relevant to the responsibilities/performance of the carrier 520 or the carrier terminal 330, the server 310 wirelessly sends the modified data to the carrier terminal 330 (state 970). As described above, examples of the modified data items may include a change in the mail delivery route of the carrier 520, a change in the mail delivery starting time or a change in the amount of the mail to be delivered, etc. The carrier 520 can update his task accordingly based on the modified data items received at the carrier terminal 330. If it is determined that the received modified data items are not relevant to the responsibilities/performance of the carrier 520 or the carrier terminal 330, the server 310 may not send the modified data to the carrier terminal 330, and the process 900 may end.

User Interface—Supervisor Login

FIG. 11A illustrates an example image data or screenshot displayed in the user interface 630 of the supervisor terminal 320 showing a login page of the server 310 according to some embodiments. For security purposes, supervisors may only access the server 310 with their ACE login ID and password. If they do not have ACE IDs and passwords, they can request IDs and create their passwords. The login page may also allow the supervisor 510 to request a privacy policy link so that he or she can read about USPS' privacy statement. The login page may also allow the supervisor 510 to display a build number (e.g., Build 0.0.8) or version number on the screen so that the supervisor 510 can know which version he or she is currently using.

Figure 11B:
FIG. 11B illustrates an example image data or screenshot displayed in the user interface of the supervisor terminal showing a login confirmation page of the server according to some embodiments.
Figure 11B:

FIG. 11B illustrates an example image data or screenshot displayed in the user interface 630 of the supervisor terminal 320 showing a login confirmation page of the server 310 according to some embodiments. The login confirmation page may allow the supervisor 510 to confirm a currently assigned operation area, for example, by tapping on a confirm icon 3510. The login confirmation page may also allow the supervisor 510 to change, add, or remove operation area(s) using, for example, by tapping on a submit change icon 3520 at the bottom of the screen.

As discussed above, there are different levels of supervisors working in the facilities 104a-108b. Once log in, the supervisor terminal 320 may show different user interfaces corresponding to responsibilities of the supervisors with different levels. For example, the supervisor terminal 320 for a chief supervisor may show image data relating to an overview of the entire facility. Similarly, the supervisor terminal 320 for intermediate supervisors and front line supervisors may show image data corresponding to their respective responsibilities.

In some embodiments, when an emergency situation (e.g., fire, earthquake) occurs in a mail facility, the supervisor terminal 320 for at least one of the supervisors may display an evacuation status of each and every one of all staff members working in the facility so as to allow the supervisors to confirm whether all of the staff members have been evaluated.

User Interface—Customer Service Supervisor Homepage

Figure 12:
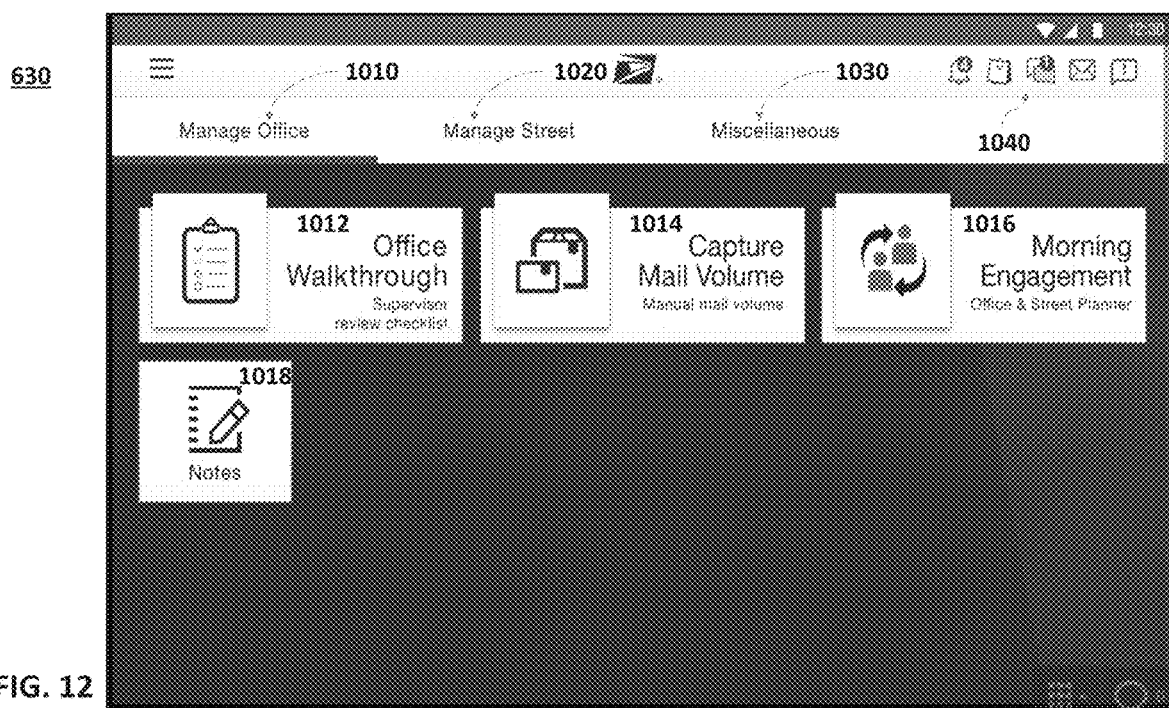
FIG. 12 illustrates example image data or screenshot for a Manage Office tab displayed in the user interface of the supervisor terminal illustrated in FIG. 7 according to some embodiments.

FIG. 12 illustrates an example image data or screenshot displayed in the user interface 630 of the supervisor terminal 320 showing a supervisor homepage displayed after login to the server 310 according to some embodiments. FIG. 12 is merely an example screenshot displayed in the user interface 630, and certain contents may be removed, other contents added, or some contents rearranged depending on the specification and requirements. The contents may include, but not limited to, one or more of images (relative size, color, shape, etc.), tables or text. This applies to the screenshots shown in FIGS. 11A, 11B and 13A-69. One or more of the user interface screenshots shown in FIGS. 11A, 11B and 13A-69 may be provided by USPS servers. However, they can be used for other shipping/mail delivery companies or their systems.

The supervisor homepage shown in FIG. 12 may be the first screen displayed on the supervisor terminal 320 of a customer service supervisor upon login to the server 310. The homepage may include a Manage Office tab 1010, a Manage Street tab 1020, a Miscellaneous tab 1030 and a navigation bar 1040. The Manage Office tab 1010 may allow a customer service supervisor to manage daily office functions. The Manage Street tab 1020 may allow a customer service supervisor to monitor carrier performance and route completion status. The navigation bar 1040 may allow a customer service supervisor to quickly access one or more of alerts, instant messaging (TM), email, notes and feedback. The default landing screen may be the one displayed when the Manage Office tab 1010 is clicked. However, a screenshot relating to one of the Manage Street tab 1020, the Miscellaneous tab 1030 and other tab may also be the default or first screen.

The Manage Office tab 1010 may include four tiles (or subtabs): an Office Walkthrough tile 1012, a Capture Mail Volume tile 1014, a Morning Engagement tile 1016 and a Supervisor Notes tile 1018. The supervisor 510 may manage his or her office time by completing the tasks reflected in the four tiles 1012-1018 of the user interface 630.

User Interface—Customer Service/Manage Office

Figure 13A:
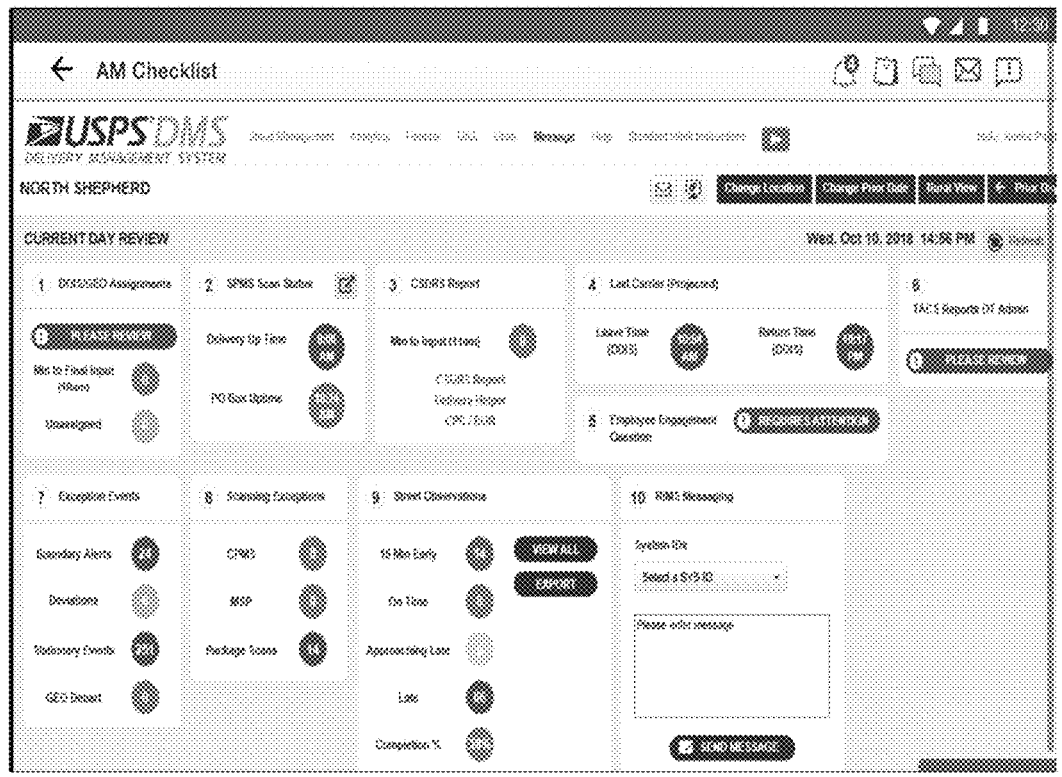
FIG. 13A illustrates an example image data or screenshot displayed in the user interface of the supervisor terminal showing the Office Walkthrough tile of the Manage Office tab according to some embodiments.

FIG. 13A illustrates an example image data or screenshot displayed in the user interface 630 of the supervisor terminal 320 showing the Office Walkthrough tile 1012 of the Manage Office tab 1010 according to some embodiments.

The Office Walkthrough tile 1012 may allow the supervisor 510 to access the DMS processor 440a via the supervisor terminal 320 to complete the AM (morning) checklist (or current day review). As shown in FIG. 13A, the current day review items may include, but not limited to, one or more of: a DOIS/GED assignments section (#1), a scan point management system (SPMS) scan status section (#2), a collection system delivery routing system (CSDRS) report section (#3), a last carrier (projected) section (#4), an employee engagement question section (#5), a TACS reports and OT admin section (#6), an exception events section (#7), a scanning exceptions section (#8), a street observation section (#9) and a RIMS messaging section (#10).

The CSDRS report (#3) may include a report of mail condition and delivery routing system (DPS) savings statistics. The CSDRS report may support data entry activities that need to be input into a CSDRS application. The statistics on this report may only refer to information regarding city delivery routes and carriers. The SPMS (#2) is an internal measurement system that utilizes scanning technology and helps to ensure timely availability of the mail by posted up-time (the time in which day customers may expect to collect the mail that is committed for that day from their PO Box), The scanning exceptions (#8) may include a collection point management system (CPMS) and managed service point (MSP), and package scans. The CPMS is a web-based management tool that supervisors use to monitor collection schedules and maintain the facilities information. This system lets district, area, and national users review and track collection point information nationally.

In FIG. 13A, the DOIS/GEO assignments section (#1), the CSDRS report section (#3), the employee engagement question section (#5), the TACS reports and OT admin (#6) section and the RIMS messaging section (#10) show no items to review.

In FIG. 13A, the SPMS scan status section (#2) shows delivery uptime (9:08 AM) and P.O. Box uptime (10:24

AM). The last carrier section (#4) shows the projected leave time (10:54 AM) and return time (19:17 PM) of the last carrier.

The exception events section (#7) shows 24 boundary alerts, 0 deviation events. 251 stationary events and 0 GEO depart events. The scanning exceptions section (#8) shows 0 CPMS exceptions, 0 MSP exceptions and 14 package scan exceptions. The street observation section (#9) shows 14 deliveries which were 15 min early, 8 deliveries that were on time, 0 delivery that is approaching late, 66 late deliveries, and 38% delivery completion rate.

Figure 13B:
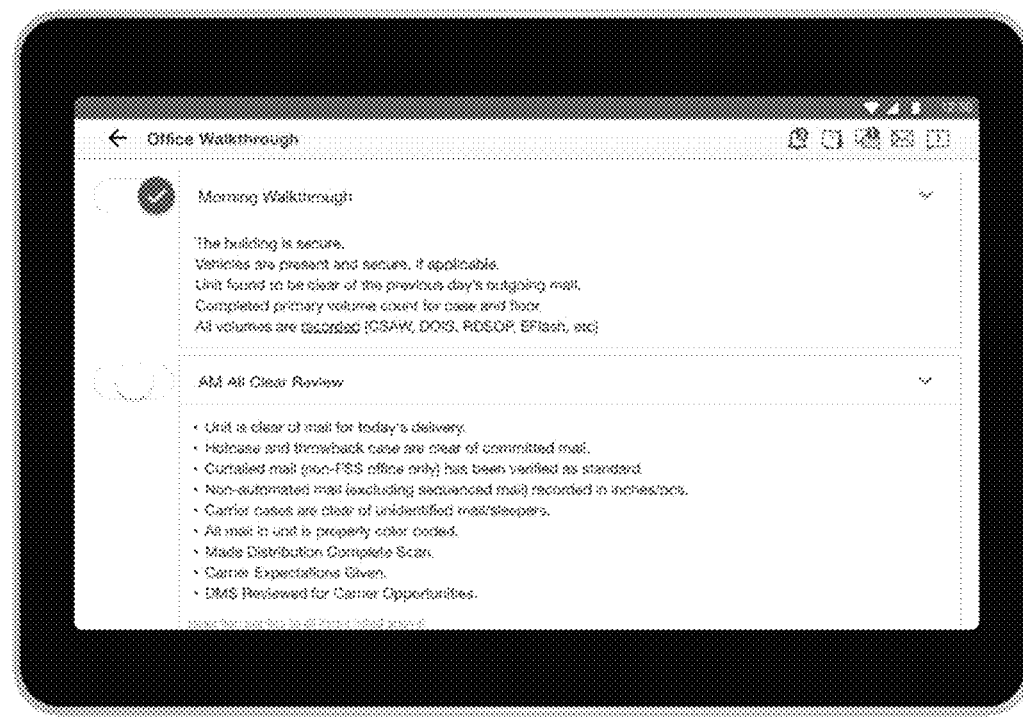
FIG. 13B illustrates another example image data or screenshot displayed in the user interface of the supervisor terminal showing the Office Walkthrough tile of the Manage Office tab according to some embodiments.

FIG. 13B illustrates example data or screenshot displayed in the user interface of the supervisor terminal showing the Office Walkthrough tile 1012 of the Manage Office tab 1010 according to some embodiments. As shown in FIG. 13B, the Office Walkthrough tile 1012 may also show text for results of the morning walkthrough procedure by the supervisor 510. Selecting the office walkthrough tile 1012 of the Manage Office Tab 1010 may bring the supervisor 510 to the morning walkthrough and AM all clear review. Furthermore, the office walkthrough tile 1012 may also bring the supervisor 510 to a PM supervisor review checklist tab (not shown). Status changes made on the application for each checklist may be updated in real time and automatically in the DMS processor 440*a*.

Figure 14:
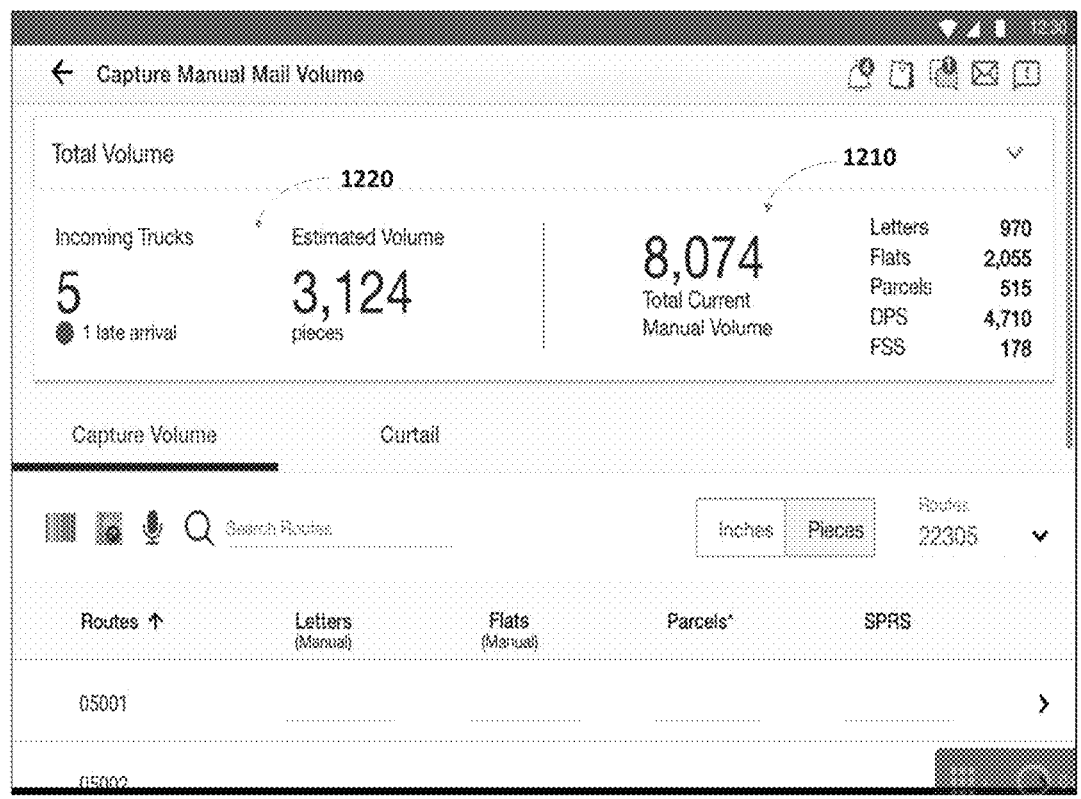
FIG. 14 illustrates an example image data or screenshot displayed in the user interface of the supervisor terminal showing the Capture Mail Volume tile of the Manage Office tab according to some embodiments.

FIG. 14 illustrates an example image data or screenshot displayed in the user interface 630 of the supervisor terminal 320 showing the Capture Mail Volume tile 1014 of the Manage Office tab 1010 according to some embodiments. The Capture Mail Volume tile 1014 may allow the supervisor 510 to view an expansion/collapsible total volume panel which displays a total mail volume section 1210 and an incoming truck section 1220. The total volume section 1210 may show a total number of mail items to be processed on a given day. In FIG. 14, the total number of mail items for the day may include a total current manual volume of 8,074 including 970 letters, 2065 (non-letter) flats, 515 parcels, 4,710 delivery point sequence (DPS) items, and 178 flat sequencing system (FSS) items. The DPS and FSS items may be machined sorted. The incoming truck section 1220 may include 5 incoming trucks (1 late arrival) that include 3,124 estimated volume pieces. The numbers shown in FIG. 14 are merely examples, and other numbers can be possible.

FIG. 15 illustrates another example image data or screenshot displayed in the user interface 630 of the supervisor terminal 320 showing the Capture Mail Volume tile 1014 of the Manage Office tab 1010 according to some embodiments. The Capture Mail Volume tile 1014 of FIG. 15 may allow the supervisor 510 to input a mail volume for letters, flats, parcels and small parcels and rolls (SPIES) in inches/pieces wherever applicable. The Capture Mail Volume tile 1014 of FIG. 15 may also allow the supervisor 510 to search for the routes by typing in the route number if he/she needs to enter/edit the volume for the specific route. The Capture Mail Volume tile 1014 of FIG. 15 may further allow the supervisor 510 to select routes by Zip codes to enter/edit the volume. For example, the supervisor 510 can select the routes by scanning barcode, voice activated routes, calculating volume based on height. As described above, once the information is modified by the supervisor 510, the modified information may be wirelessly sent to or saved to the server 310 which may selectively send the modified information to the carrier terminal 330. The carrier 520 may perform his or her job responsibilities accordingly once he or she receives modified information via the carrier terminal 330.

Figure 16:
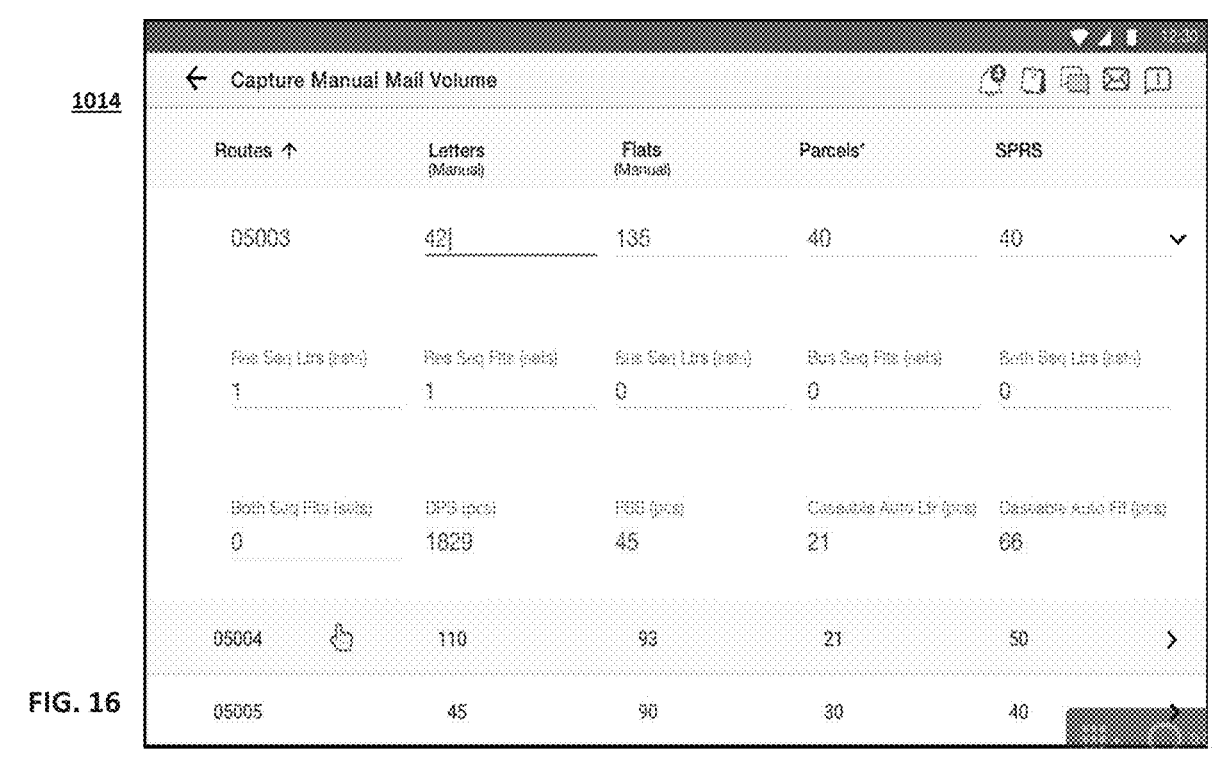

FIG. 16 illustrates another example image data or screenshot displayed in the user interface 630 of the supervisor terminal 320 showing the Capture Mail Volume tile 1014 of the Manage Office tab 1010 according to some embodiments. The Capture Mail Volume tile 1014 of FIG. 16 may allow the supervisor 510 to view a detailed screen, for example, by taping the right arrow on the selected route. This expanded view may display the volume for sequential letters and flats, DPS, FSS, SPRS and caseable mail counts to provide the complete mail volume details for the day to the supervisor 510. The supervisor 510 may input/edit the mail volume for selective fields from this screen as well. Again, once the information is modified by the supervisor 510, the modified information may be wirelessly sent to or saved to the server 310. Alternatively, the server 310, for example, the auxiliary server 440 may be updated with the modified information. The server 310 may selectively send the modified information to the carrier terminal 330.

Figure 17A:
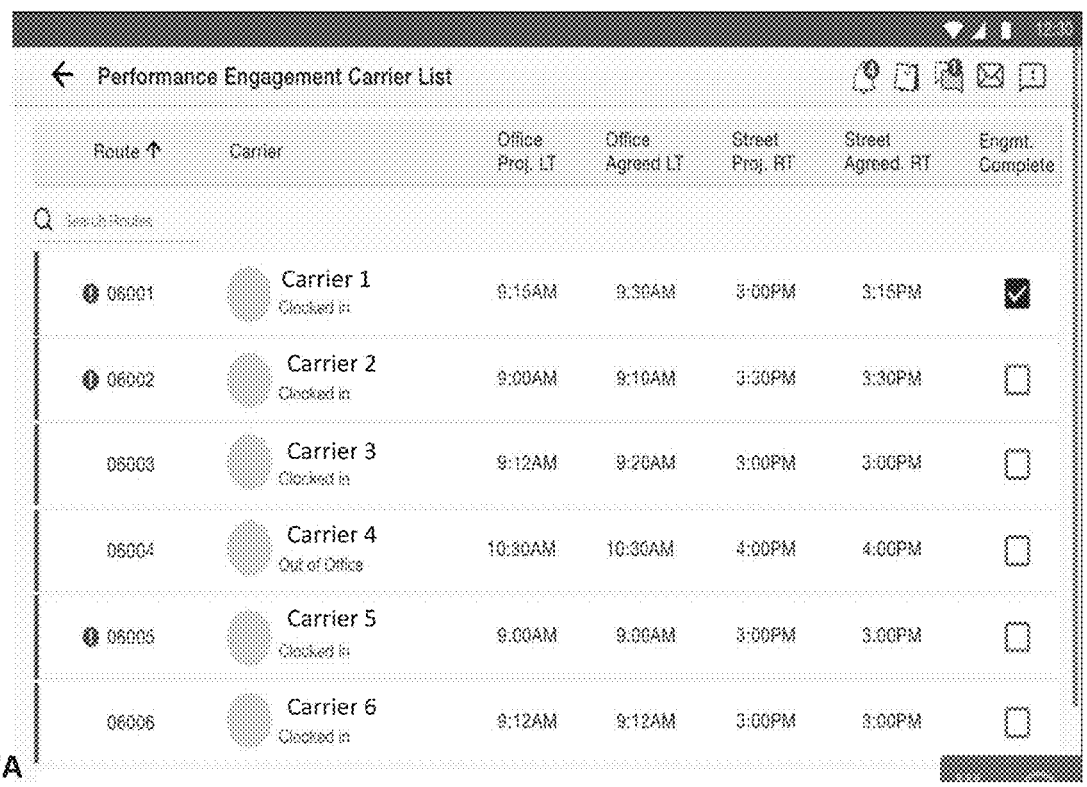
FIG. 17A illustrates an example image data or screenshot displayed in the user interface of the supervisor terminal showing the Morning Engagement tile of the Manage Office tab according to some embodiments.

FIG. 17A illustrates an example image data or screenshot displayed in the user interface 630 of the supervisor terminal 320 showing the Morning Engagement tile 1016 of the Manage Office tab 1010 according to some embodiments. The Morning Engagement tile 1016 of FIG. 17A may allow the supervisor 510 to view a performance engagement carrier list to conduct his or her morning engagement, for example, by tapping on the Morning Engagement tile 1016 from the Manage Office tab 1010 on the supervisor homepage. The carrier list may function as a supervisor morning engagement checklist for confirming carrier leave time (LT) and return time (RT) for a list of carriers, for example, Carriers 1-6 as illustrated. In some embodiments, the carrier list may include carrier names. The Morning Engagement tile 1016 of FIG. 17A may also allow the supervisor 510 to input or edit the projected leave time (LT) of the carrier 520 based on his or her conversation with the carrier 520. Once the supervisor 510 completes his or her engagement with the carrier 520 and checks the checkbox, the agreed leave time will be saved into the server 310, for example, the auxiliary server 440. Alternatively, once the information is modified by the supervisor 510, the modified information may be wirelessly sent to the server 310. The server 310 may wirelessly send the modified information to the carrier terminal 330, when the modified data is determined to be relevant to the carrier terminal 330 or responsibilities or performance of the carrier 520.

FIG. 17B illustrates another example image data or screenshot displayed in the user interface 630 of the supervisor terminal 320 showing the Morning Engagement tile 1016 of the Manage Office tab 1010 according to some embodiments. The Morning Engagement tile 1016 of FIG. 17B may show updated carrier leave times (LTs) or return times (RTs) so that the supervisor may be alerted about the update carrier LTs and RTs. The screenshot may include an office agreed LI column 1510 and a street agreed RT column 1520. Each of the office agreed LT column 1510 and the street agreed RT column 1520 may include a plurality of checkboxes respectively indicating the corresponding carrier LTs and RTs. The office agreed LT column 1510 shows that there are four carriers that have updated LTs. The street agreed RT column 1520 shows that there is one carrier that has an updated RT. These are merely examples, and other arrangements and/or combinations of the LTs and RTs are also possible. For example, all of the carriers may have updated LTs and/or updated RTs, or none of the carriers may have updated LTs or RTs.

FIG. 18 illustrates another example image data or screenshot displayed in the user interface 630 of the supervisor terminal 320 showing a carrier details section 1610 of the Morning Engagement tile 1016 of the Manage Office tab 1010 according to some embodiments. The carrier detail section 1610 of the Morning Engagement tile 1016 may allow the supervisor 510 to view carrier details while conducting Morning Engagement, for example, by tapping on a carrier's name. The carrier details may include one or more of missed scans, late returns, unscheduled leave, and driver exceptions. The carrier details may also include space for notes and actions for backend systems updates. The screen on FIG. 18 shows that Carrier 1 missed three scans Friday, September 7, had 15 late returns out of 30, 15 unscheduled leave and 2 driver exceptions. The carrier detail section 1610 of the Morning Engagement tile 1016 may also allow the supervisor 510 to add any special notes that the supervisor 510 may wish to address during his or her morning engagement with the carrier 520 (for example, the fact that Carrier 1 missed 3 scans Friday, September 7). The carrier detail section 1610 of the Morning Engagement tile 1016 may also allow the supervisor 510 to keep track of the overtime updates to be made to the server 310. The carrier detail section 1610 may also include an action items section 1612. The action item section 1612 may include one or more updates. For example, the one or more updates may include an admin update for offered overtime and an admin update for accepted overtime as shown in FIG. 18. Furthermore, the one or more updates may also include a Geo pivot update for removed pivots (not shown in FIG. 18).

FIG. 19 illustrates another example image data or screenshot displayed in the user interface 630 of the supervisor terminal 320 showing a today's conditions section 1710 of the Morning Engagement tile 1016 of the Manage Office tab 1010 according to some embodiments. The today's conditions section 1710 of the Morning Engagement tile 1016 may allow the supervisor 510 to view today's conditions report to analyze the calculated office and street hours, if the carrier has disagreement with the supervisor 510 regarding the projected leave time and return time. The today's conditions section 1710 may also include a carrier's route number information (not shown in FIG. 19). For example, carrier information shown in the today's conditions section 1710 may be for a particular route number, and this particular route number may be displayed in the today's conditions section 1710 (not shown).

FIG. 20 and FIG. 21 illustrate example image data or screenshots displayed in the user interface 630 of the supervisor terminal 320 showing the Pivot Planning section of the Morning Engagement tile 1016 of the Manage Office tab 1010 according to some embodiments. The Pivot Planning section of the Morning Engagement tile 1016 may allow the supervisor 510 to manage the current day's workload by assigning a pivot (e.g., shift), if the supervisor 510 wants to distribute the workload or allocate additional assignments to a carrier based on the carrier's available street hours and overtime eligibilities. In this example, since Carrier 2 has fewer projected office hours (1 hour) and base street hours (3 hours) than those of carrier Carrier 1 (2 hrs 21 mins, and 5 hrs 58 mins, respectively), the supervisor 510 may assign an additional route to ME Duran. Again, once the information is modified by the supervisor 510, the modified information may be wirelessly sent to or save to the server 310 so that the server 310 can be updated with the modified information. The server 310 may wirelessly send the modified information to the carrier terminals 330 of the two carriers, Carrier 1 and Carrier 2, as the assignments are relevant to both of the carriers.

Figure 22:
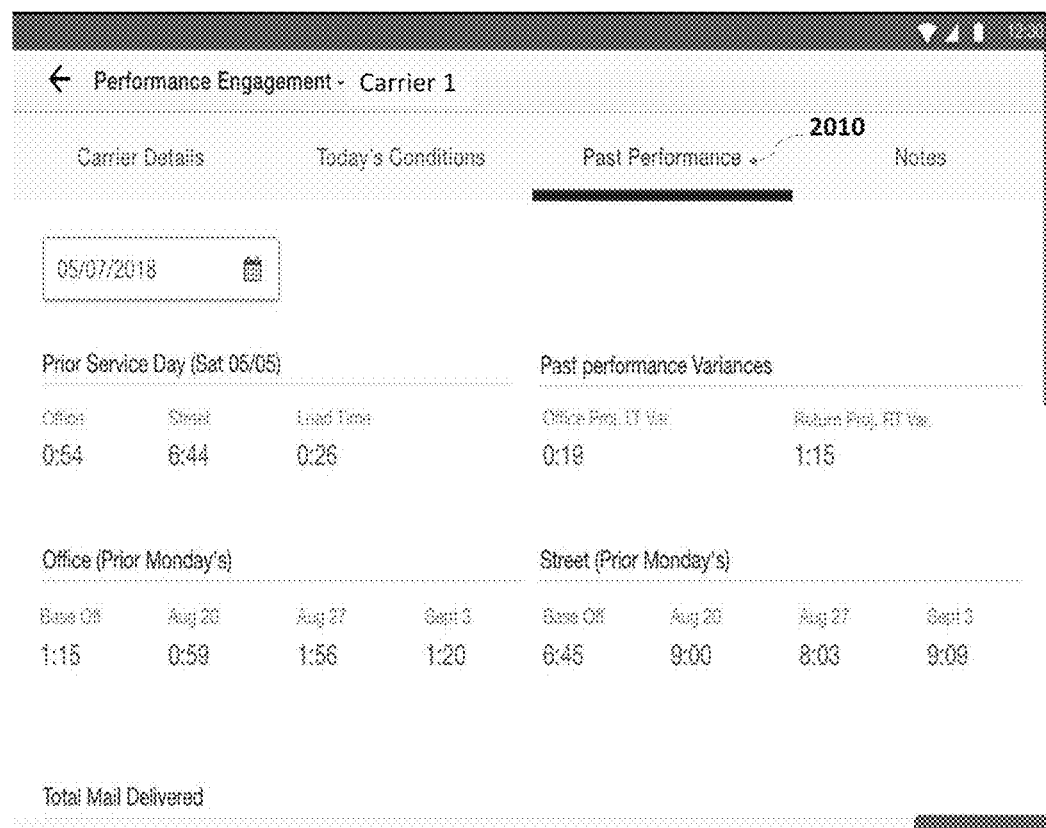

FIG. 22 and FIG. 23 illustrate example image data or screenshots displayed in the user interface 630 of the supervisor terminal 320 showing a Past Performance section 2010 of the Morning Engagement tile 1016 of the Manage Office tab 1010 according to some embodiments. The Past Performance section 2010 of the Morning Engagement tile 1016 may allow the supervisor 510 to view a past performance report, for example, for the prior week same days, 6 week carrier average and 3999 total mail deliveries in order to compare the current office and street hours with past periods, if the carrier 520 has disagreement with the supervisor 510 regarding his or her projected leave time and return time. The Past Performance section 2010 may also include a carrier's route number information (not shown in FIGS. 22 and 23). For example, carrier information shown in the Past Performance section 2010 may be for a particular route number, and this particular route number may be displayed in the Past Performance section 2010 (not shown in FIG. 22).

Figure 24A:
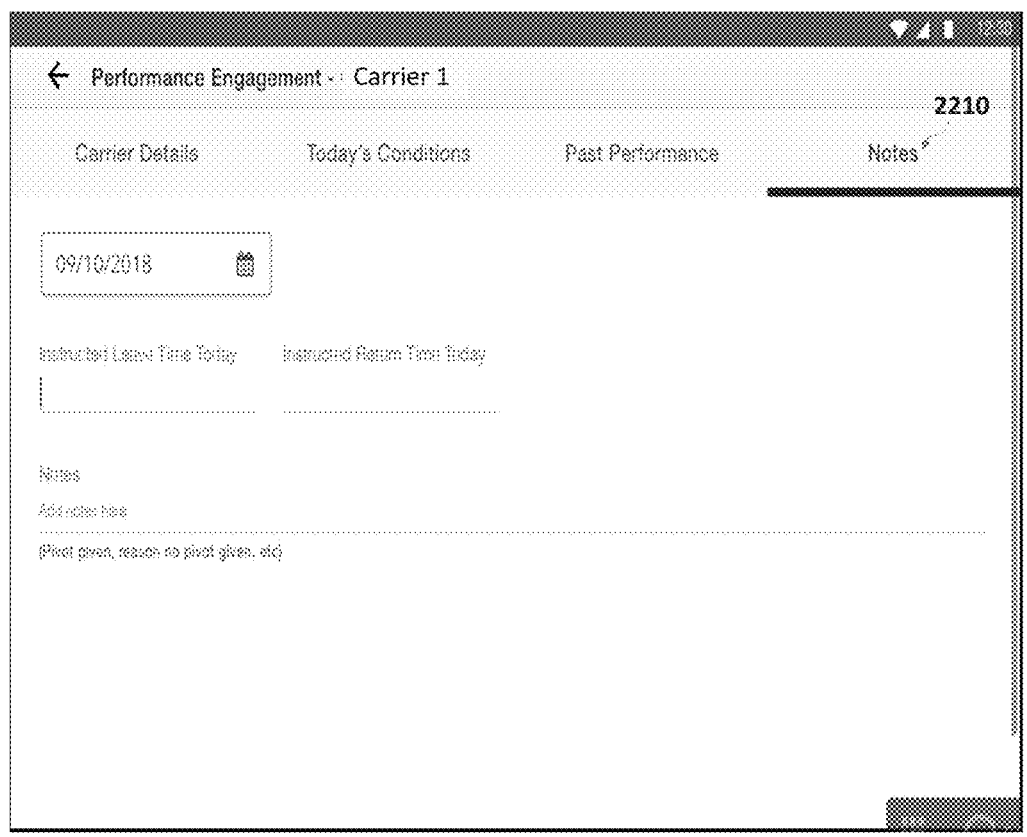
FIG. 24A illustrates an example image data or screenshot displayed in the user interface of the supervisor terminal showing the carrier Notes section of the Morning Engagement tile of the Manage Office tab according to some embodiments.

FIG. 24A illustrates an example image data or screenshot displayed in the user interface 630 of the supervisor terminal 320 showing a carrier Notes section 2210 of the Morning Engagement tile 1016 of the Manage Office tab 1010 according to some embodiments. The carrier Notes section 2210 of the Morning Engagement tile 1016 may allow the supervisor 510 to complete his or her morning engagement with the carrier 520 and enter the instructed leave time, instructed return time and his Notes for the carrier. The entered data may be saved to the server 310 or be wirelessly sent to the server 310, which may selectively send the modified or entered data to the carrier terminal 520.

Figure 24B:
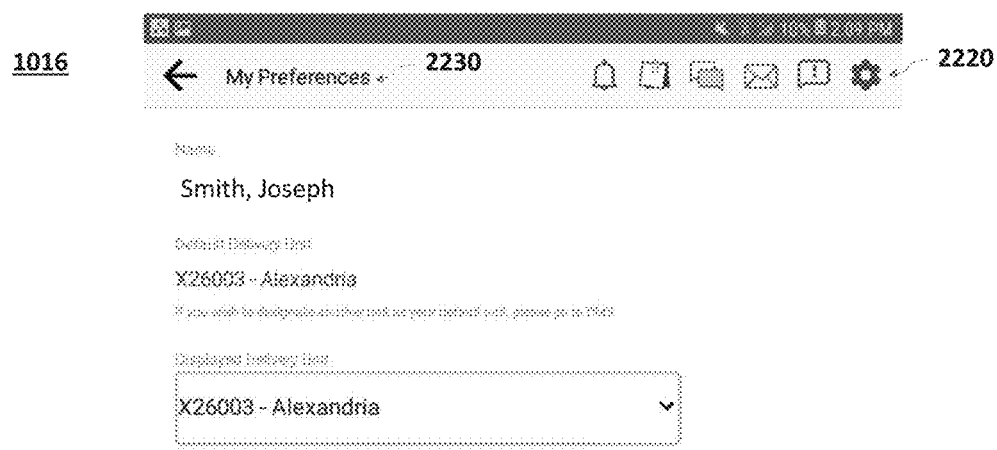
FIG. 24B illustrates an example image data or screenshot displayed in the user interface of the supervisor terminal showing a carrier preference page of the Morning Engagement tile of the Manage Office tab according to some embodiments.

FIG. 24B illustrates an example image data or screenshot displayed in the user interface 630 of the supervisor terminal 320 showing a carrier preference section (my preferences) 2230 of the Morning Engagement tile 1016 of the Manage Office tab 1010 according to some embodiments. Selecting a setting tab 2220 in the upper right hand corner may bring the supervisor 510 to the "my preferences" section 2230. The "my preferences" section 2230 may allow the supervisor to review and change the default information such as a default delivery unit displayed on the supervisor terminal 320. Changes to the default delivery unit can be made, for example, on the DMS settings in the DMS processor 440a.

Figure 25:
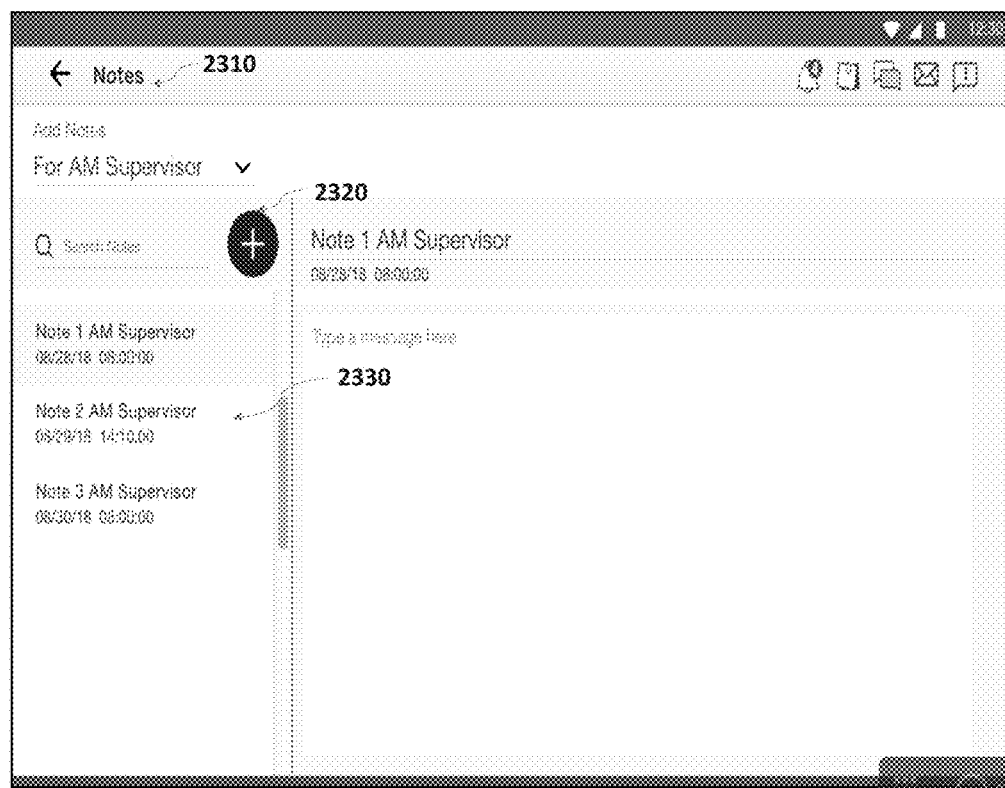
FIG. 25 illustrates an example image data or screenshot displayed in the user interface of the supervisor terminal showing the supervisor Notes section of the Morning Engagement tile of the Manage Office tab according to some embodiments.

FIG. 25 illustrates an example image data or screenshot displayed in the user interface 630 of the supervisor terminal 320 showing a supervisor Notes section 2310 of the Morning Engagement tile 1016 of the Manage Office tab 1010 according to some embodiments. The supervisor Notes section 2310 of the Morning Engagement tile 1016 may allow the supervisor 510 to create notes for AM/PM supervisors with regard to any workload or office/street issues. The supervisor 510 may create a note by selecting a plus sign 2320. A note may include a title and a message, and need to be saved. The supervisor Notes section 2310 may also allow the supervisor 510 to search one or more previous notes 2330 on the left hand side of the screen. The entered data may be saved to the server 310 or be wirelessly sent to the server 310, which may selectively send the modified or entered data to the carrier terminal 520.

User Interface—Customer Service/Manage Street

Figure 26:
FIG. 26 illustrates an example image data or screenshot displayed in the user interface of the supervisor terminal showing the Manage Street tab according to some embodiments.

FIG. 26 illustrates an example image data or screenshot displayed in the user interface 630 of the supervisor terminal 320 showing the Manage Street tab 1020 according to some embodiments. The Manage Street tab 1020 may include a monitor tile 1022, an exception events tile 1024, and a "find my carrier" tile 1026. The Manage Street tab 1020 may additionally include an "observation of work practices delivery services" tile 1021, an "observation of driving practices" tile 1023, a safety tool kit 1025 and a report accident tile 1027. The "observation of work practices delivery services"

tile 1021 may allow the supervisor 510 to record observations on the work practices of delivery unit employees.

Figure 27:
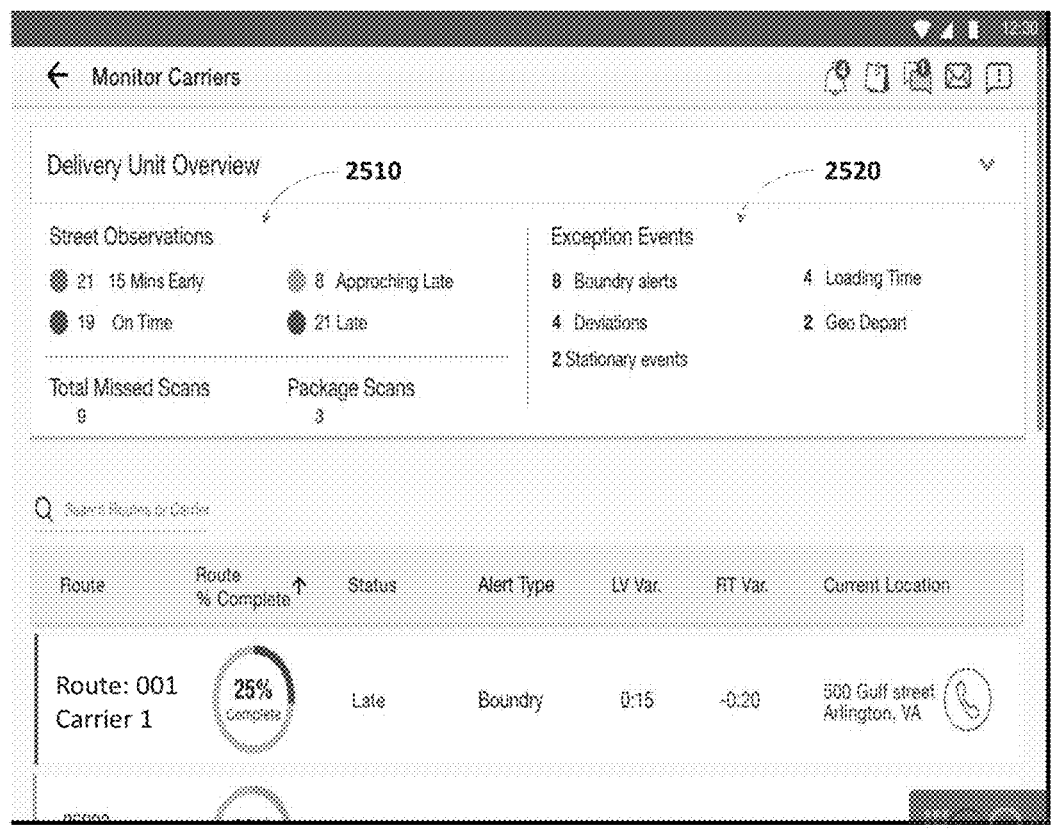
FIG. 27 illustrates an example image data or screenshot displayed in the user interface of the supervisor terminal showing the monitor tile of the Manage Street tab according to some embodiments.

FIG. 27 illustrates an example image data or screenshot displayed in the user interface 630 of the supervisor terminal 320 showing the monitor tile 1022 of the Manage Street tab 1020 according to some embodiments. The monitor tile 1022 may allow the supervisor 510 to monitor the delivery unit overview in an expansion/collapsible panel which gives the summary of street observations, total missed scans, package scans and exception events. The delivery unit overview may provide a streamlined access to a high-level overview of street observations and exception events along with a detailed description of each carrier's activities. For example, the street observation section 2510 shows 21 items that are 15 minutes early. 8 items that are approaching late, 19 items that are on time, and 21 items that are late. The exception events 2520 shows that 8 boundary alerts, 4 loading time exceptions, 4 deviations. 2 GEO departs, and 2 stationary events. The supervisor terminal 320 may allow the supervisor 510 to send a message (e.g., a text message, a voice message, a mail message, a sound source message or an image message) to the carrier terminal 330 of the carrier 520 regarding the information in the monitor tile 1022 to address or improve the current mail delivery situation. The supervisor terminal 320 may also allow the supervisor 510 to call the carrier 520 regarding the information in the monitor tile 1022 to address or improve the current mail delivery situation.

Figure 28:
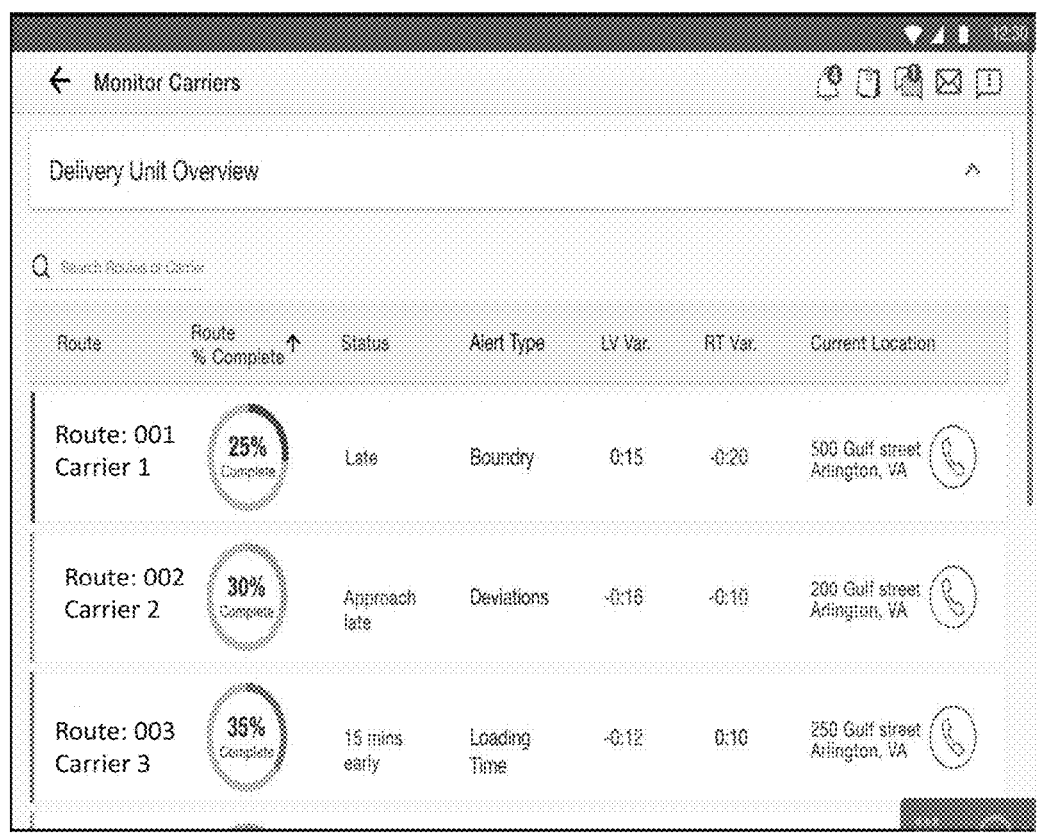
FIG. 28 illustrates another example image data or screenshot displayed in the user interface of the supervisor terminal showing the monitor tile of the Manage Street tab according to some embodiments.

FIG. 28 illustrates another example image data or screenshot displayed in the user interface 630 of the supervisor terminal 320 showing the monitor tile 1022 of the Manage Street tab 1020 according to some embodiments. The monitor tile 1022 of FIG. 28 may allow the supervisor 510 to monitor the delivery unit in a list view on the same screen, which gives the status of each carrier and their current location. The delivery unit overview may also provide a user-friendly platform that can rely on the system's auto-sorting mechanism to show the carriers with the most exception events first. The delivery unit overview may also provide a connectable platform that can monitor the current location of each carrier and contact them as needed. The monitor tile 1022 of FIG. 28 may also allow the supervisor 510 to search by routes or carriers to see their status. The monitor tile 1022 of FIG. 28 may further allow the supervisor 510 to sort the list by his or her choice of priority—status, alert type, route percentage complete, etc. The supervisor terminal 320 may allow the supervisor 510 to send a message to the carrier terminal 330 of the carrier 520 or call the carrier 520 regarding the information in the monitor tile 1022 to address or improve the current mail delivery situation.

Figure 29:
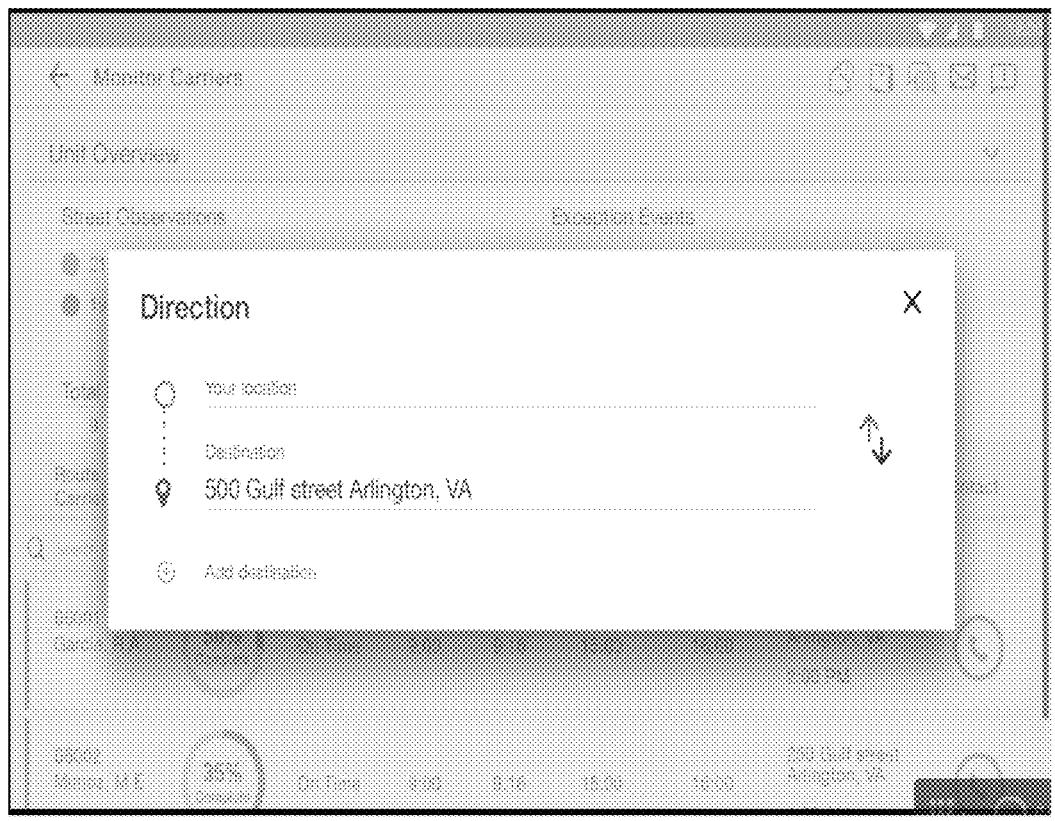
FIG. 29 illustrates another example image data or screenshot displayed in the user interface of the supervisor terminal showing the monitor tile of the Manage Street tab according to some embodiments.

FIG. 29 illustrates another example image data or screenshot displayed in the user interface 630 of the supervisor terminal 320 showing the monitor tile 1022 of the Manage Street tab 1020 according to some embodiments. The monitor tile 1022 of FIG. 29 may allow the supervisor 510 to click on the location of the carrier and obtains the driving directions to reach the carrier. The supervisor terminal 320 may allow the supervisor 510 to send a message to the carrier terminal 330 of the carrier 520 or call the carrier 520 regarding the information in the monitor tile 1022 to address or improve the current mail delivery situation.

Figure 30A:
FIG. 30A illustrates an example image data or screenshot displayed in the user interface of the supervisor terminal showing the exception event tile of the Manage Street tab according to some embodiments.

FIG. 30A illustrates an example image data or screenshot displayed in the user interface 630 of the supervisor terminal 320 showing the exception event tile 1024 of the Manage Street tab 1020 according to some embodiments. The exception event tile 1024 of FIG. 30A may allow the supervisor 510 to view exception events in order to monitor carriers and manage the street. The exception events may include boundary events which provide a map displaying the location of carrier terminals that are more than, for example, 1,000 feet from an authorized travel path. The exception event tile 1024 of FIG. 30A may allow the supervisor 510 to access the DMS processor 440a from the supervisor terminal 320 to view the exception events, for example. The supervisor terminal 320 may also allow the supervisor 510 to send a message to the carrier terminal 330 of the carrier 520 or call the carrier 520 regarding the information in the monitor tile 1022 to address or improve the current mail delivery situation.

Figure 30B:
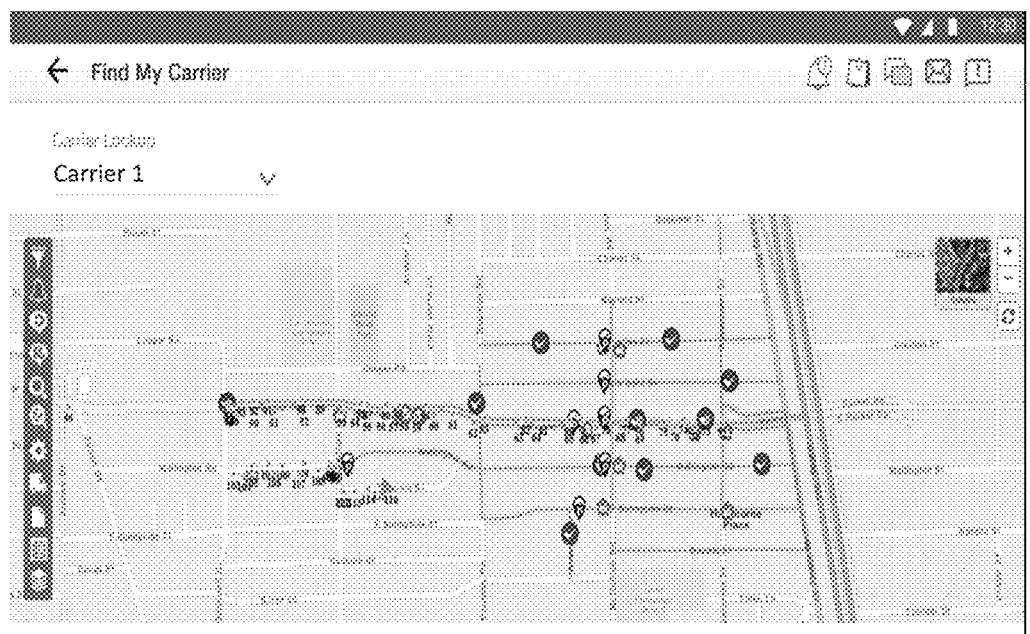
FIG. 30B illustrates an example image data or screenshot displayed in the user interface of the supervisor terminal showing the "find my carrier" tile of the Manage Street tab according to some embodiments.

FIG. 30B illustrates an example image data or screenshot displayed in the user interface 630 of the supervisor terminal 320 showing the "find my carrier" tile 1026 of the Manage Street tab 1020 according to some embodiments. The "find my carrier" tile 1026 may allow the supervisor 510 to access the DMS processor 440a to do a carrier lookup from the supervisor terminal 320 to monitor the carrier status. The find my carrier map can be customized to display the location and status of any carrier along their route.

Figure 30C:
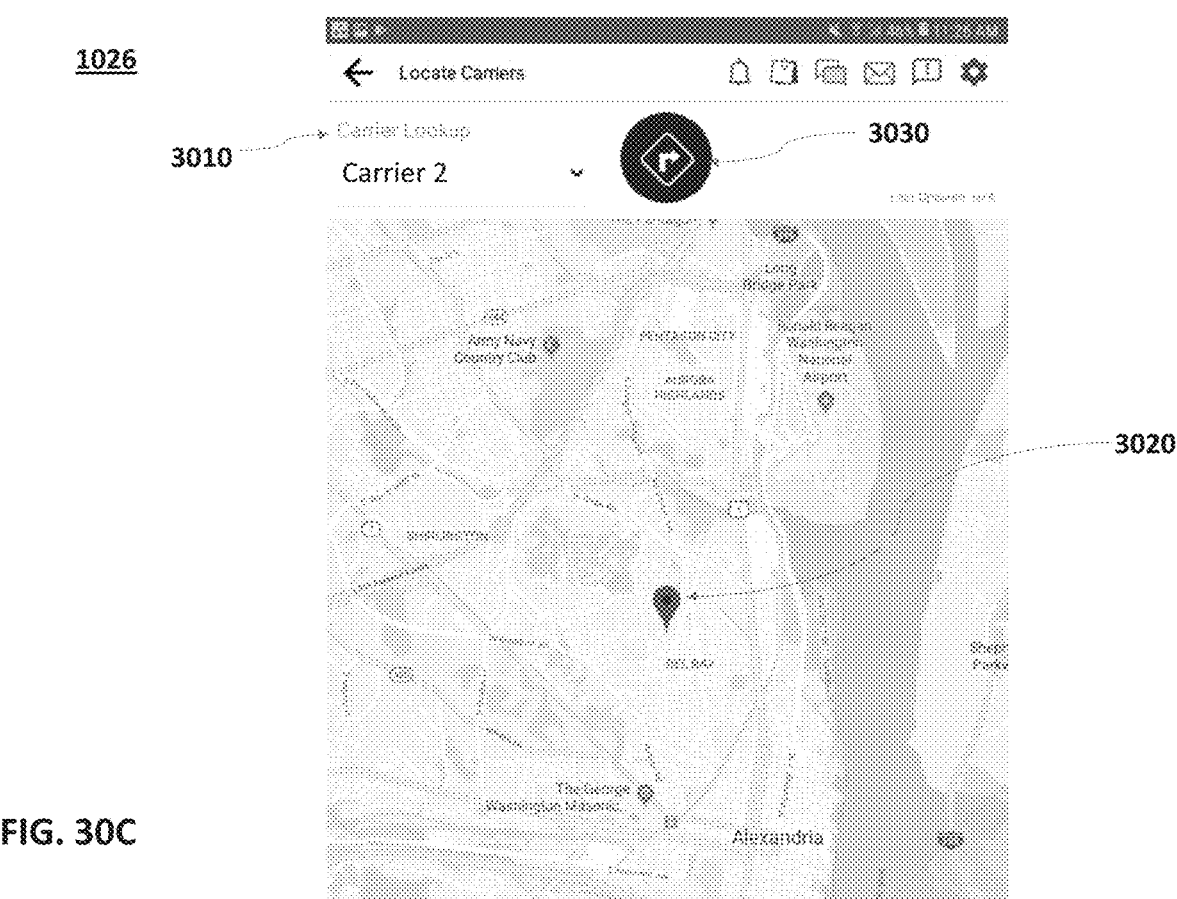
FIG. 30C illustrates another example image data or screenshot displayed in the user interface of the supervisor terminal showing the "find my carrier" tile of the Manage Street tab according to some embodiments.

FIG. 30C illustrates another example image data or screenshot displayed in the user interface of the supervisor terminal showing the "find my carrier" tile 1026 of the Manage Street tab according to some embodiments. The "find my carrier" tile 1026 may also allow the supervisor 510 to view a selected carrier's last known location. For example, tapping a selected carrier name in the carrier lookup section 3010 may allow the supervisor 510 to view the selected carrier's current or last known location 3020. Furthermore, selecting the directions tab 3030 may allow the supervisor 510 to view the directions to the carrier's current or last known location 3020.

FIG. 30I) illustrates an example image data or screenshot displayed in the user interface of the supervisor terminal showing the "report accident" tile 1027 of the Manage Street tab 1020 according to some embodiments. The "report accident" tile 1027 may allow the supervisor 510 to submit an accident report, including attaching photos and diagrams as needed.

Figure 31:
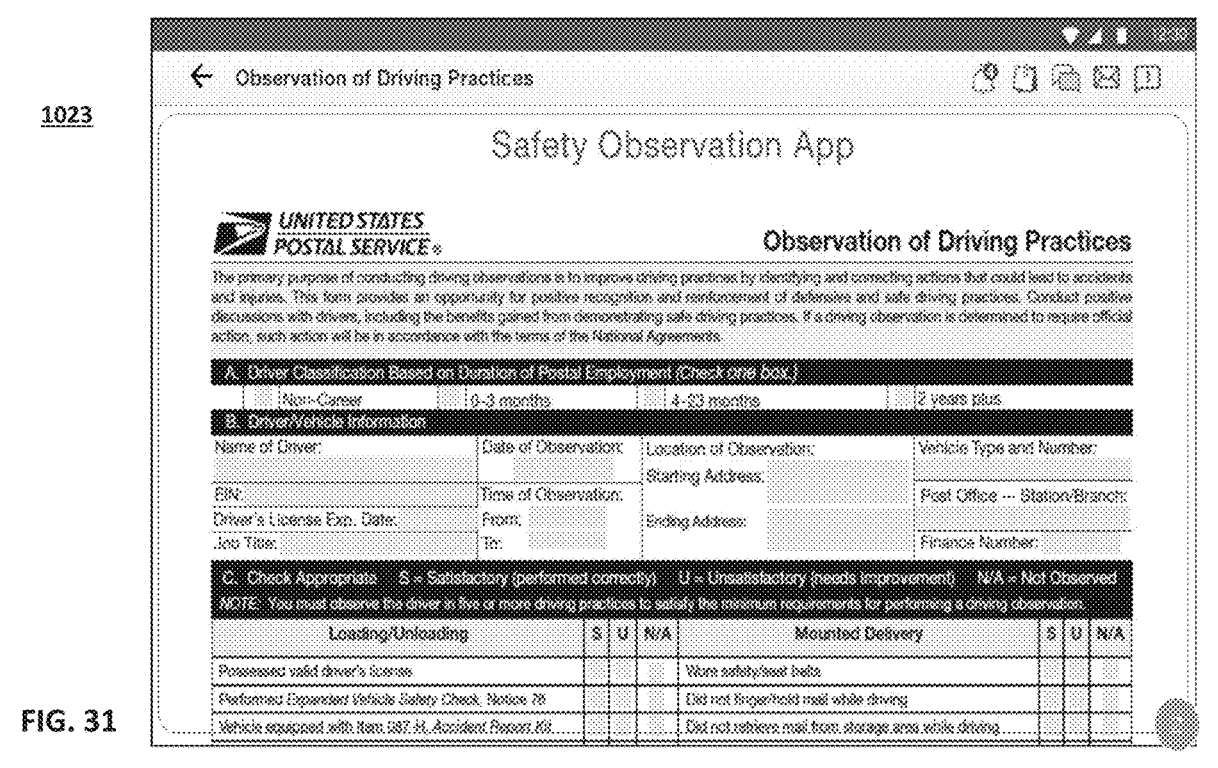

FIG. 31 illustrates an example image data or screenshot displayed in the user interface of the supervisor terminal showing the "observation of driving practices" tile 1023 of the Manage Street tab according to some embodiments. The "observation of driving practices" tile 1023 may allow the supervisor 510 to record observations on the driving practices of carriers.

User Interface—Customer Service/Miscellaneous

Figure 32:
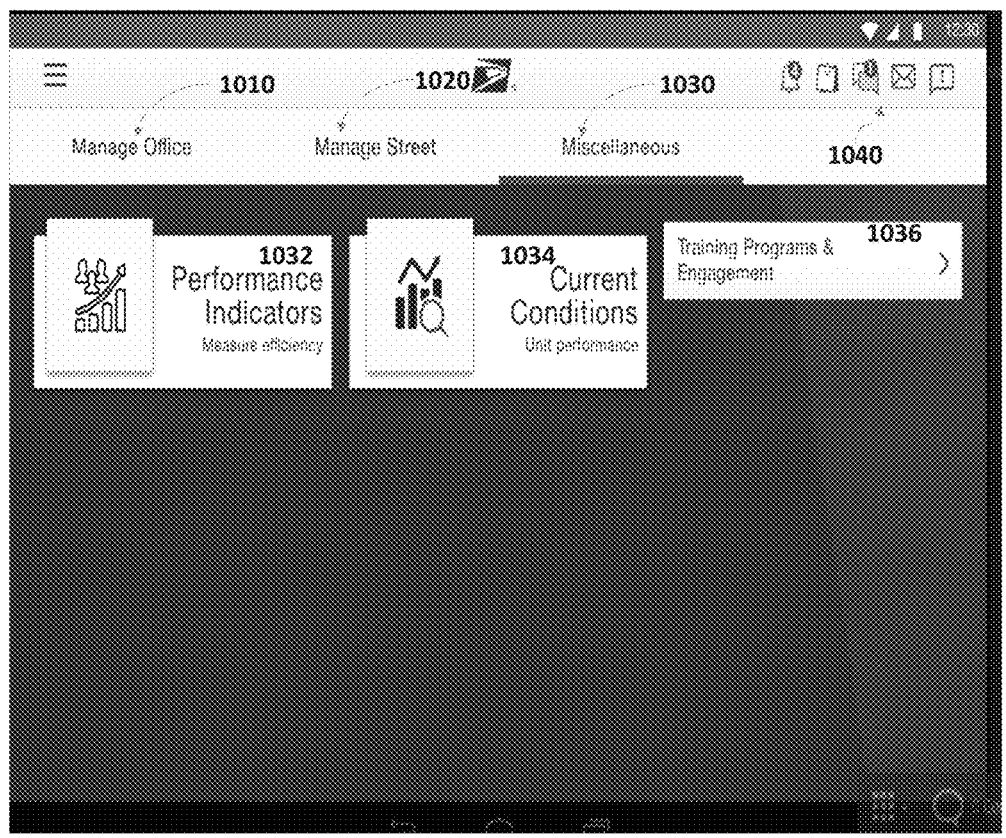
FIG. 32 illustrates an example image data or screenshot displayed in the user interface of the supervisor terminal showing the Miscellaneous tab according to some embodiments.

FIG. 32 illustrates an example image data or screenshot displayed in the user interface 630 of the supervisor terminal 320 showing the Miscellaneous tab 1030 according to some embodiments. The Miscellaneous tab 1030 may include a performance indicators tile 1032, a current conditions tile 1032, and a "training programs & engagement" tile 1036. The performance indicators tile 1032 may allow the supervisor 510 to view efficiency of carriers. The current conditions tile 1034 may allow the supervisor 510 to view unit performance. The "training programs & engagement" tile 1036 may allow the supervisor 510 to view carrier training programs and engagement with carriers.

User Interface—Customer Service/Navigation Bar

Figure 33:
FIG. 33 illustrates an example image data or screenshot displayed in the user interface of the supervisor terminal showing a hamburger menu of navigation bar items according to some embodiments.

FIG. 33 illustrates an example image data or screenshot displayed in the user interface 630 of the supervisor terminal 320 showing a hamburger menu 1042 of the navigation bar 1040 according to some embodiments. The hamburger menu 1042 represents hidden navigation features and may allow the supervisor 510 to access the homepage items by tapping on the global hamburger menu 1042 from any screen.

Figure 34:
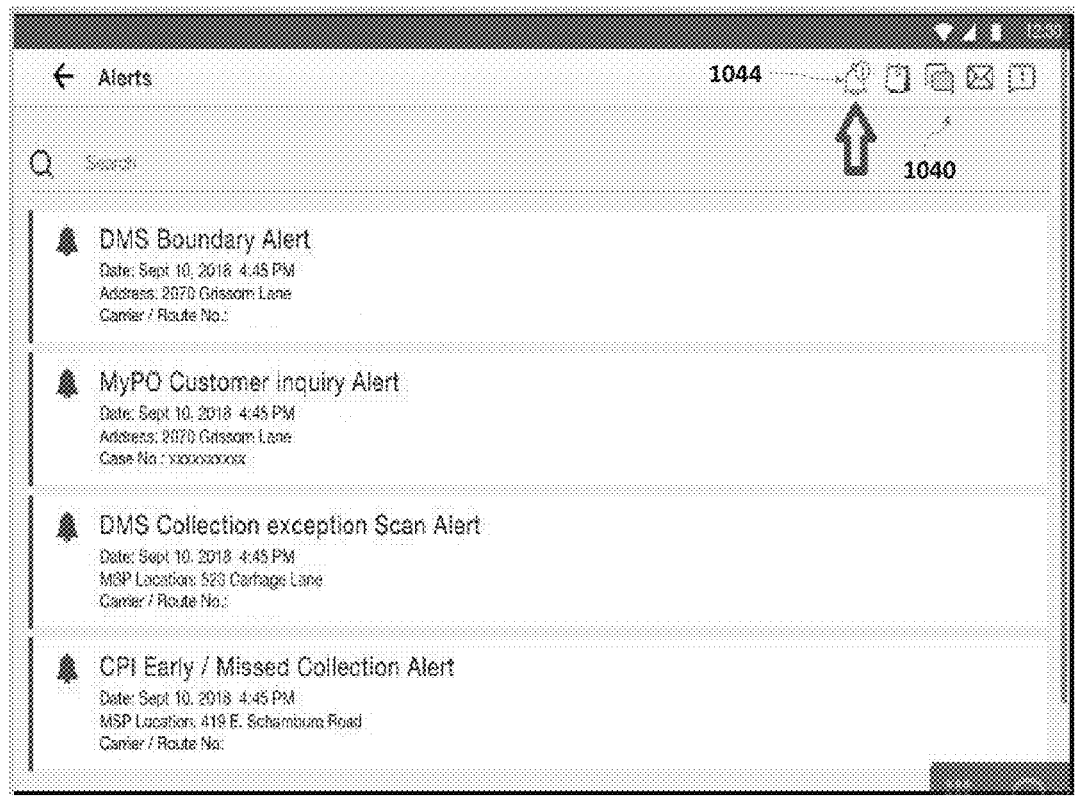
FIG. 34 illustrates an example image data or screenshot displayed in the user interface of the supervisor terminal showing an alert notification icon of the navigation bar items according to some embodiments.

FIG. 34 illustrates an example image data or screenshot displayed in the user interface 630 of the supervisor terminal 320 showing an alert notification icon 1044 of the navigation bar 1040 according to some embodiments. The alert notification icon 1044 may allow the supervisor 510 to view and search alert notifications on the navigation bar 1040 about all types of exceptions which enable the supervisor 510 to manage the street effectively.

Figure 35:
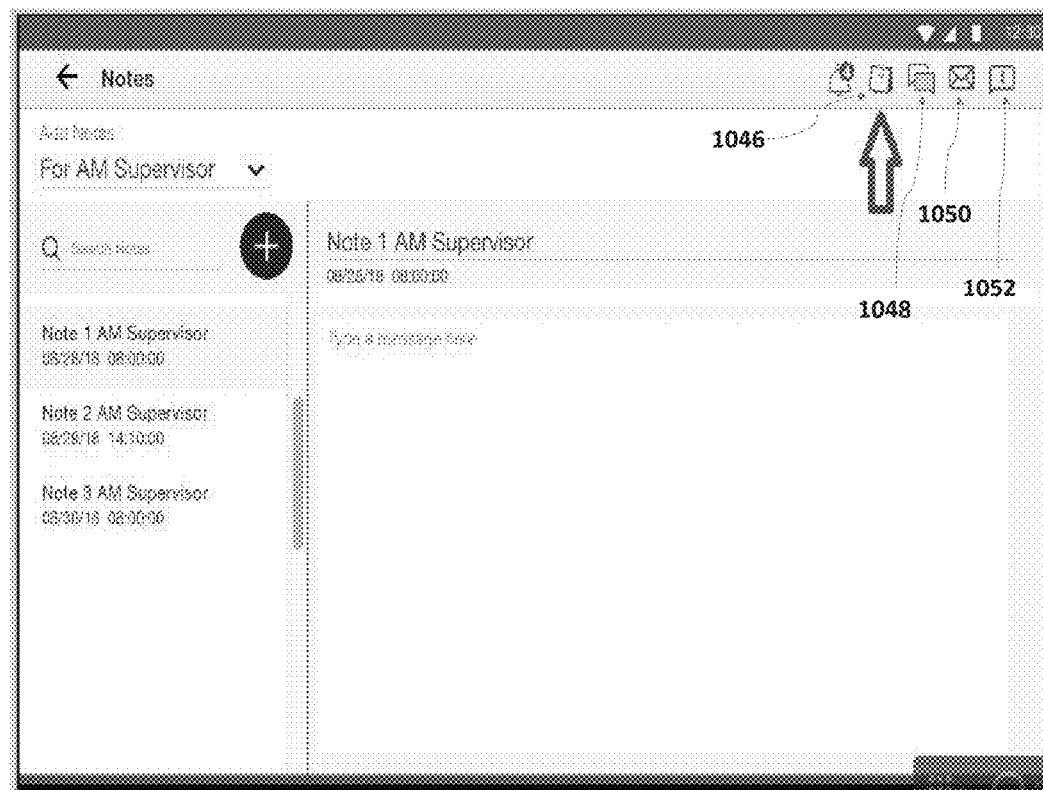
FIG. 35 illustrates an example image data or screenshot displayed in the user interface of the supervisor terminal showing a notes icon of the navigation bar items according to some embodiments.

FIG. 35 illustrates an example image data or screenshot displayed in the user interface 630 of the supervisor terminal 320 showing a notes icon 1046 of the navigation bar 1040 according to some embodiments. The notes icon 1046 may be displayed on the navigation bar 1040 so that the supervisor 510 can create his/her notes by tapping the notes icon 1046 without going to the homepage and tapping the notes tab 1018 (see FIG. 12).

The navigation bar 1040 may also include a messaging (or instant message (IM)) icon 1048, an email icon 1050 and a supervisor feedback icon 1052. The messaging icon 1048 may allow the supervisor 510 to send and receive messages to selected carriers, for example, by tapping on the messaging icon 1048 on the navigation bar. The messaging icon 1048 may also allow the supervisor 510 to view details on a carrier and his or her route on the screen and search by name capability for instant messaging. The messaging icon 1048 may also allow the supervisor 510 to access the server 310 from the supervisor terminal 310 to send and receive messages, for example, by on tapping the messaging icon 1048 on the menu bar 1040. The messaging icon 1048 may be displayed on the user interface 630 on the same screen as other mail processing and/or customer service data such that the supervisor terminal 320 can directly send a message to the carrier terminal 330 using the messaging icon 1048 without opening another email or messenger application. The email icon 1050 may allow the supervisor 510 to send or receive emails. The supervisor feedback icon 1052 may allow the supervisor 510 to provide feedback on the application, for example, by tapping on the feedback icon 1052 on the menu bar, which may assist in gathering further backlog items, improvising user experience and stability.

The information shown in FIGS. 11A-35 may include example image data or screenshot relating to customer service activities. However, at least some of the information shown in FIGS. 11A-35 may include data relating to mail processing activities. Furthermore, the information shown in FIGS. 11A-35 includes merely example customer service data, additional customer service data may be added, other customer service data removed, or some mail processing data added depending on the specification and requirements.

User Interface—Item Processing/Workforce/Dynamic Data Point

Figure 36:
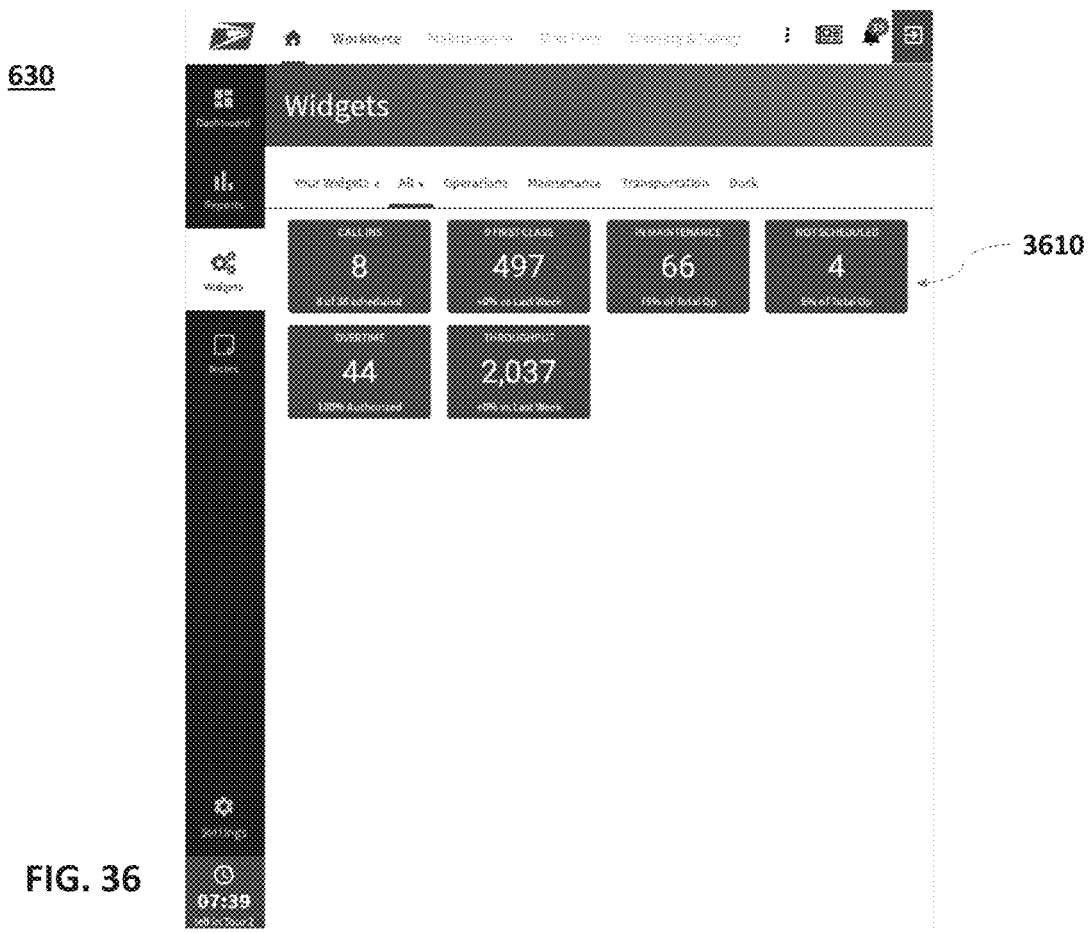
FIG. 36 illustrates an example image data or screenshot displayed in the user interface of the supervisor terminal showing a workforce/dynamic data point page according to some embodiments.

FIG. 36 illustrates an example image data or screenshot displayed in the user interface 630 of the supervisor terminal 320 showing a workforce/dynamic data point page according to some embodiments. The workforce/dynamic data point page may include dynamic data points based on the operation assigned to the supervisor 510. The workforce/dynamic data point page may allow the supervisor 510 to add or remove any one of data point tabs 3610 from his or her operation, for example, by tapping on the data point tabs 3610.

User Interface—Item Processing/Workforce/Schedule

Figure 37:
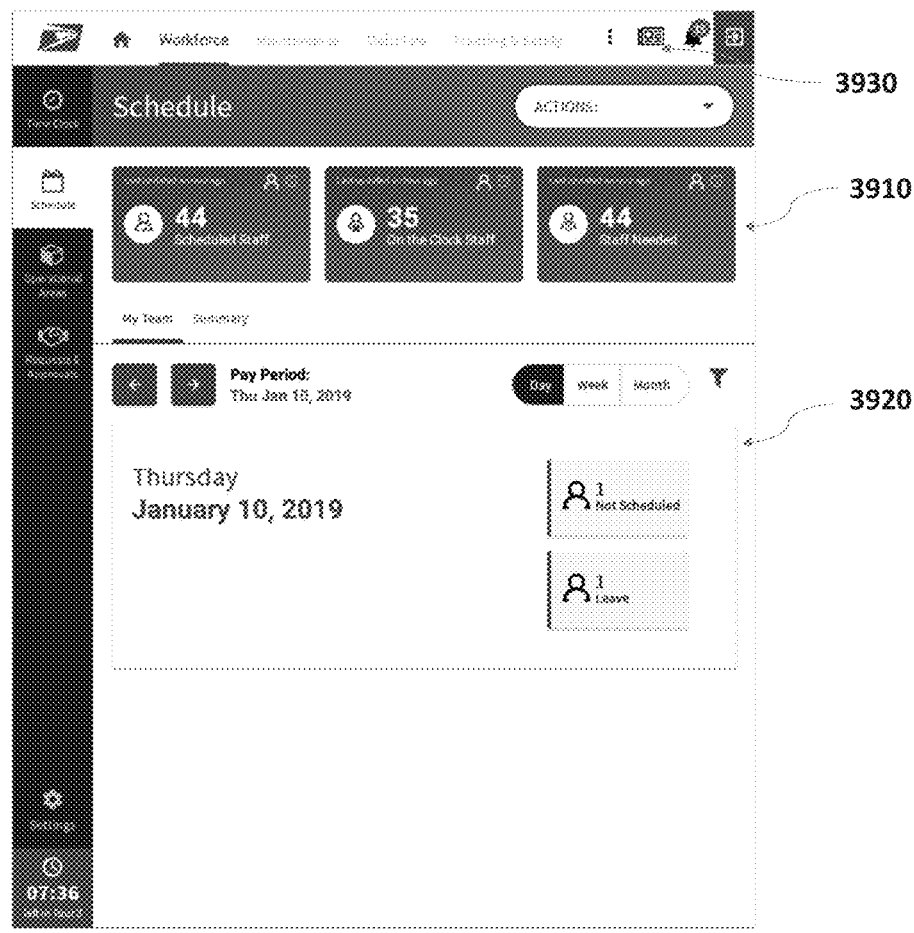
FIG. 37 illustrates an example image data or screenshot displayed in the user interface of the supervisor terminal showing a workforce/schedule page according to some embodiments.

FIG. 37 illustrates an example image data or screenshot displayed in the user interface 630 of the supervisor terminal 320 showing a workforce/schedule page according to some embodiments. The workforce/schedule page of FIG. 37 may include a tile section 3910 and a "my team" section 3920. The tile section 3910 may show a head count of staff members (including carriers) who are clocked in or out, lunch in or out, or overtime. The tile section 3910 may also allow the supervisor 510 to see detailed breakdowns, for example, by tapping on each tile. The "my team" section 3920 may allow the supervisor 510 to view staff schedules for the operational areas assigned to the supervisor 510. The "my team" section 3920 may also allow the supervisor 510 to view facility clock ring counts for active and available staff members and a summary of overtime hours clocked in, for example, the last seven days. The "my team" section 3920 may also allow the supervisor 510 to view the page by day, week, or month, for example, by tapping on a switching icon 3930 on the top right corner.

Figure 38:
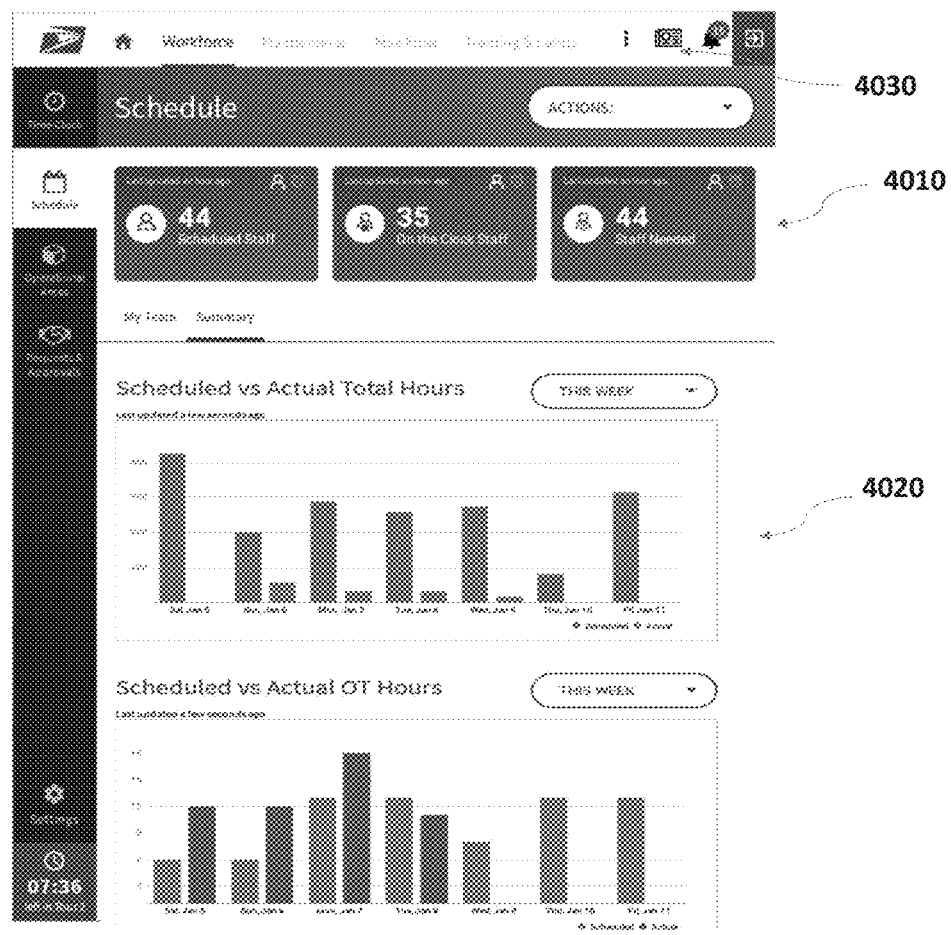
FIG. 38 illustrates another example image data or screenshot displayed in the user interface of the supervisor terminal showing the workforce/schedule page according to some embodiments.

FIG. 38 illustrates another example image data or screenshot displayed in the user interface 630 of the supervisor terminal 320 showing the workforce/schedule page according to some embodiments. The workforce/schedule page of FIG. 38 may include a tile section 4010 and a summary section 4020. The tile section 4010 may allow the supervisor 510 to see view counts of scheduled, on the clock, and needed staff members. The tile section 4010 may also allow the supervisor 510 to see detailed breakdowns, for example, by tapping on each tile. The summary section 4020 may allow the supervisor 510 to see a side-by-side view of daily scheduled vs. clocked hours and a side-by-side view of daily scheduled vs charged overtime hours. The workforce/schedule page of FIG. 38 may also allow the supervisor 510 to compare the information of the page with that of the previous week, for example, by tapping on a switching icon 4030 on the top right corner.

Figure 39:
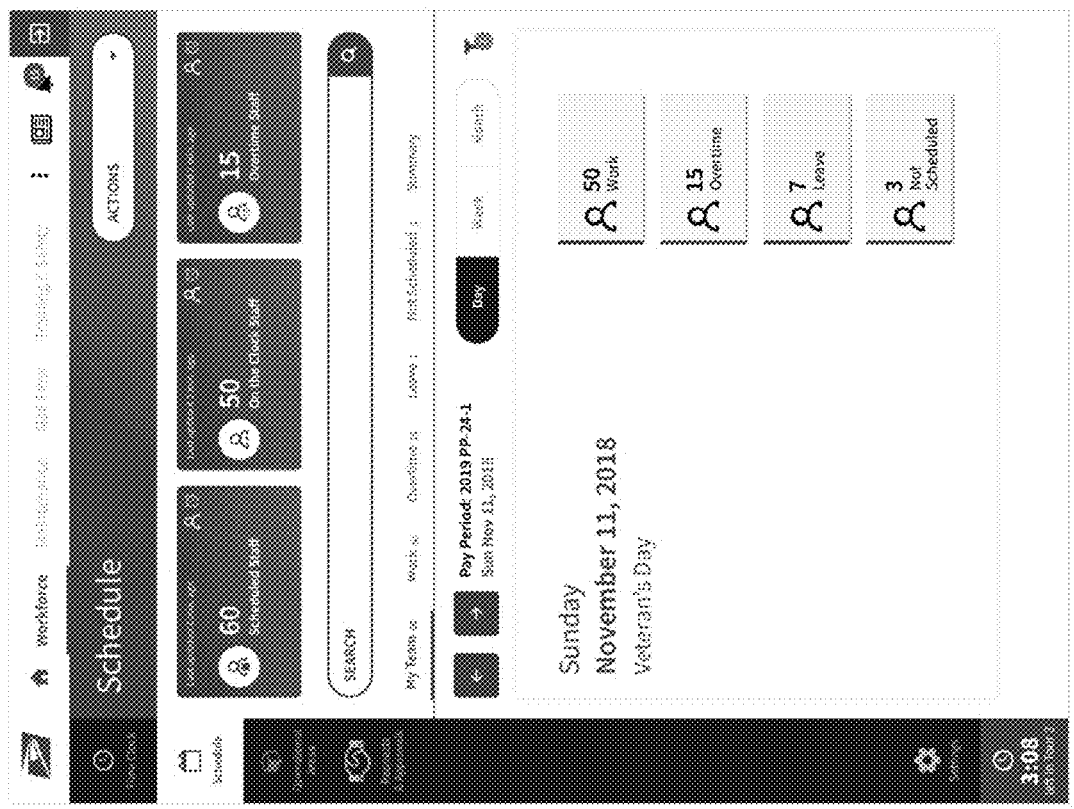
FIG. 39 illustrates another example image data or screenshot displayed in the user interface of the supervisor terminal showing the workforce/schedule page according to some embodiments.

FIG. 39 illustrates another example image data or screenshot displayed in the user interface 630 of the supervisor terminal 320 showing the workforce/schedule page according to some embodiments. The workforce/schedule page of FIG. 39 may allow the supervisor 510 to view employees' schedules for specific time periods so that he or she can see an overview of the facility schedules for the week, month or other period of time and make better informed decisions before the supervisor 510 grants a scheduled leave. The workforce/schedule page of FIG. 39 may also allow the supervisor 510 to view employees' schedules with a specific status (my team, work, overtime, leave, off, summary) so that he or she can review schedules that match specified statuses.

Figure 40:
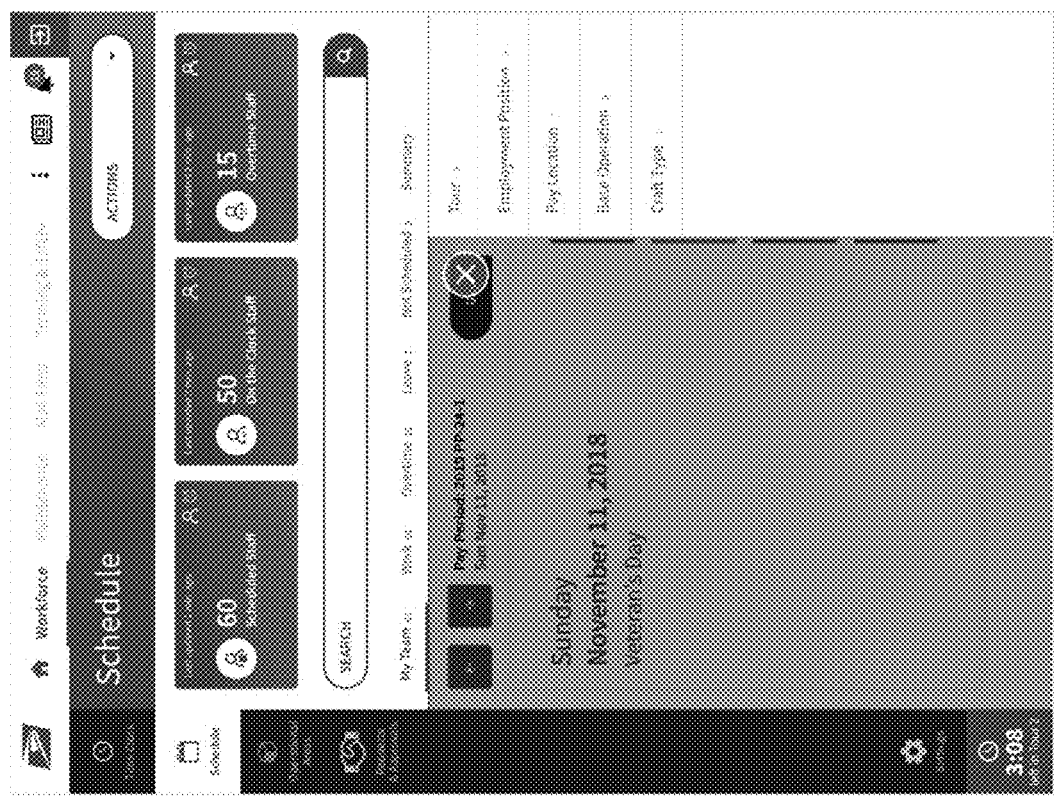
FIG. 40 illustrates another example image data or screenshot displayed in the user interface of the supervisor terminal showing the workforce/schedule page according to some embodiments.

FIG. 40 illustrates another example image data or screenshot displayed in the user interface 630 of the supervisor terminal 320 showing the workforce/schedule page according to some embodiments. The workforce/schedule page of FIG. 40 may allow the supervisor 510 to view employees' schedules on specific teams so that he or she can review schedules that match one or more of the specified teams. The workforce/schedule page of FIG. 40 may also allow the supervisor 510 to view employees' schedules in specific zones so that he or she can review schedules that match one or more of the specified zones. The workforce/schedule page of FIG. 40 may further allow the supervisor 510 to view employees' schedules in specific groups so that he or she can review schedules that match one or more of the specified groups.

Figure 41:
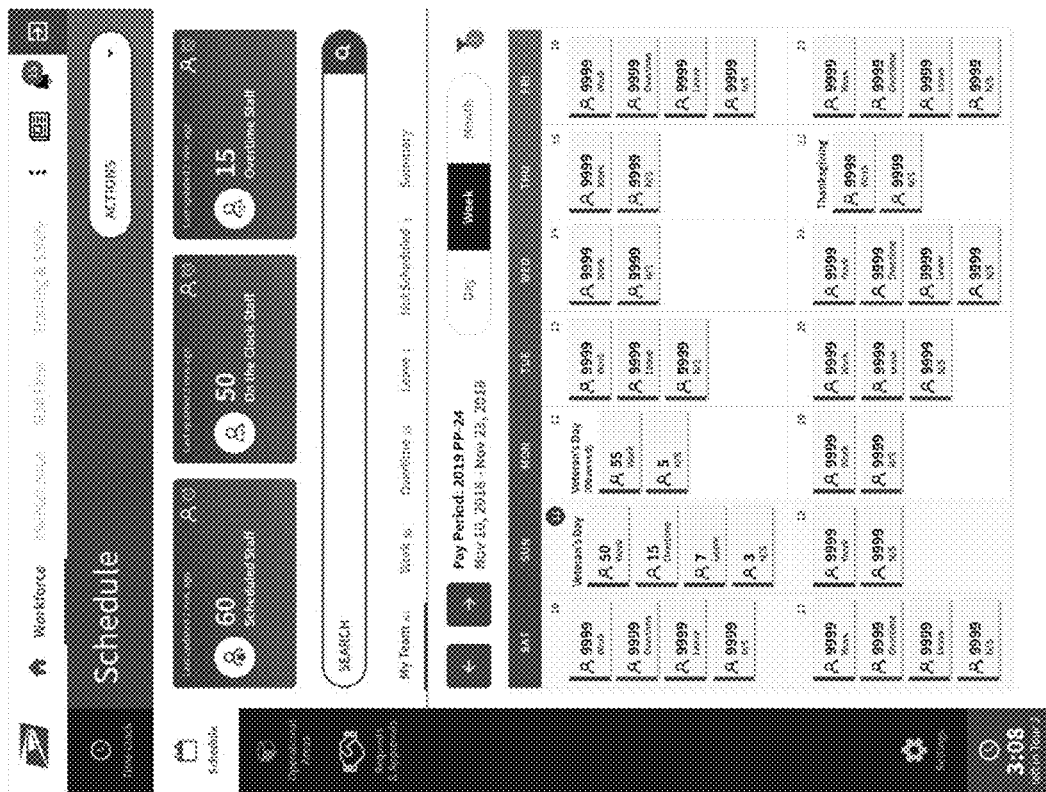
FIG. 41 illustrates another example image data or screenshot displayed in the user interface of the supervisor terminal showing the workforce/schedule page according to some embodiments.

FIG. 41 illustrates another example image data or screenshot displayed in the user interface 630 of the supervisor terminal 320 showing the workforce/schedule page according to some embodiments. The workforce/schedule page of FIG. 41 may allow the supervisor 510 to create schedule chips for work, overtime, leave and off, which may include a person icon, a number of employees icons and a schedule status icon. The workforce/schedule page of FIG. 41 may display different colors for different types of schedule, for example, green (work), red (overtime), blue (leave) and grey (off). The workforce/schedule page of FIG. 41 may include different sizes of a calendar view, for example, a small version for calendar week view and a large version for calendar day view.

Figure 42:
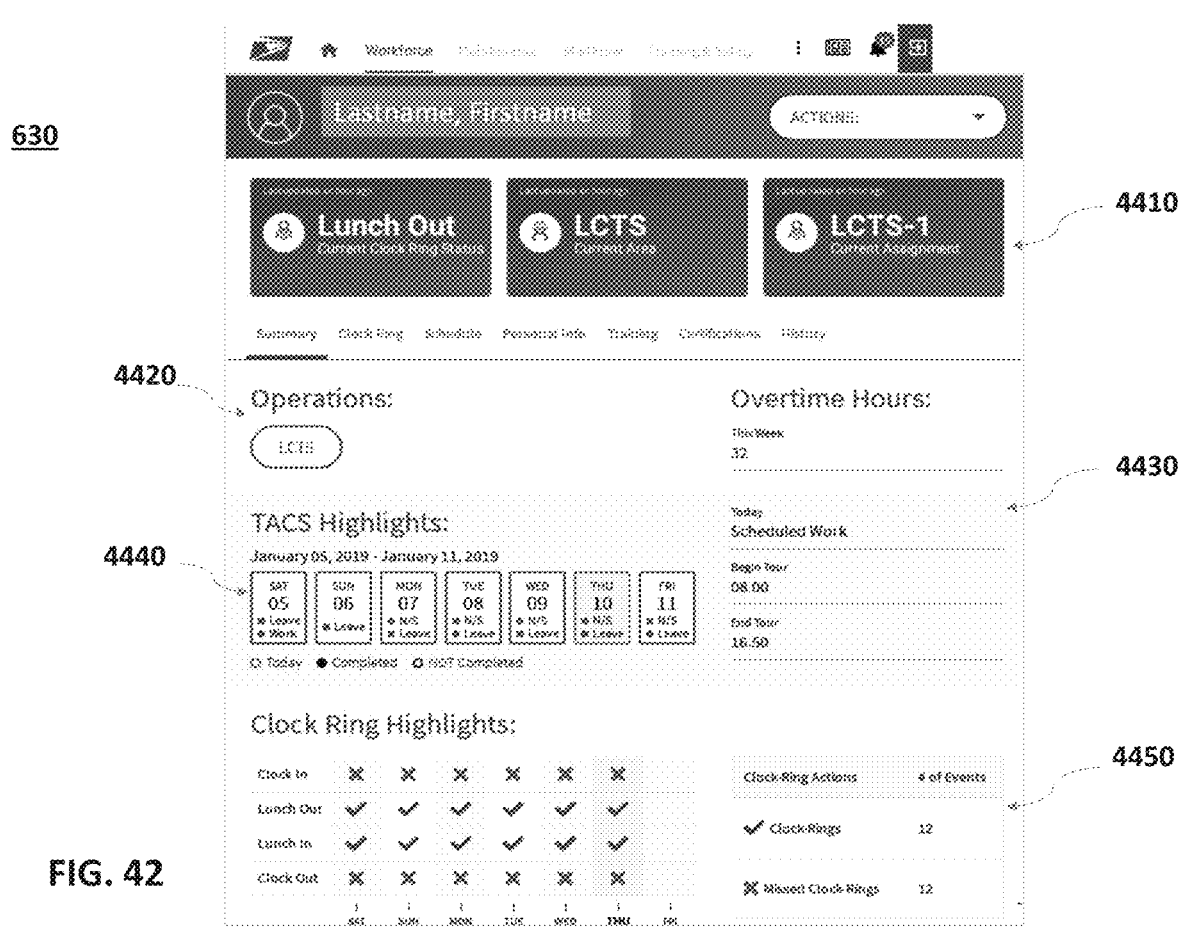
FIG. 42 illustrates an example image data or screenshot displayed in the user interface of the supervisor terminal showing a workforce/employee profile page according to some embodiments.

FIG. 42 illustrates an example image data or screenshot displayed in the user interface 630 of the supervisor terminal 320 showing a workforce/employee profile page according to some embodiments. The workforce/employee profile page may include a tiles section 4410, an operation section 4420, an overtime hours section 4430, a TACS highlights section 4440 and a clock ring highlights section 4450. The tiles section 4410 may allow the supervisor 510 to have a quick view of clock ring status, current operation, and assignment. The operation section 4420 may allow the supervisor 510 to view a list of tagged group operations. The overtime hours section 4430 may allow the supervisor 510 to have a quick view of overtime hours. The TACS highlights section 4440 may allow the supervisor 510 to have an overview of staff member schedules including scheduled and not scheduled work days, overtime, and leave. The clock ring highlights section 4450 may allow the supervisor 510 to have an auditable view of weekly clock ring swipes.

Figure 43:
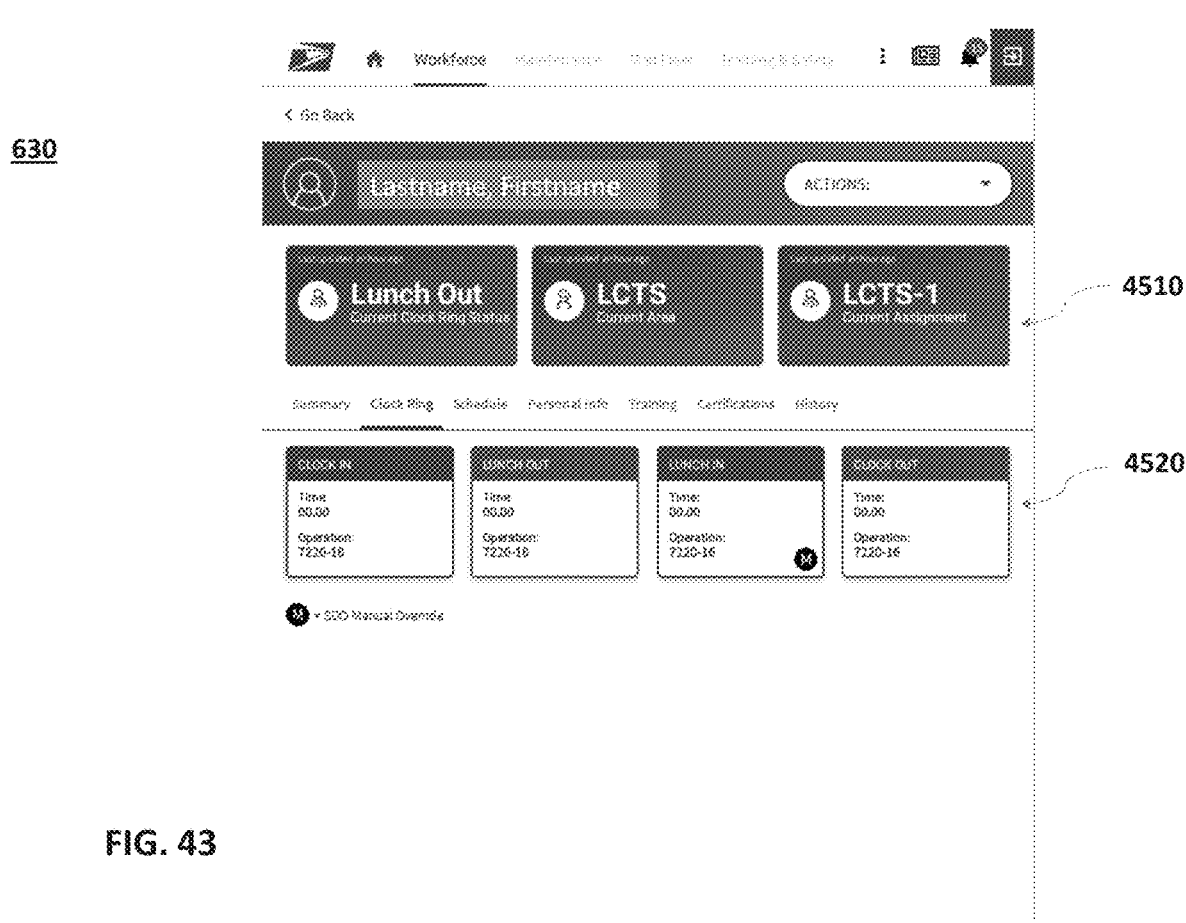
FIG. 43 illustrates an example image data or screenshot displayed in the user interface of the supervisor terminal showing a workforce/clock ring page according to some embodiments.

FIG. 43 illustrates an example image data or screenshot displayed in the user interface 630 of the supervisor terminal 320 showing a workforce/clock ring page according to some embodiments. The workforce/clock ring page of FIG. 43 may include a tile section 4510 and a clock ring section 4520. The tile section 4510 may show head counts of scheduled, on the clock, and needed staff members. The tile section 4510 may also allow the supervisor 510 to see detailed breakdowns, for example, by tapping each tile. The clock ring section 4520 may allow the supervisor 510 to have an auditable view of clock rings noting manually updated entries.

Figure 44:
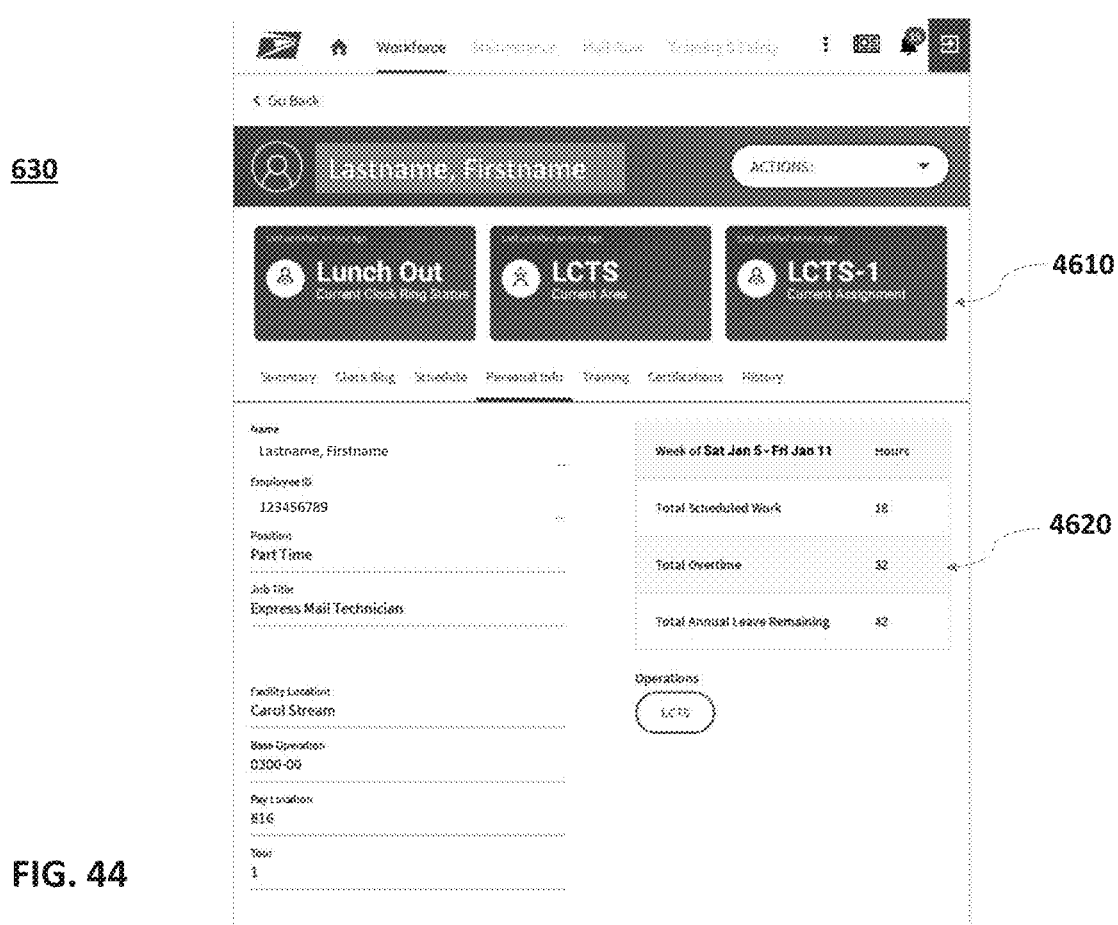
FIG. 44 illustrates another example image data or screenshot displayed in the user interface of the supervisor terminal showing the workforce/clock ring page according to some embodiments.

FIG. 44 illustrates another example image data or screenshot displayed in the user interface 630 of the supervisor terminal 320 showing the workforce/clock ring page according to some embodiments. The workforce/clock ring page of FIG. 44 may include a tile section 4610 and a personal info section 4620. The tile section 4610 may be the same as the tile section 4510. The personal info section 4620 may allow the supervisor 510 to have an overview of staff personal information and hours by type (e.g., total scheduled work hours, total overtime hours or total annual leave remaining hours).

User Interface—Item Processing/Workforce/Item Processing Overview

Figure 45:
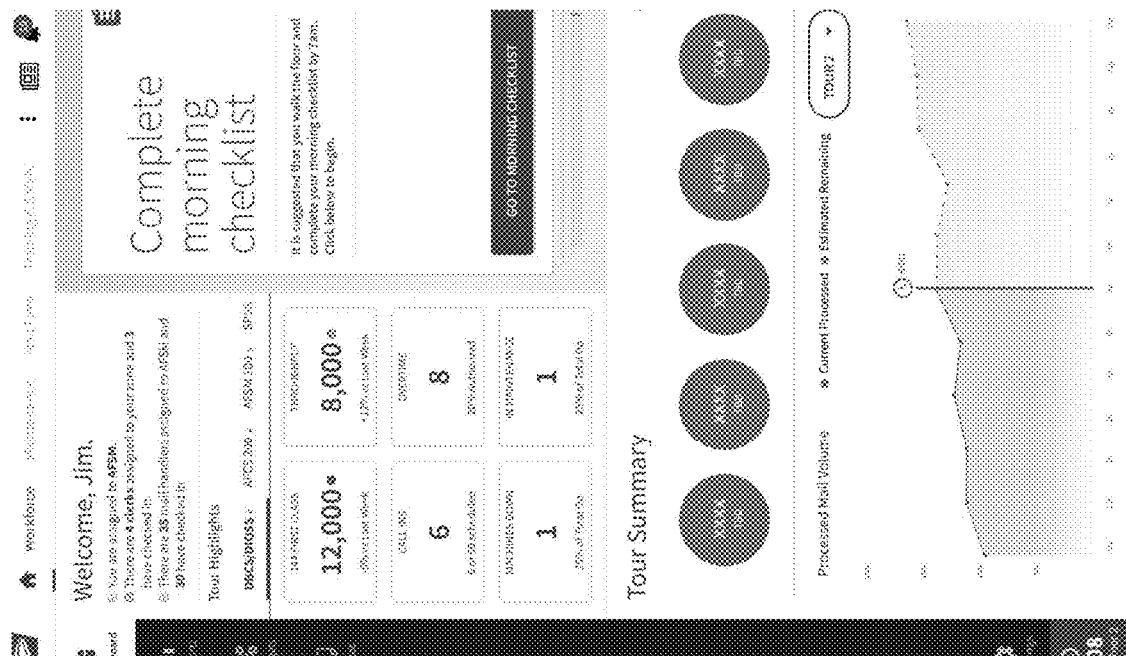
FIG. 45 illustrates an example image data or screenshot displayed in the user interface of the supervisor terminal showing a workforce/mail processing overview page according to some embodiments.

FIG. 45 illustrates an example image data or screenshot displayed in the user interface 630 of the supervisor terminal 320 showing a workforce/mail processing overview page according to some embodiments. The workforce/mail processing overview page may allow the supervisor 510 to navigate through the maintenance, workforce, mail flow, or training and safety screens of the mail processing activities so that she or he can view detailed information about those screens. The workforce/mail processing overview page may also include a link moving to the morning checklist page relating to customer service (e.g., see FIGS. 13A and 13B).

The workforce/mail processing overview page may also allow the supervisor 510 to navigate to the workforce module using the main navigation link so that he or she can view employee status and availability, mail processing across the operations, along with reports and dashboards specific to their operation, unit and/or area. The workforce/mail processing overview page may further allow the supervisor 510 to navigate to available feature containers within each module via a secondary navigation bar so that he or she can view different pieces of module functionality as they are developed and made available. The workforce/mail processing overview page may further allow the supervisor 510 to view his or her user profile so that the supervisor 510 can change his or her personal settings. The workforce/mail processing overview page may further allow the supervisor 510 to display the time left in his or her tour so that he or she can manage the mail volume to meet service commitments and complete all of the required paperwork before the end of their shift. The tour may be 8 hours, but could be longer or shorter than 8 hours. The countdown may not be pegged to specific tour rules, and battery optimizations may not be included.

The workforce/mail processing overview page may further allow the supervisor 510 to view where he or she is assigned so that the supervisor 510 knows his or her responsibilities for the day. The workforce/mail processing overview page may further allow the supervisor 510 to view how many clerks are assigned to his or her zone and their check-in status so that the supervisor 510 knows how many clerks he or she has on hand now and determines if the supervisor 510 needs to ask other supervisors to send him or her more clerks. The workforce/mail processing overview page may further allow the supervisor 510 to view how many mail-handlers are assigned to his or her zone and their check-in status so that the supervisor 510 knows how many mail handlers he or she has on hand now and determines if the supervisor 510 needs to ask other supervisors to send him or her more mail handlers. The workforce/mail processing overview page may further allow the supervisor 510 to view real-time data on a processed first class mail volume, so that he or she can determine if additional resources are needed.

The workforce/mail processing overview page may further allow the supervisor 510 to view real-time data on a processed TPF (total pieces fed)/OPER (operation number) mail volume, so the supervisor 510 can forecast how much mail he or she can run for the tour, decide if he or she needs to cover lunch breaks based on operational efficiency, and/or if maintenance needs to be called to assess an issue with the machines. The workforce/mail processing overview page may further allow the supervisor 510 to view the processed TPF/OPER mail volume variance from the same day last week, so that the supervisor 510 can assess if the machines are performing above or below their average.

The workforce/mail processing overview page may further allow the supervisor 510 to view real-time data on the total number of call-ins, so that the supervisor 510 can determine if additional resources are needed. The workforce/mail processing overview page may further allow the supervisor 510 to view current throughput and mail volume so that the supervisor 510 can determine if more resources are needed for the operation. The workforce/mail processing overview page may further allow the supervisor 510 to view the current throughput and see the variance from the same day last week so that the supervisor 510 can see what the projected clearance time would be. The workforce/mail processing overview page may further allow the supervisor 510 to have a checklist that reminds him or her what daily actions need to take place and at what time of day, so that the supervisor 510 can remain compliant with company procedures.

Figure 46:
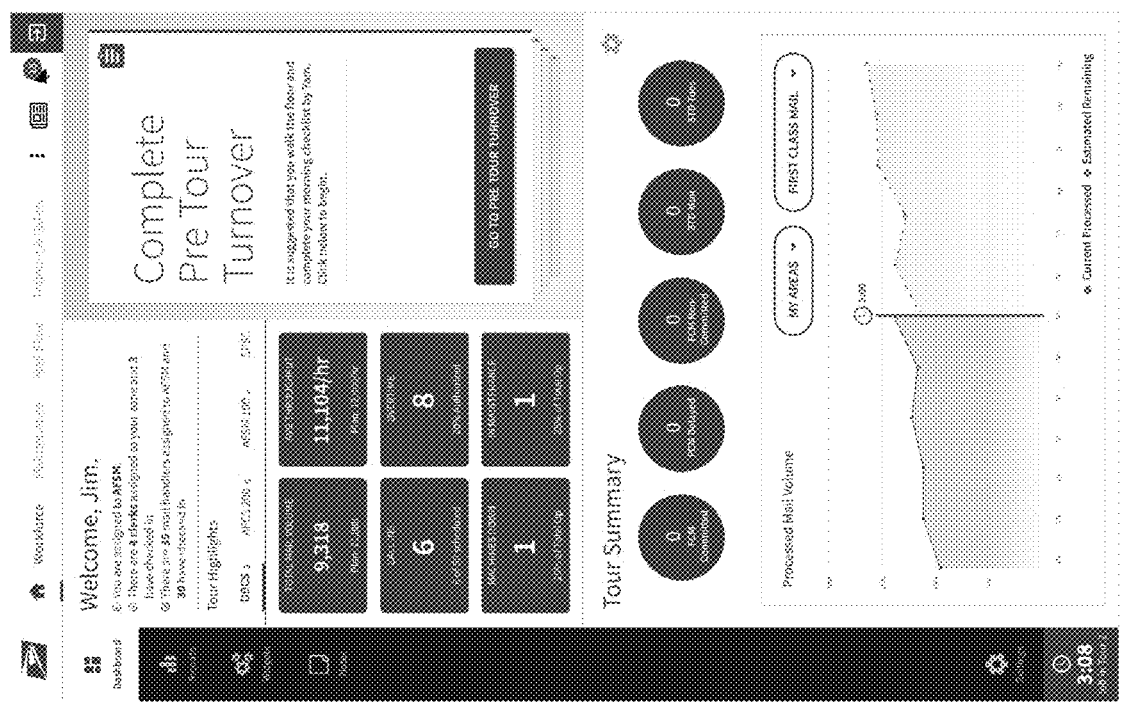
FIG. 46 illustrates another example image data or screenshot displayed in the user interface of the supervisor terminal showing the workforce/mail processing overview page according to some embodiments.

FIG. 46 illustrates another example image data or screenshot displayed in the user interface 630 of the supervisor terminal 320 showing the workforce/mail processing overview page according to some embodiments. The workforce/mail processing overview page of FIG. 46 may allow the supervisor 510 to view more representative data, so that he or she can have an experience that more accurately reflects his or her workday. Compared to the workforce/mail processing overview page of FIG. 45, the workforce/mail processing overview page of FIG. 46 shows some updated information in the total mail volume section, the throughput/average throughput section and the tour summary section.

User Interface—Item Processing/Workforce/Dashboard Status

Figure 47:
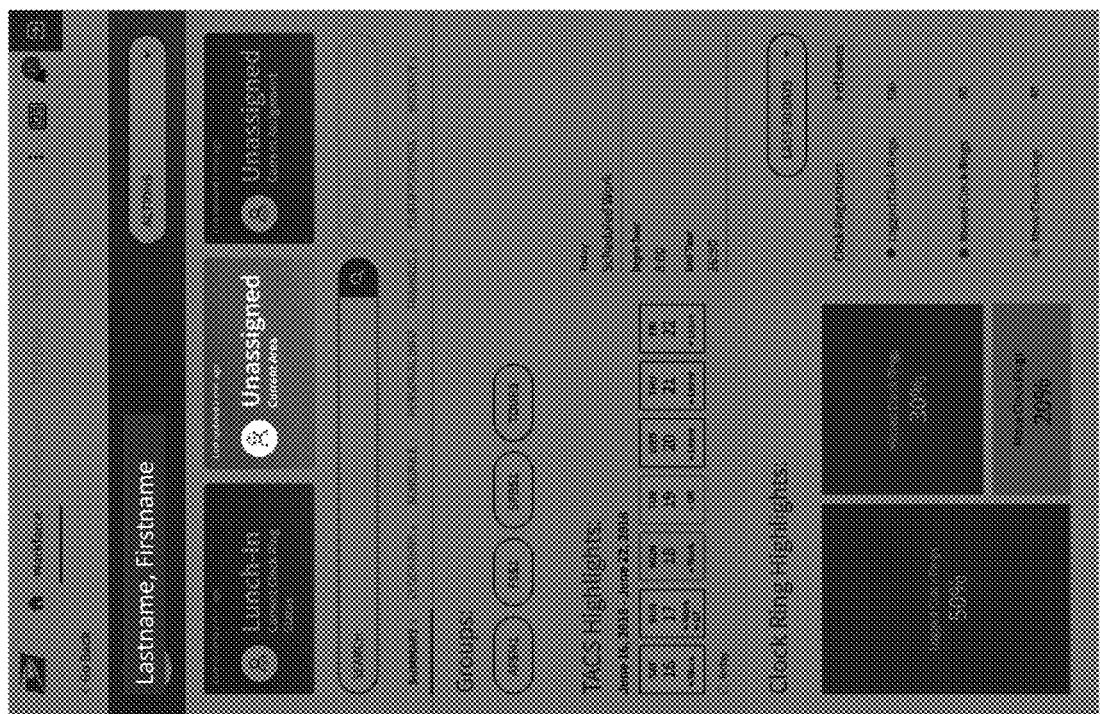
FIG. 47 illustrates an example image data or screenshot displayed in the user interface of the supervisor terminal showing a workforce/dashboard status page according to some embodiments.

FIG. 47 illustrates an example image data or screenshot displayed in the user interface 630 of the supervisor terminal 320 showing a workforce/dashboard status page according to some embodiments. The workforce/dashboard status page may allow the supervisor 510 to view an employee's current area or current assignment, so that he or she may know which area they are assigned to or unassigned and where to locate them. The workforce/dashboard status page may also allow the supervisor 510 to view a list of groups associated with an employee, so that he or she may know which areas of operation they are assigned to. The workforce/dashboard status page may further allow the supervisor 510 to view a weekly highlight of an employee's TACS, so that he or she may know which days the employee may be scheduled for work or on scheduled PTO. The workforce/dashboard status page may further allow the supervisor 510 to view a highlight of an employee's past clock rings so that he or she can quickly see how many times the employee has successfully logged in/out, missed logging in/out, and moved to different areas.

The workforce/dashboard status page may further allow the supervisor 510 to create a component to display highlights in a treemap. The workforce/dashboard status page may further allow the supervisor 510 to display clock ring events as a table including, for example, the name of the event type, the number of events and the number of events displayed descending. The workforce/dashboard status page may further allow the supervisor 510 to create representative data for an employee's clock ring activity. The workforce dashboard/status page may further allow the supervisor 510 to create a reusable container using a tab UI to filter a data set for employee profile. The tab menu may include at least one of the following: summary, clock ring, schedule, personal info, training, certifications and history.

Figure 48:
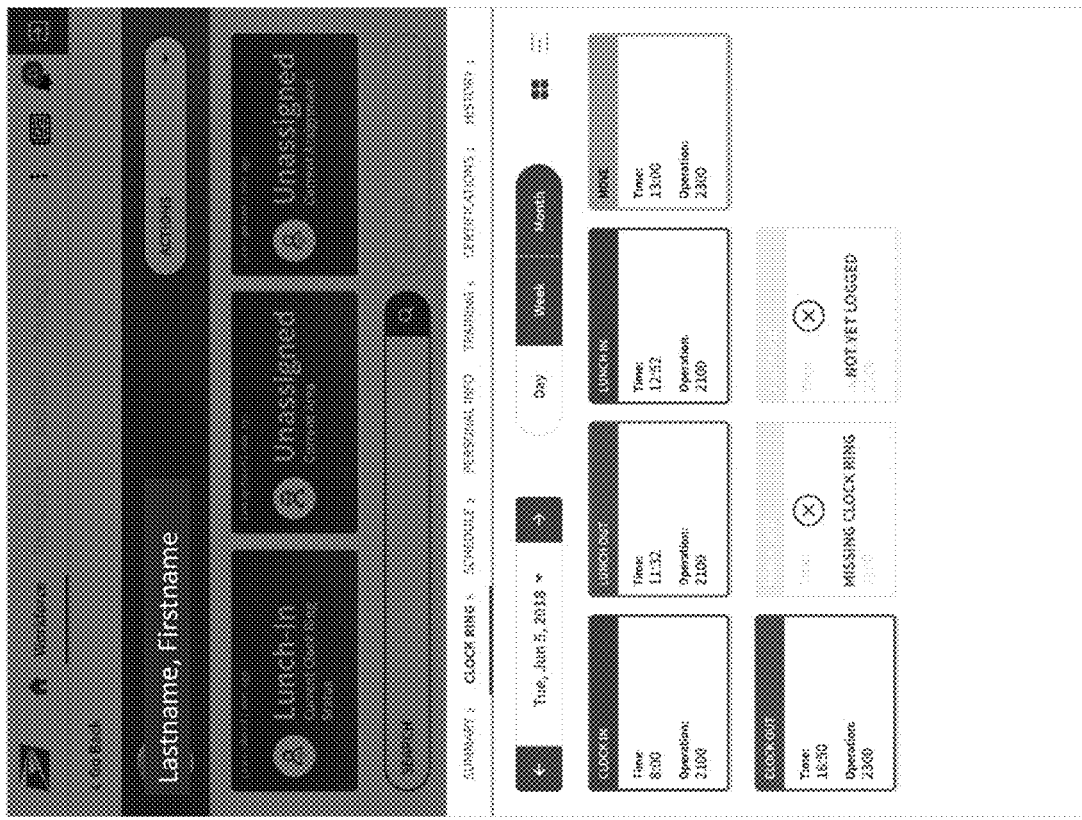
FIG. 48 illustrates another example image data or screenshot displayed in the user interface of the supervisor terminal showing the workforce/dashboard status page according to some embodiments.

FIG. 48 illustrates another example image data or screenshot displayed in the user interface 630 of the supervisor terminal 320 showing the workforce/dashboard status page of the server 310 according to some embodiments. The workforce/dashboard status page of FIG. 48 may allow the supervisor 510 to view an employee's clock ring for today's date, so that he or she is aware of an employee's status throughout the day. The workforce/dashboard status page of FIG. 48 may further allow the supervisor 510 to create a reusable component for displaying clock ring status and other card-based UI elements. There may be 5 clock ring states: clock in, lunch out, lunch in, clock out and move (e.g., moving to a different operation). Other states may include missing and not logged yet. The workforce/dashboard status page of FIG. 48 may further allow the supervisor 510 to view an employee's current clock ring status, so that he or she may know their most recent clock status change. The workforce/dashboard status page of FIG. 48 may further allow the supervisor 510 to create a data service to retrieve clock ring status for display. The clock ring status may be retrieved via employee ID.

User Interface—Item Processing/Workforce/Time Clock

Figure 49:
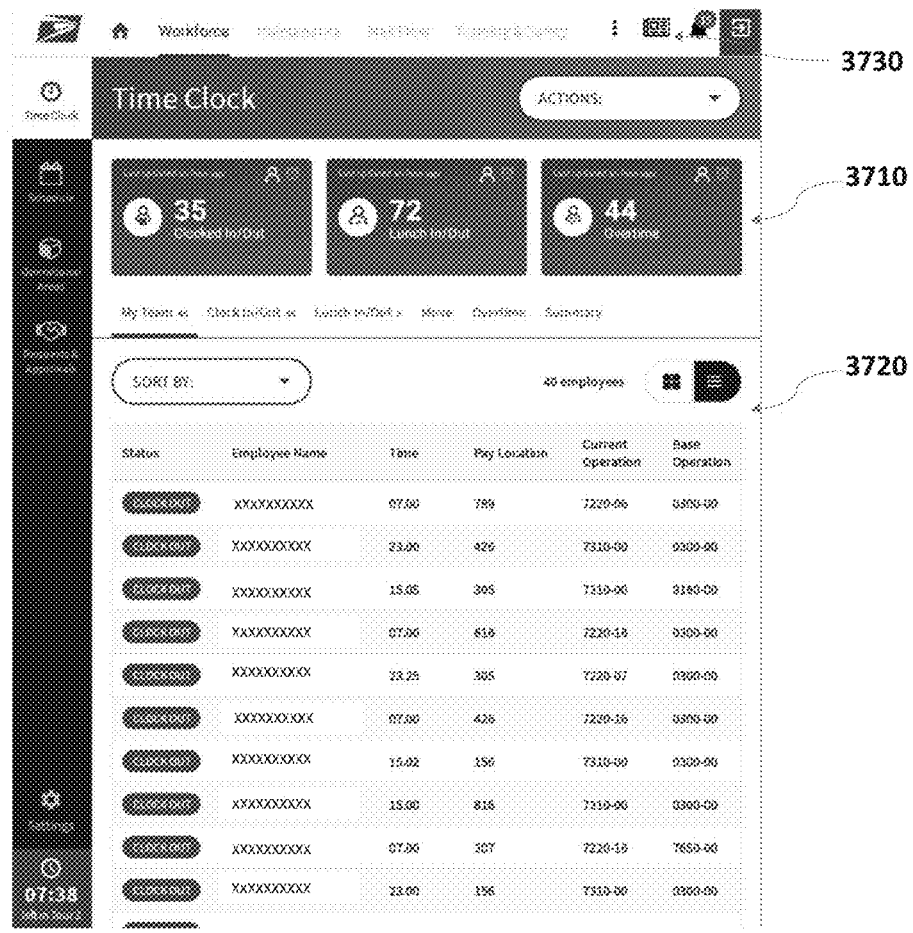
FIG. 49 illustrates an example image data or screenshot displayed in the user interface of the supervisor terminal showing a workforce/time clock page according to some embodiments.

FIG. 49 illustrates an example image data or screenshot displayed in the user interface 630 of the supervisor terminal 320 showing a workforce/time clock page according to some embodiments. The workforce/time clock page of FIG. 49 may include a tile section 3710 and a "my team" section 3720. The tile section 3710 may show a head count of staff members (including carriers) who are clocked in or out, lunch in or out, or overtime. The tile section 3710 may also allow the supervisor 510 to see detailed breakdowns, for example, by tapping on each tile. The "my team" section 3720 may include overtime status, assignment, current operation, pay location and clock ring time stamp. These items may be sortable. The "my team" section 3720 may also allow the supervisor 510 to switch view to list, for example, by tapping on a switching icon 3730 on the top right corner.

Figure 50:
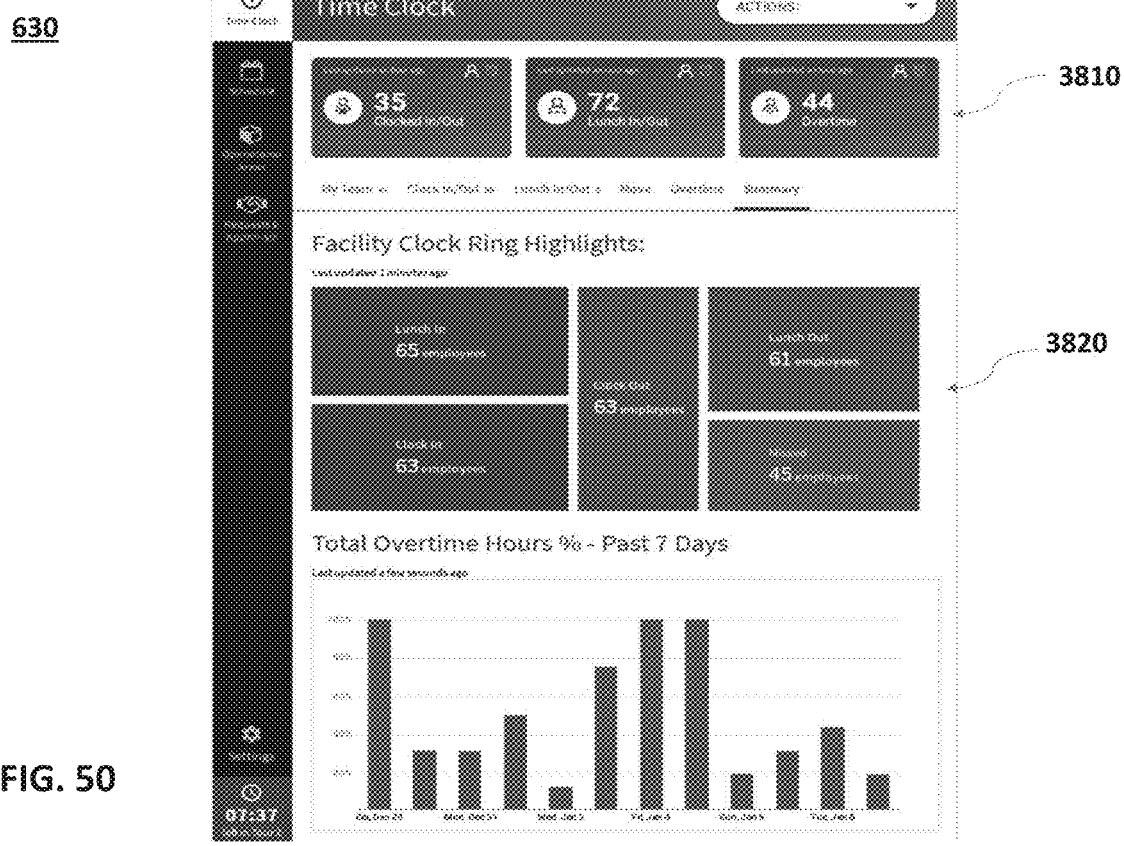
FIG. 50 illustrates another example image data or screenshot displayed in the user interface of the supervisor terminal showing the workforce/time clock page according to some embodiments.

FIG. 50 illustrates another example image data or screenshot displayed in the user interface 630 of the supervisor terminal 320 showing the workforce/time clock page according to some embodiments. The workforce/time clock page of FIG. 50 may include a tile section 3810 and a summary section 3820. The tile section 3810 may be the same as the tile section 3710 of FIG. 49. The summary section 3820 may allow the supervisor 510 to view facility clock ring counts for active and available staff members and a summary of overtime hours clocked in the last seven days.

Figure 51:
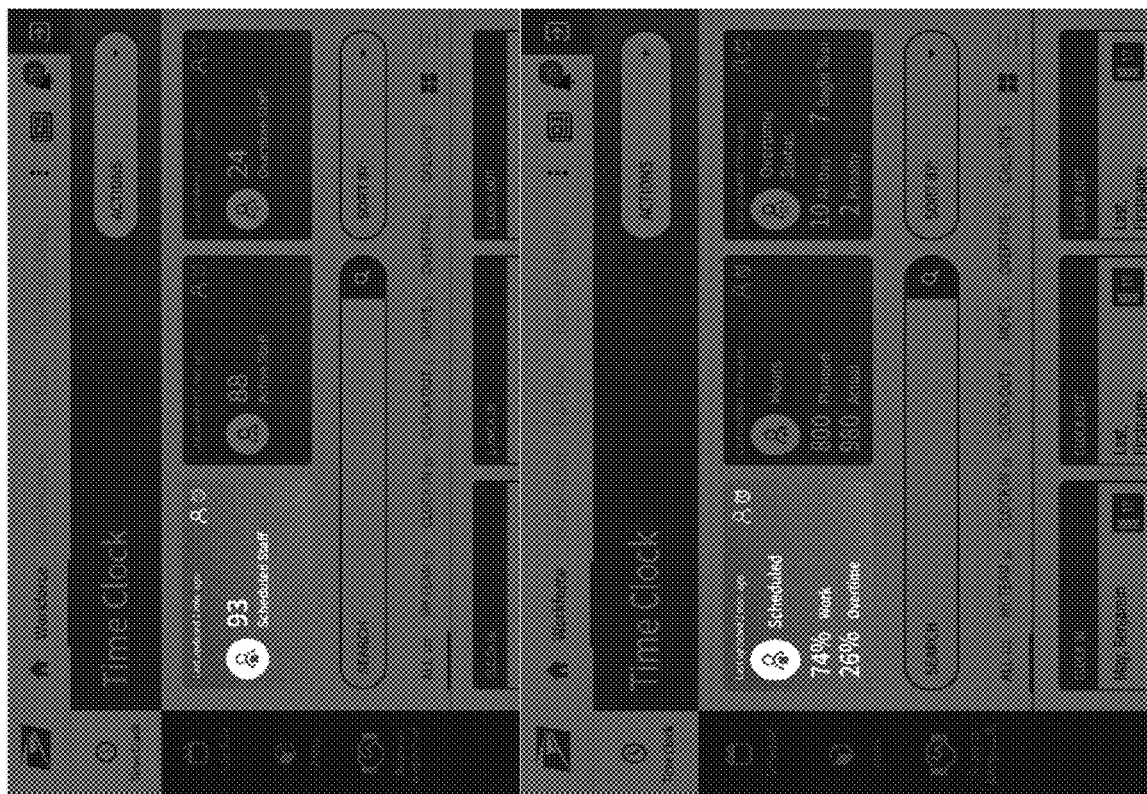
FIG. 51 illustrates another example image data or screenshot displayed in the user interface of the supervisor terminal showing the workforce/time clock page according to some embodiments.

FIG. 51 illustrates another example image data or screenshot displayed in the user interface 630 of the supervisor terminal 320 showing a workforce/time clock page according to some embodiments. The workforce/time clock page of FIG. 51 may allow the supervisor 510 to view the total number of employees for, for example, both USPS and flexible workforce who are scheduled for work so that he or she can compare it to the number of employees who are actually active and determine if staffing adjustments are needed, not only for today but can look at the schedule ahead and plan in advance with management for coverage when needed on a later date. The workforce/time clock page of FIG. 51 may also allow the supervisor 510 to view the total work hours of all scheduled employees for, for example, both USPS and flexible workforce so that he or she can compare it to the total active hours and determine if staffing adjustments are needed as well as compare it against the total number of mail run to measure a total productivity of man hours vs processed mail.

The workforce/time clock page of FIG. 51 may further allow the supervisor 510 to view the total number of employees for, for example, both USPS and flexible workforce who are active so that he or she can compare it to the scheduled number of employees. The workforce/time clock page of FIG. 51 may further allow the supervisor 510 to view the total work hours of all active employees for, for example, both USPS and flexible workforce so that he or she can compare it to the total hours scheduled and determine if staffing adjustments are needed. The workforce/time clock page of FIG. 51 may further allow the supervisor 510 to view the total number of employees for, for example, both USPS and flexible workforce who are working on scheduled overtime so that he or she can determine if staffing adjustments are needed, how many employees do not have a bid and will be flexible in the supervisor's area, and/or can be shared with other supervisors if the supervisor 510 has extra people available.

Figure 52:
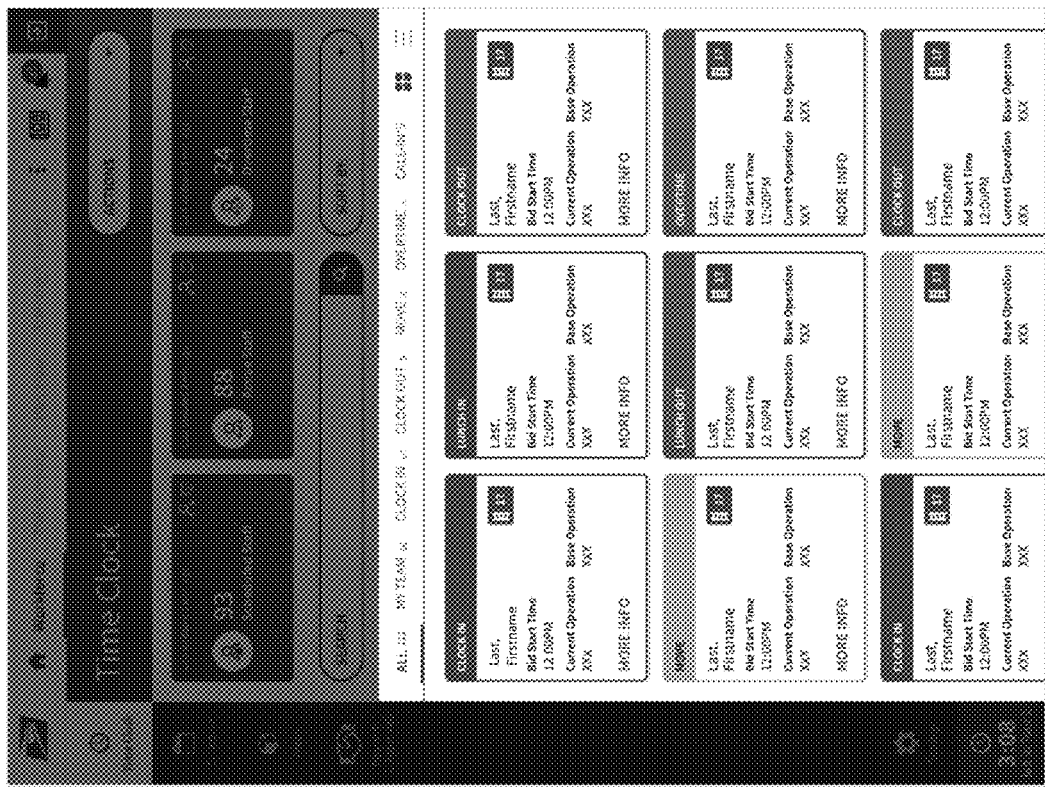
FIG. 52 illustrates another example image data or screenshot displayed in the user interface of the supervisor terminal showing the workforce/time clock page according to some embodiments.

FIG. 52 illustrates another example image data or screenshot displayed in the user interface 630 of the supervisor terminal 320 showing the workforce/time clock page according to some embodiments. The workforce/time clock page of FIG. 52 may allow the supervisor 510 to view a person's name associated with their clock-ring data so that he or she can correlate that data, check a specific employee if they ask the supervisor 510 to see if their badge swiped, and audit a specific employee. The workforce/time clock page of FIG. 52 may also allow the supervisor 510 to view the current status of a USPS or flexible workforce employee's clock-rings (e.g., clock-in, lunch-out, lunch-in, clock-out) data so that he or she can correlate that data and determine that employee's availability.

The workforce/time clock page of FIG. 52 may further allow the supervisor 510 to view an employee's level for, for example, both USPS and flexible workforce of seniority so that he or she can correlate that data and use it for determining overtime selection, higher level selection for qualified mule and fork lift drivers, and the order in which people should be asked about their work preferences if their bid has multiple options such as loading or prepping. The workforce/time clock page of FIG. 52 may further allow the supervisor 510 to view an employee's base operation and current operation so that the supervisor 510 can review and control an employee's productivity. The workforce/time clock page of FIG. 52 may further allow the supervisor 510 to view the employee bid start time so that the supervisor 510 can have a full and specific view into an employee's schedule. The clock ring states may include: clock in (green card), clock out (grey card), lunch out (grey card), lunch in (green card), move (orange/yellow card) and overtime (red card).

Figure 53:
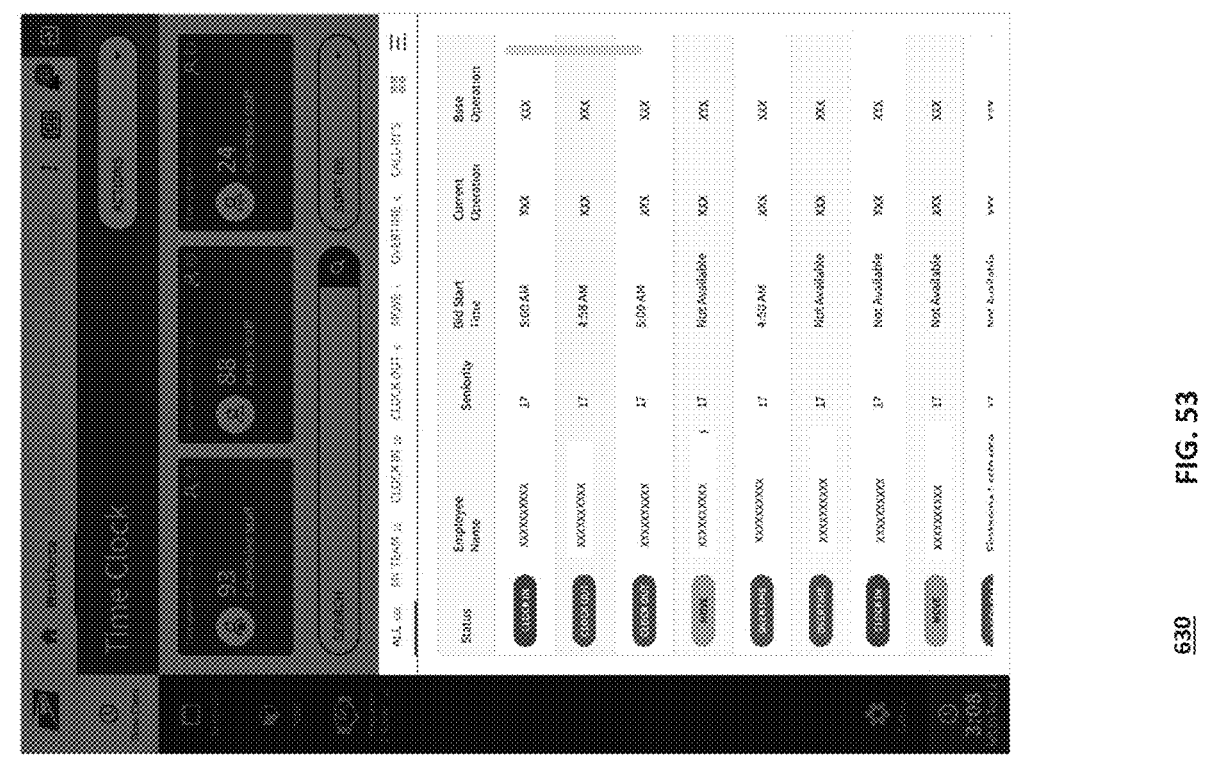

FIG. 53 illustrates another example image data or screenshot displayed in the user interface 630 of the supervisor terminal 320 showing the workforce/time clock page according to some embodiments. The workforce/time clock page of FIG. 53 may allow the supervisor 510 to create a list/table view. The workforce/time clock page of FIG. 53 may include, but not limited to, one or more of clock ring status, employee name, seniority, bid start time, current operation and base operation.

Figure 54:
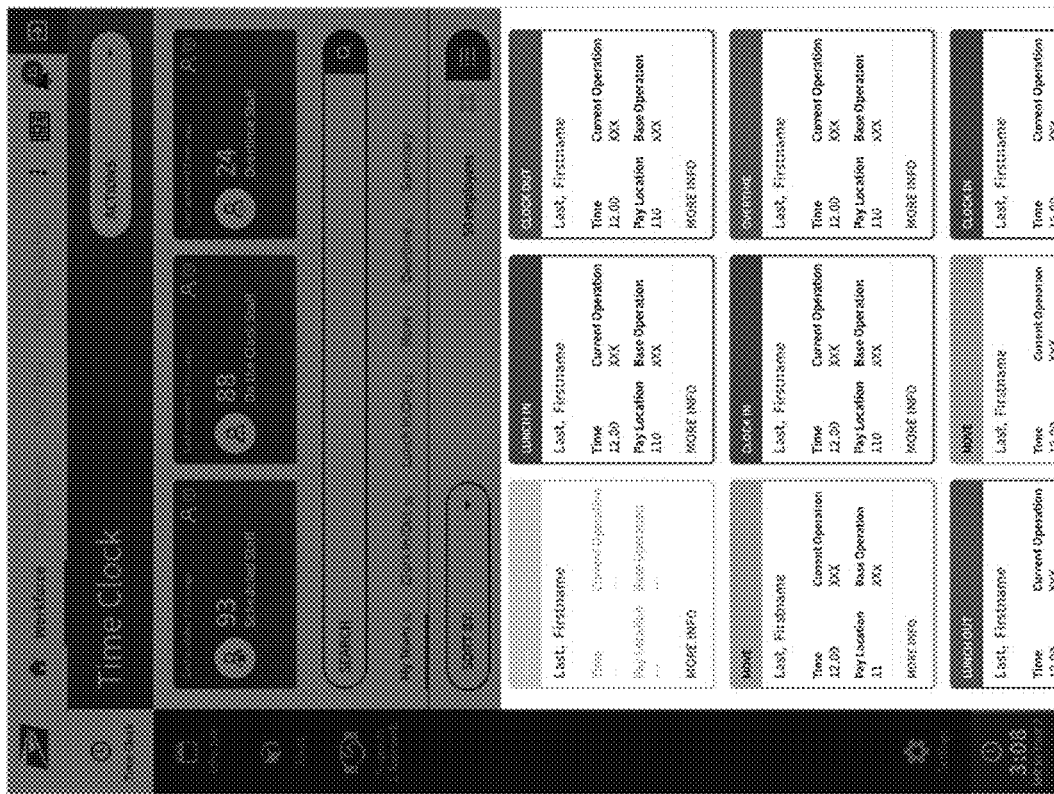
FIG. 54 illustrates another example image data or screenshot displayed in the user interface of the supervisor terminal showing the workforce/time clock page according to some embodiments.

FIG. 54 illustrates another example image data or screenshot displayed in the user interface 630 of the supervisor terminal 320 showing the workforce/time clock page according to some embodiments. The workforce/time clock page of FIG. 54 may allow the supervisor 510 to update a time clock ring (e.g., card component data elements), which may include, but not limited to, one or more of time (e.g., in 100 incremental units—using decimal), pay location (e.g., 3 digits) and current operation and base operation may remain the same.

Figure 55:
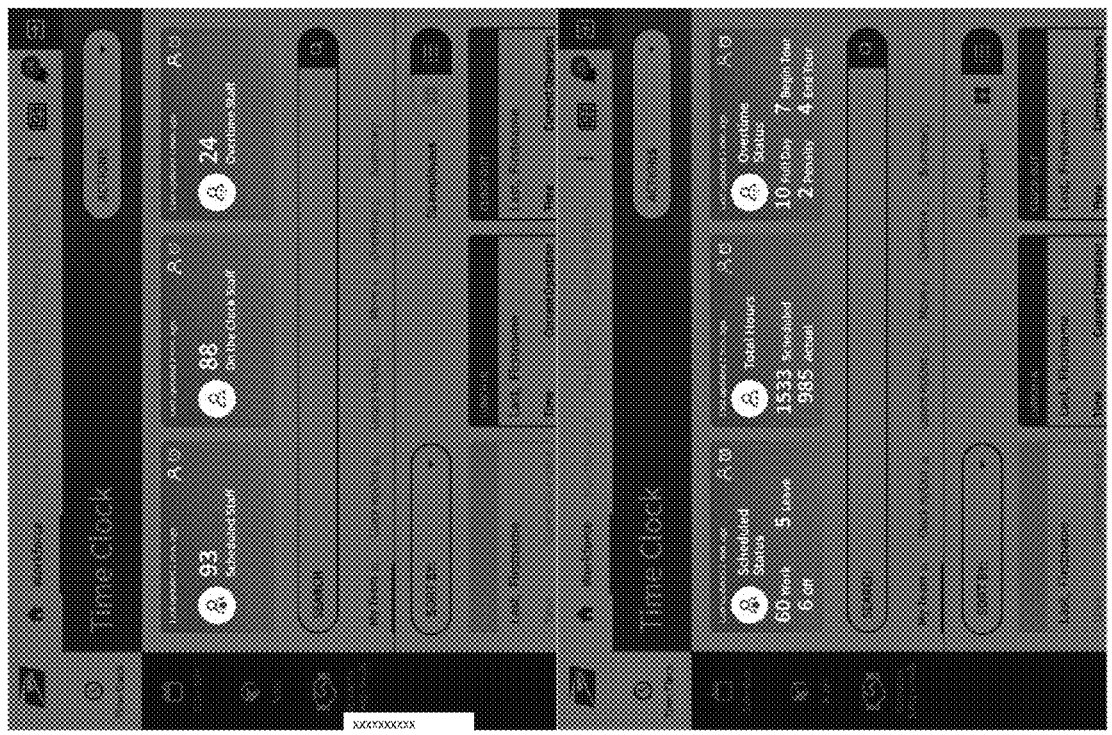
FIG. 55 illustrates another example image data or screenshot displayed in the user interface of the supervisor terminal showing the workforce/time clock page according to some embodiments.

FIG. 55 illustrates another example image data or screenshot displayed in the user interface 630 of the supervisor terminal 320 showing the workforce/time clock page according to some embodiments. The workforce/time clock page of FIG. 55 may allow the supervisor 510 to update time clock widgets to reflect revised designs.

Figure 56:
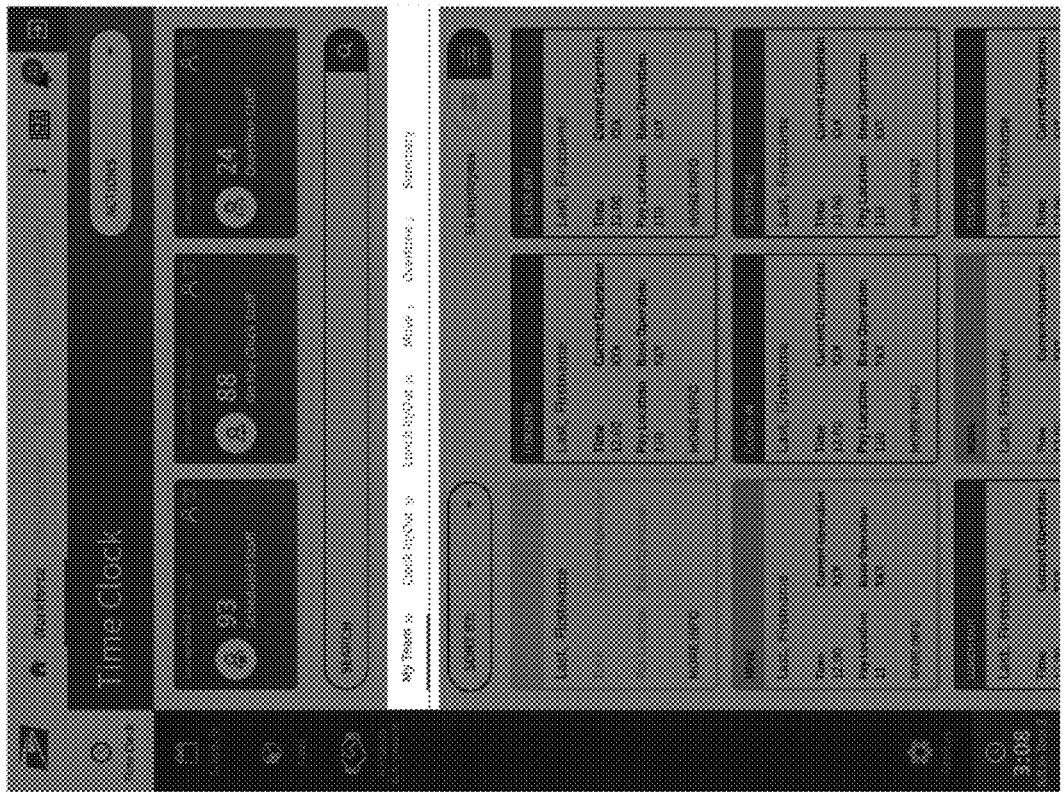
FIG. 56 illustrates another example image data or screenshot displayed in the user interface of the supervisor terminal showing the workforce/time clock page according to some embodiments.

FIG. 56 illustrates another example image data or screenshot displayed in the user interface 630 of the supervisor terminal 320 showing the workforce/time clock page according to some embodiments. The workforce/time clock page of FIG. 56 may allow the supervisor 510 to sort time clock data, so that the supervisor 510 can have a better sense of what he or she needs.

Figure 57:
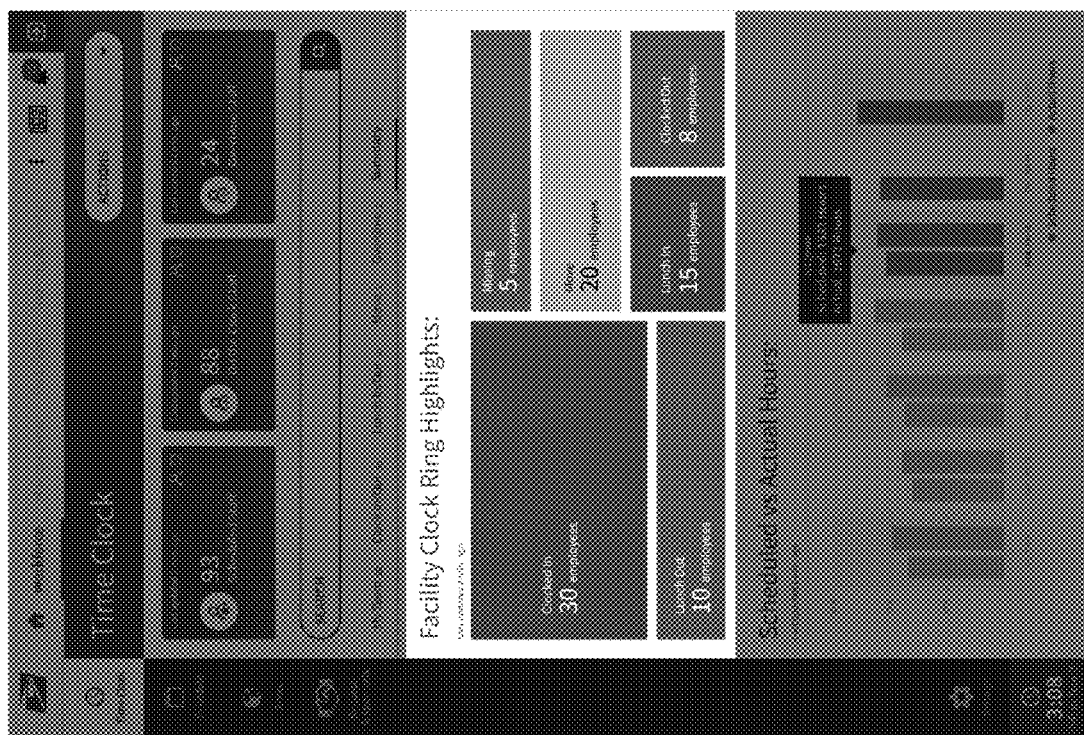
FIG. 57 illustrates another example image data or screenshot displayed in the user interface of the supervisor terminal showing the workforce/time clock page according to some embodiments.

FIG. 57 illustrates another example image data or screenshot displayed in the user interface 630 of the supervisor terminal 320 showing the workforce/time clock page according to some embodiments. The workforce/time clock page of FIG. 57 may allow the supervisor 510 to view a highlight of all the clock rings within the facility so that he or she can see a status overview of all employees scheduled for the day. Data points for the workforce/time clock page of FIG. 57 may include, but not limited to, one or more of clocked in, clocked out, lunch out, lunch in, missing (may encompass missing clock rings as well as missing employees who have not called into to enterprise resource management system (ERMS)) and move. The workforce/time clock page of FIG. 57 may also allow the supervisor 510 to view a chart which displays the current weeks' scheduled hours and actual hours so that the supervisor 501 may know if staff members and supervisors are on target for the day or week.

Figure 58:
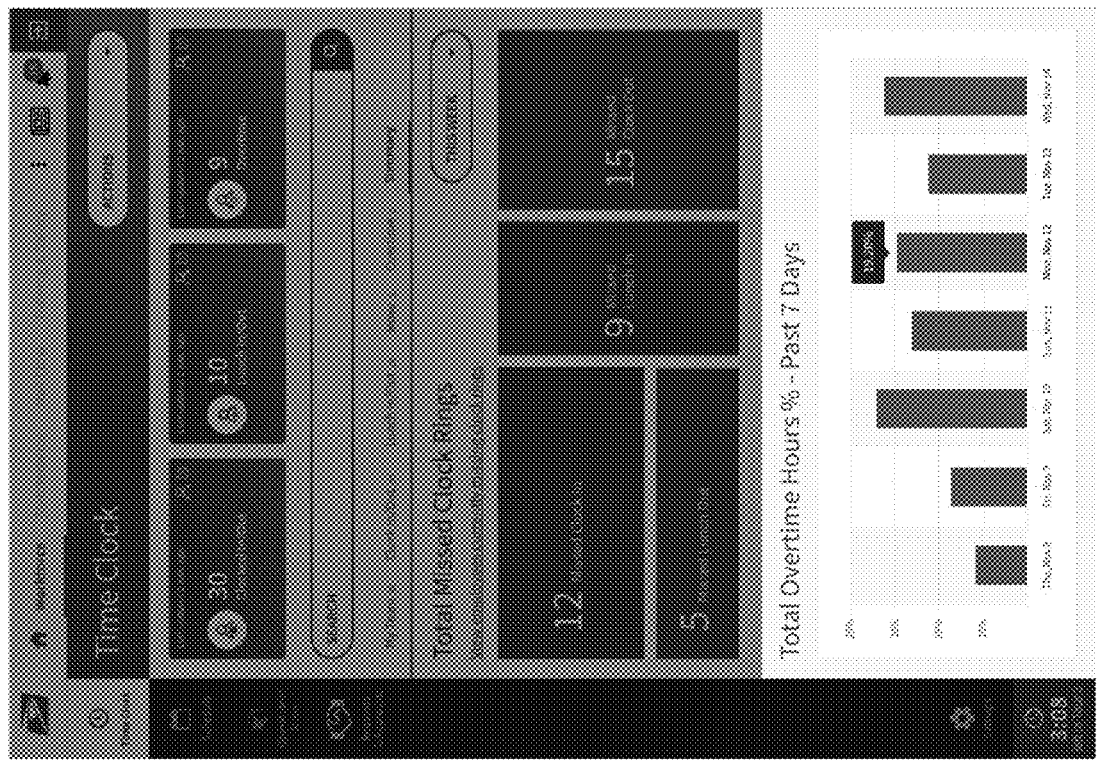
FIG. 58 illustrates another example image data or screenshot displayed in the user interface of the supervisor terminal showing the workforce/time clock page according to some embodiments.

FIG. 58 illustrates another example image data or screenshot displayed in the user interface 630 of the supervisor terminal 320 showing the workforce/time clock page according to some embodiments. The workforce/time clock page of FIG. 58 may allow the supervisor 510 to create a bar chart displaying the total overtime hours based on percentage.

Figure 59:
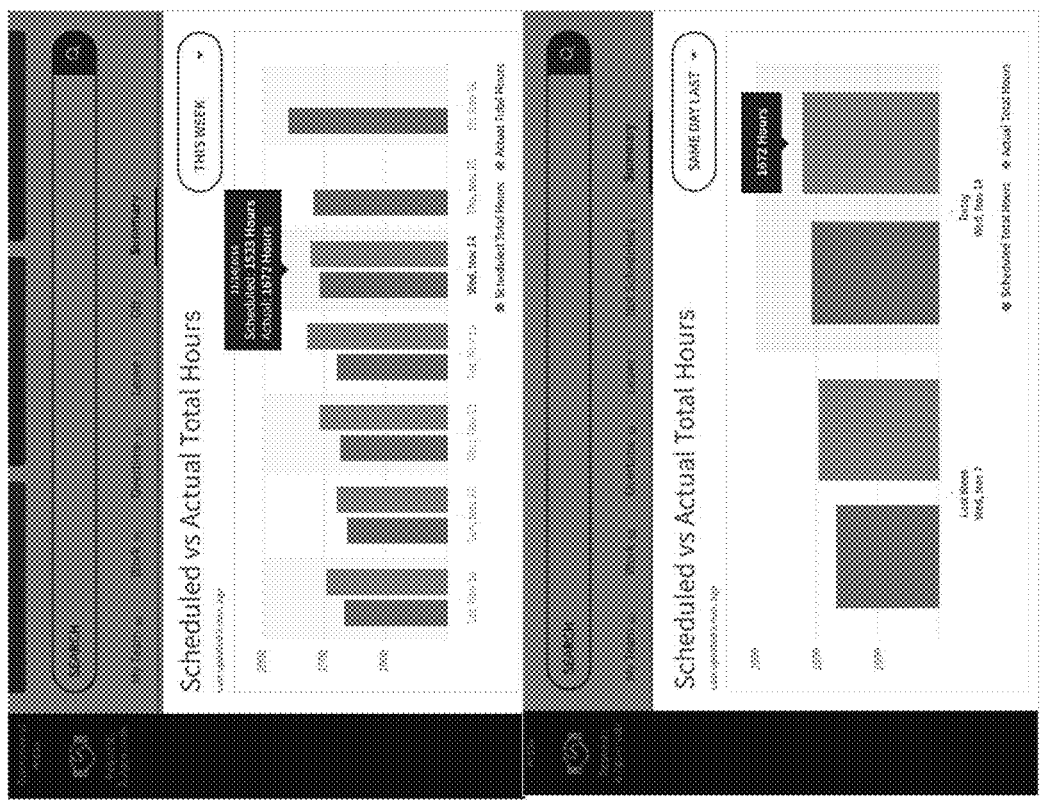
FIG. 59 illustrates another example image data or screenshot displayed in the user interface of the supervisor terminal showing the workforce/time clock page according to some embodiments.

FIG. 59 illustrates another example image data or screenshot displayed in the user interface 630 of the supervisor terminal 320 showing the workforce/time clock page according to some embodiments. The workforce/time clock page of FIG. 59 may allow the supervisor 510 to move scheduled vs actual hours bar chart from the time clock summary tab to the schedules screen summary tab. The workforce/time clock page of FIG. 59 may allow the supervisor 510 to edit a bar chart to include a second view—a comparison chart displaying same day last week and today.

Figure 60:
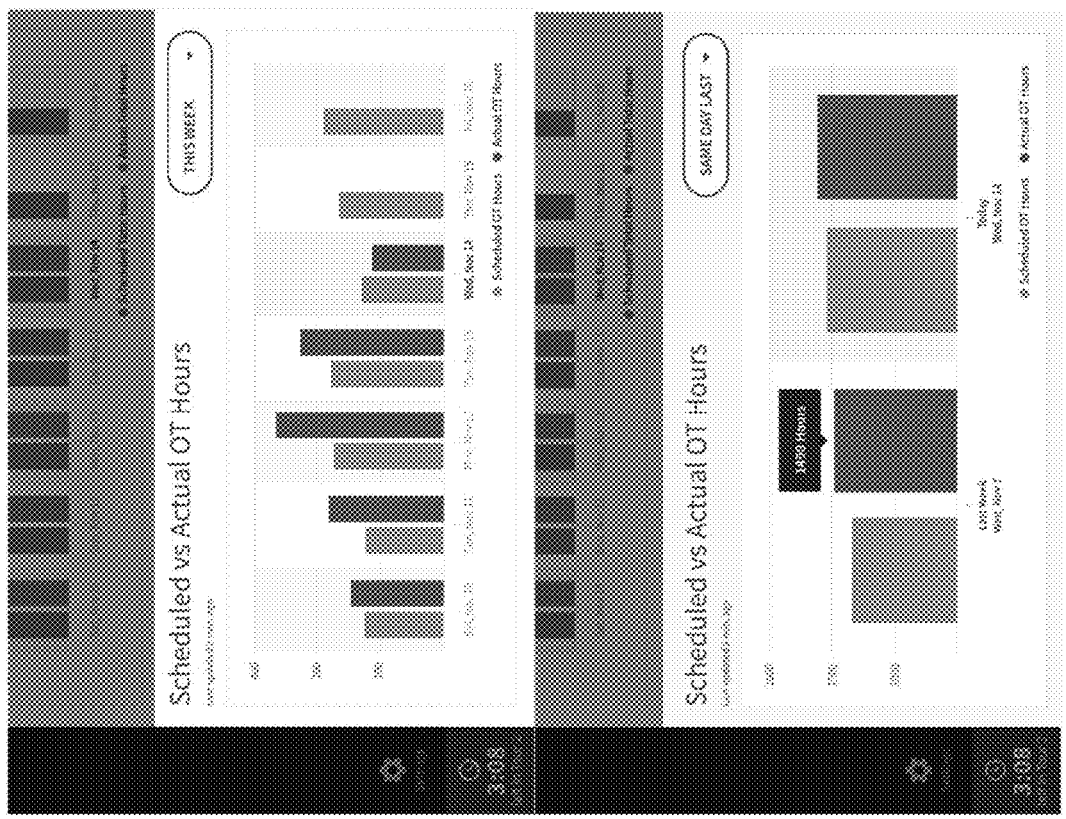
FIG. 60 illustrates another example image data or screenshot displayed in the user interface of the supervisor terminal showing the workforce/time clock page according to some embodiments.

FIG. 60 illustrates another example image data or screenshot displayed in the user interface 630 of the supervisor terminal 320 showing the workforce/time clock page according to some embodiments. The workforce/time clock page of FIG. 60 may allow the supervisor 510 to create a bar chart on a bottom half of the screen to represent scheduled vs actual OT hours. The dropdown menu may include another view—same day last week—displaying a side by side comparison of the same day last week vs today's OT hours.

User Interface—Item Processing/Workforce/Operation Areas

Figure 61:
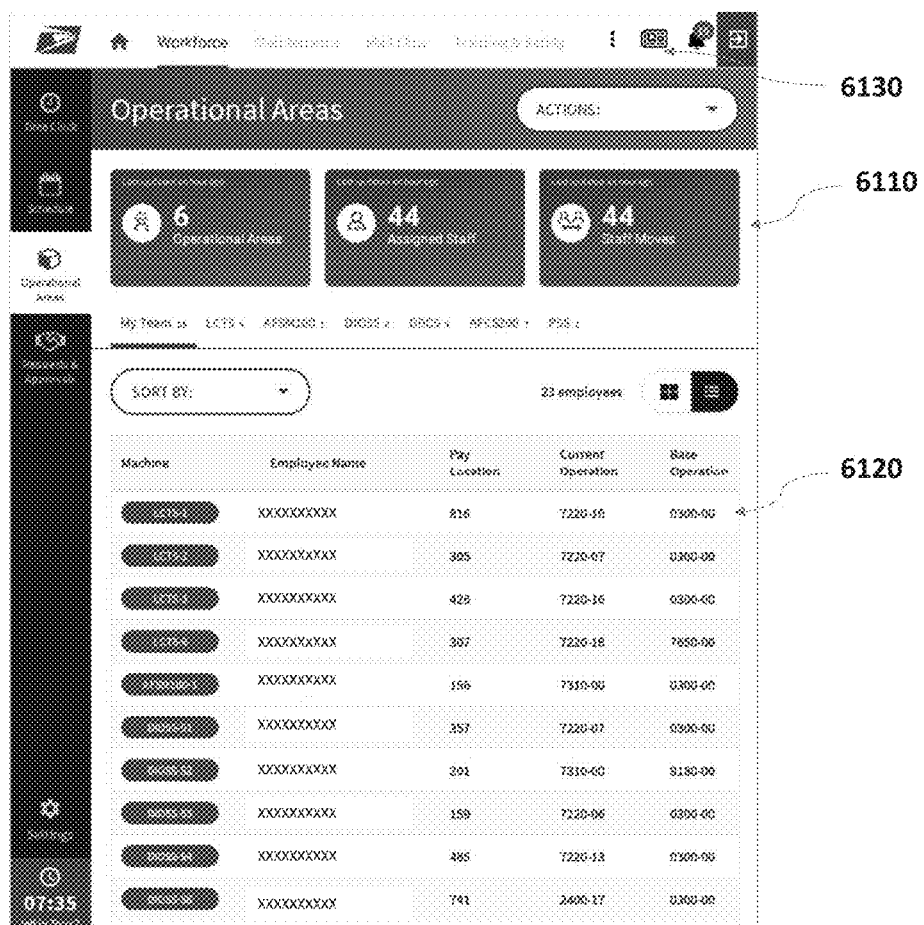
FIG. 61 illustrates an example image data or screenshot displayed in the user interface of the supervisor terminal showing a workforce/operational areas page according to some embodiments.

FIG. 61 illustrates an example image data or screenshot displayed in the user interface 630 of the supervisor terminal 320 showing a workforce/operational areas page according to some embodiments. The workforce/operational areas page may include a tile section 6110 and a "my team" section 6120. The tile section 6110 may show head counts of scheduled, on the clock, and needed staff members. The tile section 6110 may also allow the supervisor 510 to see detailed breakdowns, for example, by tapping on each tile. The "my team" section 6120 may allow the supervisor 510 to view a list of staff assignments across each operation and area-specific machine assignments with, for example, sort program and operation details. The "my team" section 6120 may also allow the supervisor 510 to switch the view of the page to a list, for example, by tapping on a switching icon 6130 on the top right corner.

Figure 62:
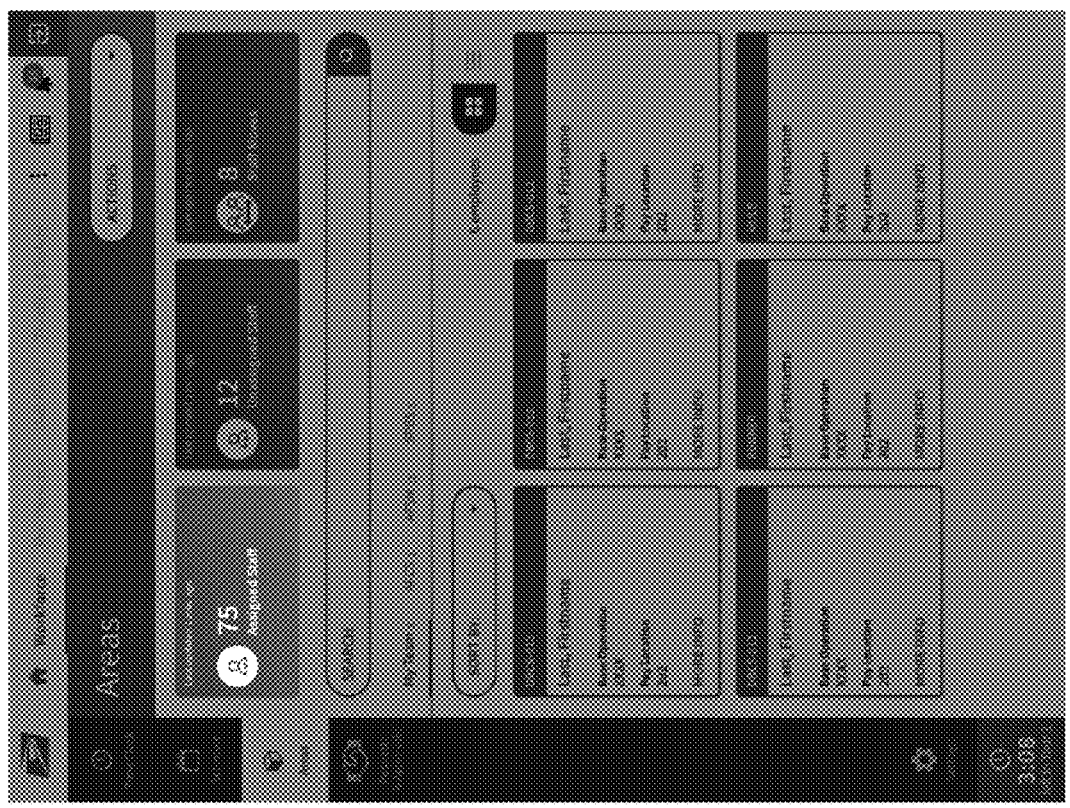
FIG. 62 illustrates another example image data or screenshot displayed in the user interface of the supervisor terminal showing the workforce/operation areas page according to some embodiments.

FIG. 62 illustrates another example image data or screenshot displayed in the user interface 630 of the supervisor terminal 320 showing the workforce/operation areas page according to some embodiments. The workforce/operation areas page of FIG. 62 may allow the supervisor 510 to view the total number of assigned USPS and flexible workforce employees in an area of the facility, so that he or she can determine if his or her resources match the volume of work and the supervisor 510 can see if other supervisors may be overstaffed.

The workforce/operation areas page of FIG. 62 may also allow the supervisor 510 to view how many USPS and flexible workforce employees are listed as unassigned so the supervisor 510 may know how many employees are currently unassigned to any areas, may be available to help in his or her area, or need to be assigned an operation number so that work is accounted for correctly. The workforce/operation areas page of FIG. 62 may further allow the supervisor 510 to view how many USPS and flexible workforce active transfer requests there are so that he or she may know how many employees are being requested to transfer from one area to another.

The workforce/operation areas page of FIG. 62 may further allow the supervisor 510 to sort the list of USPS and flexible workforce employees so he or she can organize the data in a specific view (e.g., alphabetical order, order by craft, pay location, operation number, etc.). The workforce/operation areas page of FIG. 62 may further allow the supervisor 510 to view which USPS and flexible workforce employees are assigned to different units so that he or she can plan and allocate resources as needed. The workforce/operation areas page of FIG. 62 may further allow the supervisor 510 to view an employee's pay location so that he or she may know an employee's work assignment location.

User Interface—Item Processing/Workload Performance

Figure 63:
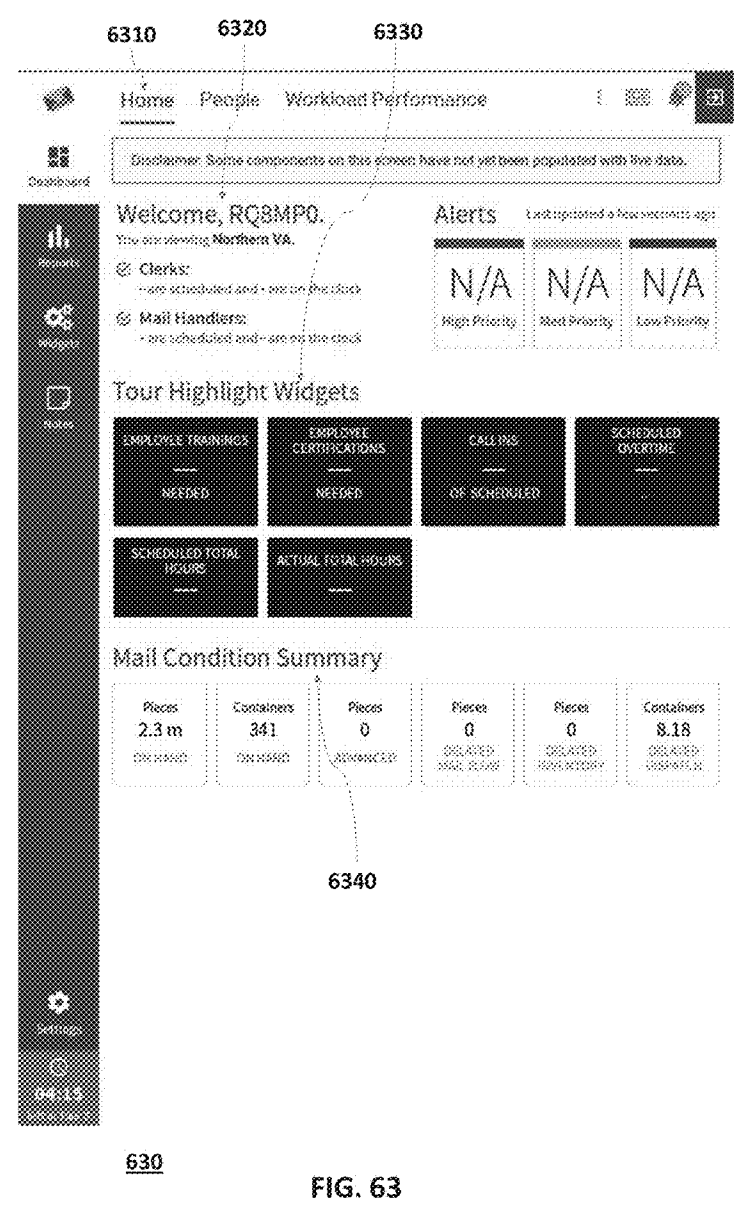

FIG. 63 illustrates an example image data or screenshot displayed in the user interface 630 of the supervisor terminal 320 showing a home screen paw according to some embodiments. The user interface 630 may display the home screen page when the supervisor 510 taps on a home icon 6310. The home screen page may include a welcome message section 6320, a tour highlights widgets section 6330 and a mail condition summary section 6340. The welcome message section 6320 may allow the supervisor 510 to view how many clerks and mail handlers are scheduled and on the clock. The tour highlights widgets section 6330 may allow the supervisor 510 to view dynamic data points based on an assigned operation. The mail condition summary section 6340 may allow the supervisor 510 to view counts of total mail pieces and containers.

Figure 64A:
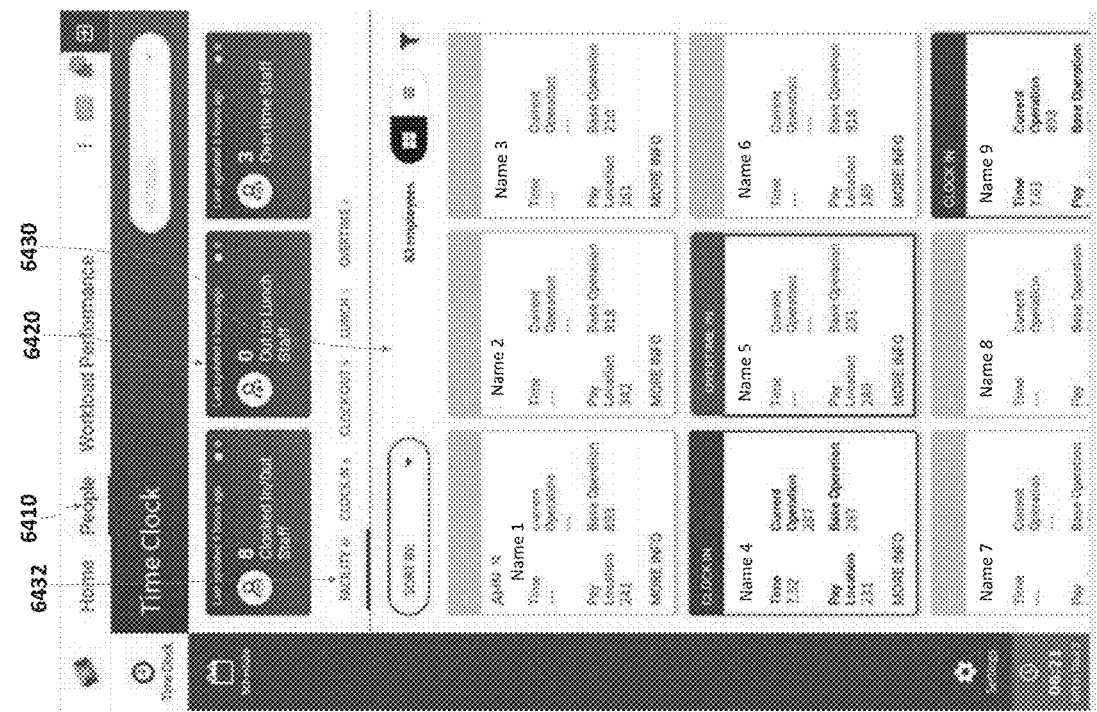
FIG. 64A illustrates an example image data or screenshot displayed in the user interface of the supervisor terminal showing a time clock screen page according to some embodiments.

FIG. 64A illustrates an example image data or screenshot displayed in the user interface 630 of the supervisor terminal 320 showing a time clock screen page according to some embodiments. The user interface 630 may display the time clock screen page when the supervisor 510 taps on a people icon 6410. The time clock screen page may include a time clock tile section 6420 and a time clock grid view section 6430. The time clock screen page may also include one or more sub tabs. FIG. 64A shows that a facility sub tab 6432 is selected. The time clock tile section 6420 may allow the supervisor 510 to view one or more of counts of clocked in/out, out to lunch, or overtime staff. The time clock grid view section 6430 may allow the supervisor 510 to view a sortable grid of one or more of clock-ins/outs featuring a clock ring status, employee names, clock ring stamps, current operation, pay location, or base operation. Different colors may be used to show different states. For example, green may indicate clocked-in, dark gray may indicate clocked-out, light gray may indicate that scheduled staff have not clocked in, and red may indicate overtime. These colors are merely examples, and other colors can also be used.

Figure 64B:
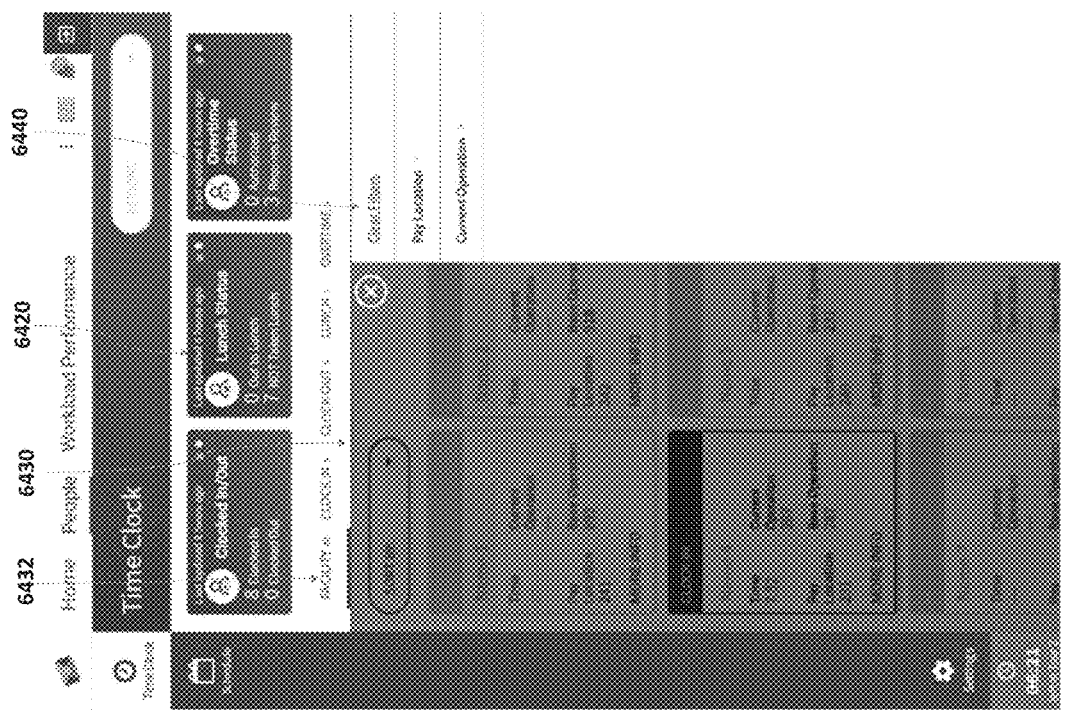
FIG. 64B illustrates another example image data or screenshot displayed in the user interface of the supervisor terminal showing the time clock screen page according to some embodiments.

FIG. 64B illustrates another example image data or screenshot displayed in the user interface 630 of the supervisor terminal 320 showing the time clock screen page according to some embodiments. The time clock screen page may include a filtering icon 6440 that may allow the supervisor 510 to filter the displayed information by pay location and current operation. For example, when the filtering icon 6440 is tapped, the time clock tile section 6420 may provide the supervisor 510 with a detailed view of one or more of scheduled status, staff hours, staff call ins, or no shows, etc. Furthermore, when the filtering icon 6440 is tapped, the time clock grid view section 6430 may allow the supervisor 510 to filter displayed information by pay location and current operation.

Figure 64C:
FIG. 64C illustrates another example image data or screenshot displayed in the user interface of the supervisor terminal showing the time clock screen page according to some embodiments.

FIG. 64C illustrates another example image data or screenshot displayed in the user interface 630 of the supervisor terminal 320 showing the time clock screen page according to some embodiments. FIG. 64C shows that a clock in sub tab 6434 is selected. Selecting the clock in sub tab 6434 may show the time clock information of all employees on the clock. For example, the time clock tile section 6420 of FIG. 64C may provide a detailed view of one or more of scheduled status, staff hours, staff call ins, or no shows. Furthermore, similar to FIG. 64A, the time clock grid view section 6430 may allow the supervisor 510 to view a sortable grid of one or more of clock-ins/outs featuring a clock ring status, employee names, clock ring stamps, current operation, pay location, or base operation.

Figure 64D:
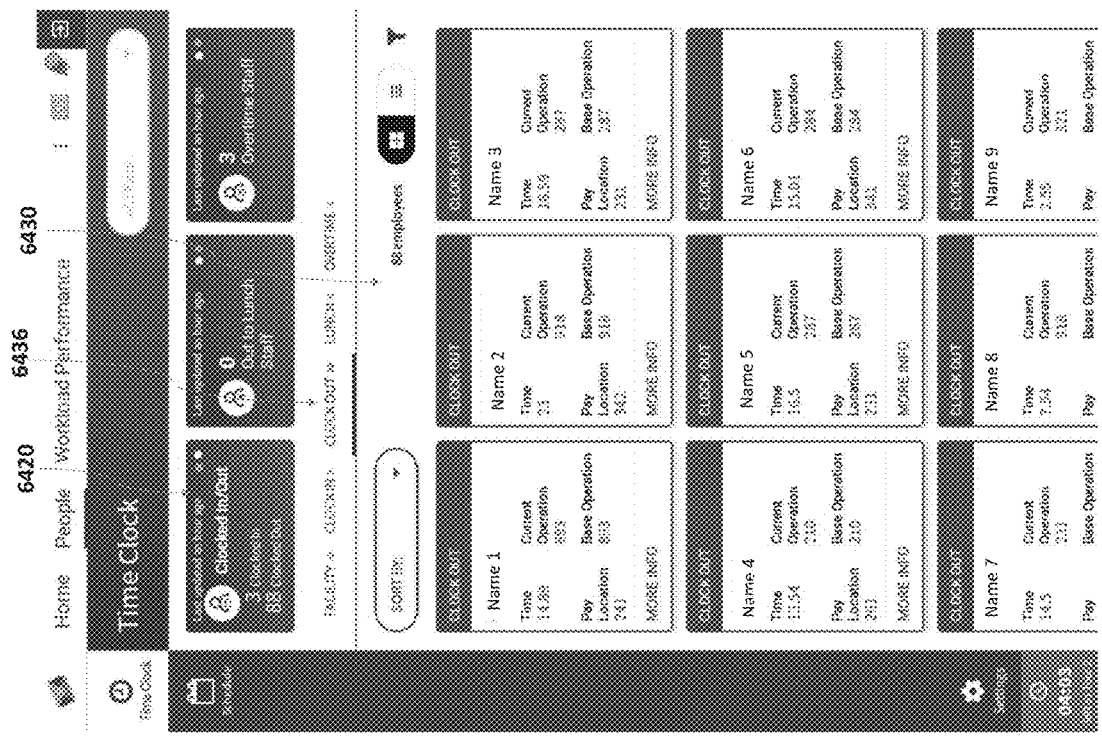
FIG. 64D illustrates another example image data or screenshot displayed in the user interface of the supervisor terminal showing the time clock screen page according to some embodiments.

FIG. 64D illustrates another example image data or screenshot displayed in the user interface 630 of the supervisor terminal 320 showing the time clock screen page according to some embodiments. FIG. 64D shows that a clock out sub tab 6436 is selected. Selecting the clock out sub tab 6436 may show the time clock information of all employees on the clock. For example, the time clock tile section 6420 of FIG. 64D may provide a detailed view of one or more of scheduled status, staff hours, staff call ins, or no shows. Furthermore, similar to FIG. 64A, the time clock grid view section 6430 may allow the supervisor 510 to view a sortable grid of one or more of clock-ins/outs featuring a clock ring status, employee names, clock ring stamps, current operation, pay location, or base operation.

Figure 64E:
FIG. 64E illustrates another example image data or screenshot displayed in the user interface of the supervisor terminal showing the time clock screen page according to some embodiments.

FIG. 64E illustrates another example image data or screenshot displayed in the user interface 630 of the supervisor terminal 320 showing the time clock screen page according to some embodiments. FIG. 64E shows that a lunch sub tab 6438 is selected. Selecting the lunch sub tab 6438 may show the clocked in employees and whether they are out to lunch. For example, the time clock grid view section 6430 may allow the supervisor 510 to view a list of employees not taken lunch and out to lunch.

Figure 64F:
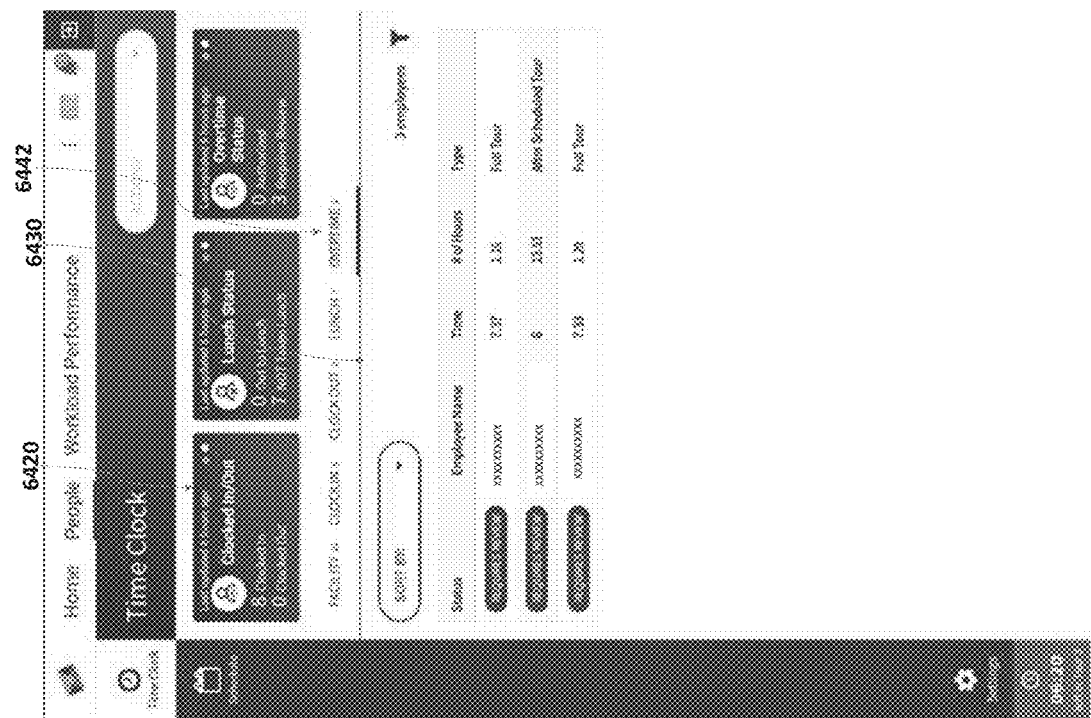
FIG. 64F illustrates another example image data or screenshot displayed in the user interface of the supervisor terminal showing the time clock screen page according to some embodiments.

FIG. 64F illustrates another example image data or screenshot displayed in the user interface 630 of the supervisor terminal 320 showing the time clock screen page according to some embodiments. FIG. 64F shows that an overtime sub tab 6442 is selected. Selecting the overtime sub tab 6442 may show employees working overtime. For example, the time clock grid view section 6430 may allow the supervisor 510 to view a list of employees on overtime showing one or more of their status, name, time, number of hours, or type of overtime.

Figure 65A:
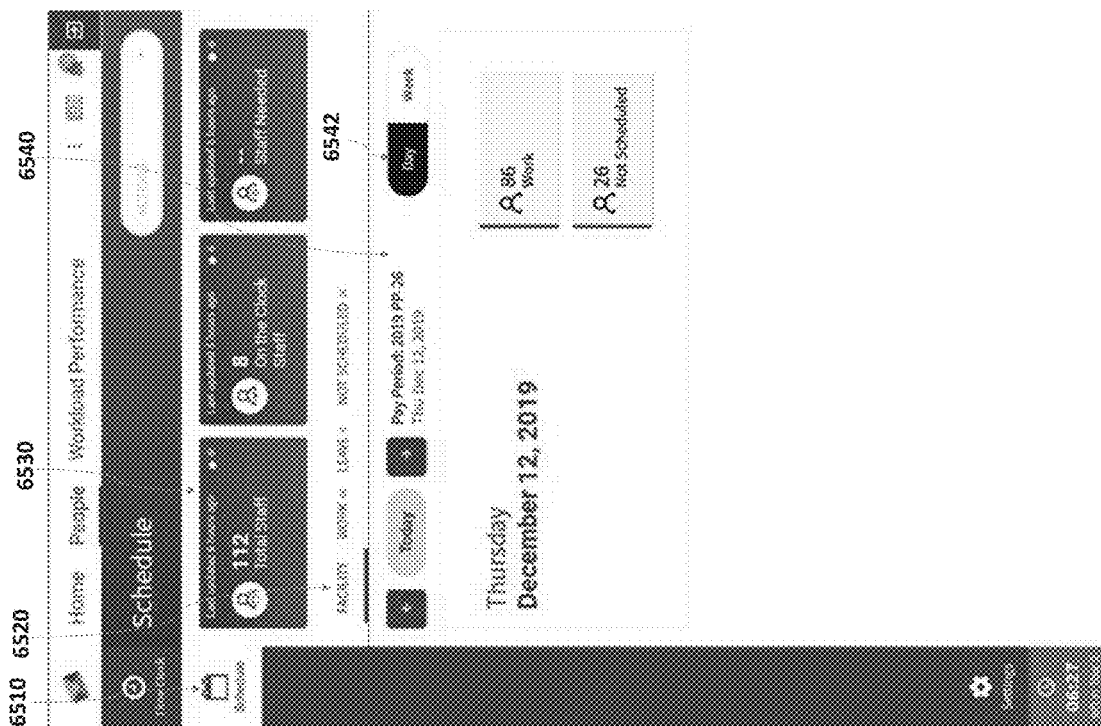
FIG. 65A illustrates an example image data or screenshot displayed in the user interface of the supervisor terminal showing a schedule screen page according to some embodiments.

FIG. 65A illustrates an example image data or screenshot displayed in the user interface 630 of the supervisor terminal 320 showing a schedule screen page according to some embodiments. Selecting the schedule tab 6510 may show a schedule facility screen as shown in FIG. 65A. FIG. 65A shows that a facility sub tab 6520 is selected. The schedule screen page may include a schedule tile section 6530 and a facility section 6540. The schedule tile section 6530 may allow the supervisor 510 to view the counts of scheduled, on the clock and needed staff. The facility section 6540 may provide the supervisor 510 with an overview of employees scheduled and not scheduled by day, when a day tab 6542 is selected.

Figure 65B:
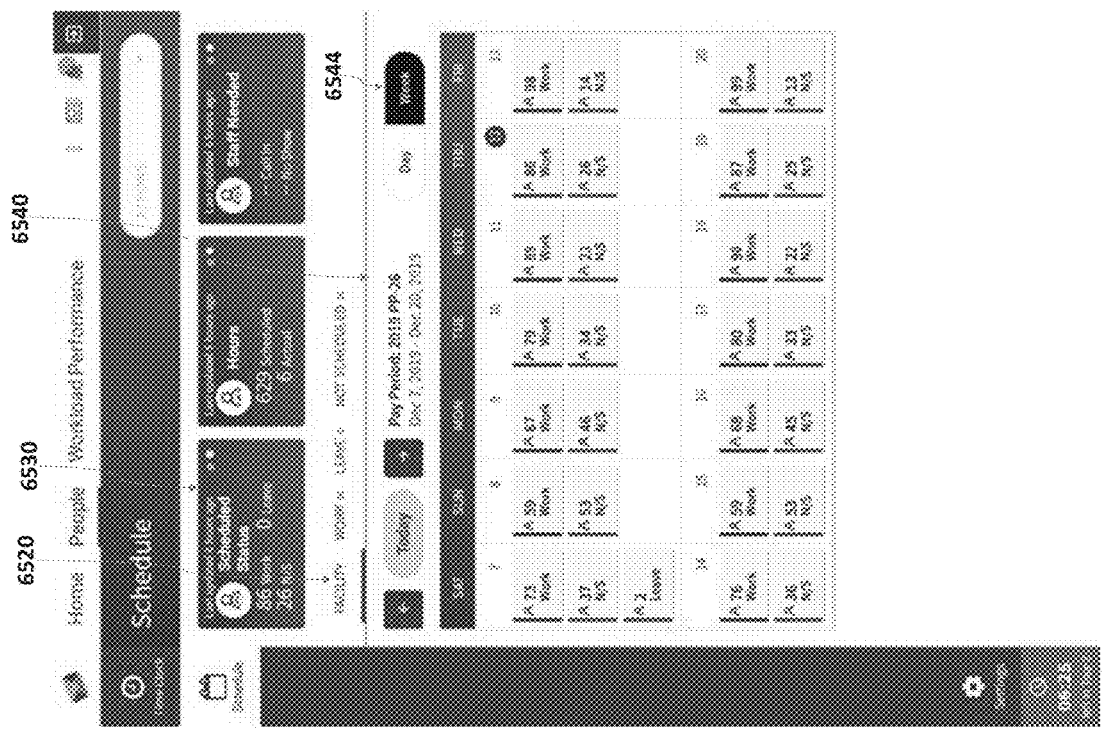
FIG. 65B illustrates another example image data or screenshot displayed in the user interface of the supervisor terminal showing the schedule screen page according to some embodiments.

FIG. 65B illustrates another example image data or screenshot displayed in the user interface 630 of the supervisor terminal 320 showing the schedule screen page according to some embodiments. FIG. 65B shows that the facility sub tab 6520 is selected. The schedule tile section 6530 may provide the supervisor 510 with a detailed view of scheduled status, staff hours, staff call ins, or no shows. The facility section 6540 may allow the supervisor 510 to view the number of employees scheduled and not scheduled by week, when a week tab 6544 is selected.

Figure 65C:
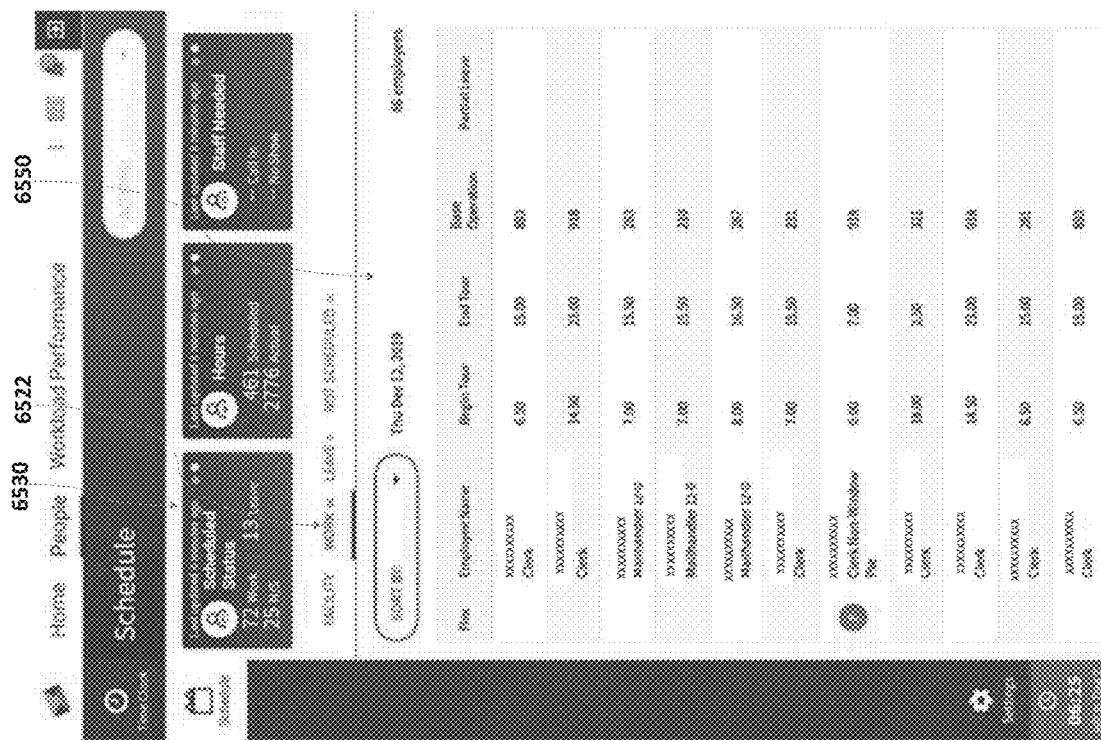
FIG. 65C illustrates another example image data or screenshot displayed in the user interface of the supervisor terminal showing the schedule screen page according to some embodiments

FIG. 65C illustrates another example image data or screenshot displayed in the user interface 630 of the supervisor terminal 320 showing the schedule screen page according to some embodiments. The schedule screen page of FIG. 65C may include the schedule tile section 6530 and a work section 6550. FIG. 65C shows that a work sub tab 6522 is selected. Selecting the work sub tab 6522 may show the employees scheduled to work as shown in FIG. 65C, Similar to FIG. 65B, the schedule tile section 6530 may provide the supervisor 510 with a detailed view of one or more of scheduled status, staff hours, staff call ins, or no shows. The work section 6550 may allow the supervisor 510 to view one or more of the employees scheduled to work with flex employee indication, employee name, begin tour time, end tour time, base operation, or partial leave listed.

Figure 65D:
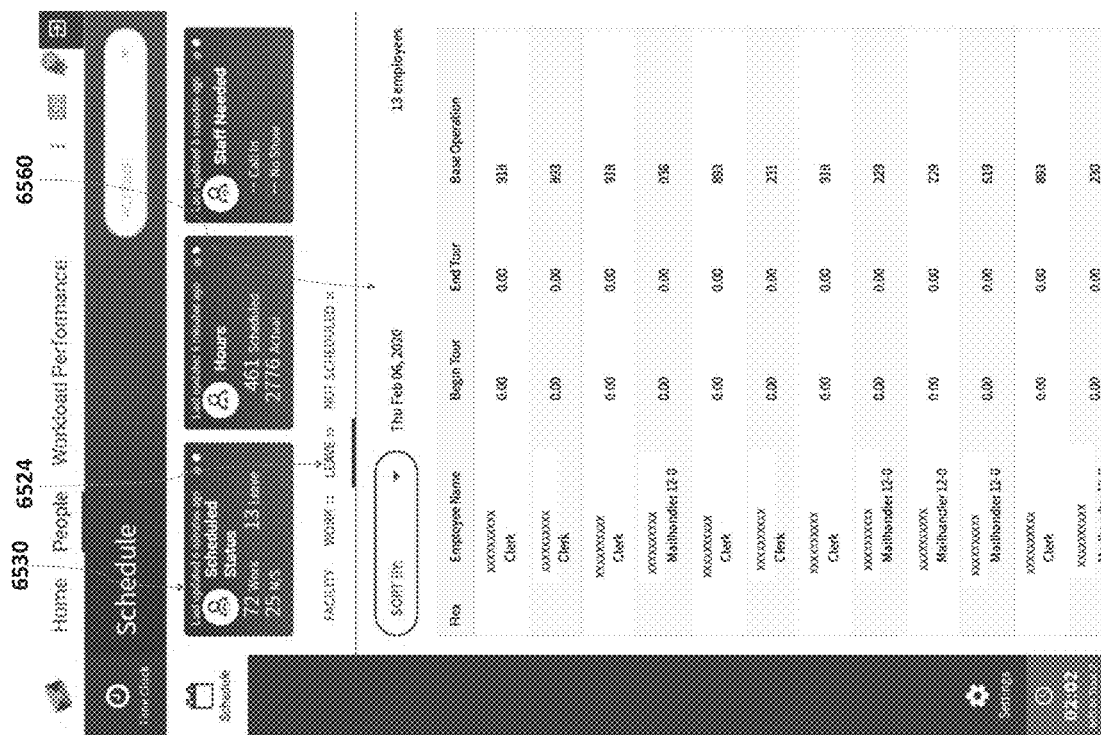
FIG. 65D illustrates another example image data or screenshot displayed in the user interface of the supervisor terminal showing the schedule screen page according to some embodiments.

FIG. 65D illustrates another example image data or screenshot displayed in the user interface 630 of the supervisor terminal 320 showing the schedule screen page according to some embodiments. The schedule screen page of FIG. 65D may include the schedule tile section 6530 and a leave section 6560. FIG. 65D shows that a leave sub tab 6524 is selected. Selecting the leave sub tab 6524 may show the employees scheduled to leave as shown in FIG. 65D. Similar to FIG. 65B, the schedule tile section 6530 may provide the supervisor 510 with a detailed view of one or more of scheduled status, staff hours, staff call ins, or no shows. The leave section 6560 may allow the supervisor 510 to view one or more of the employees scheduled to leave with flex employee indication, employee name, begin tour time, end tour time, base operation, or partial leave listed.

Figure 65E:
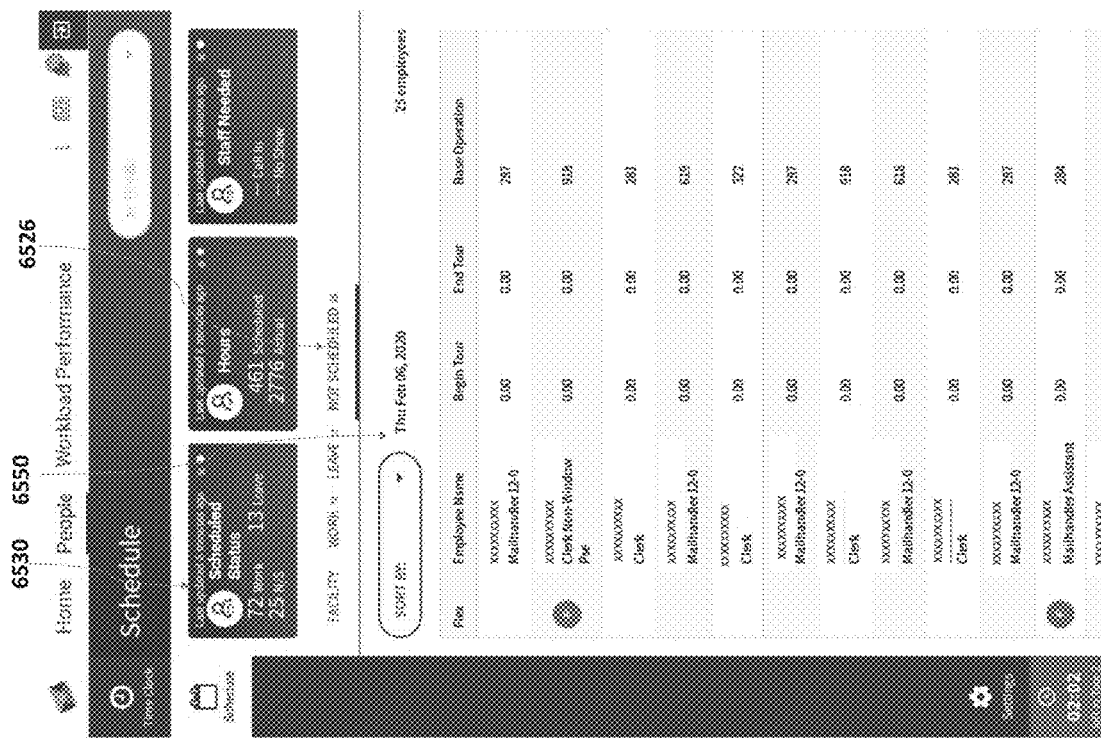
FIG. 65E illustrates another example image data or screenshot displayed in the user interface of the supervisor terminal showing the schedule screen page according to some embodiments.

FIG. 65E illustrates another example image data or screenshot displayed in the user interface 630 of the supervisor terminal 320 showing the schedule screen page according to some embodiments. The schedule screen page of FIG. 65E may include the schedule tile section 6530 and the work section 6540. FIG. 65E shows that a "not scheduled" sub tab 6526 is selected. Selecting the "not scheduled" sub tab 6526 may show the employees not currently scheduled to work as shown in FIG. 65E. Similar to FIG. 65B, the schedule tile section 6530 may provide the supervisor 510 with a detailed view of one or more of scheduled status, staff hours, staff call ins, or no shows. The work section 6540 may allow the supervisor 510 to view one or more of the employees not scheduled to work with flex employee indication, employee name, begin tour time, end tour time, base operation, or partial leave listed.

Figure 66A:
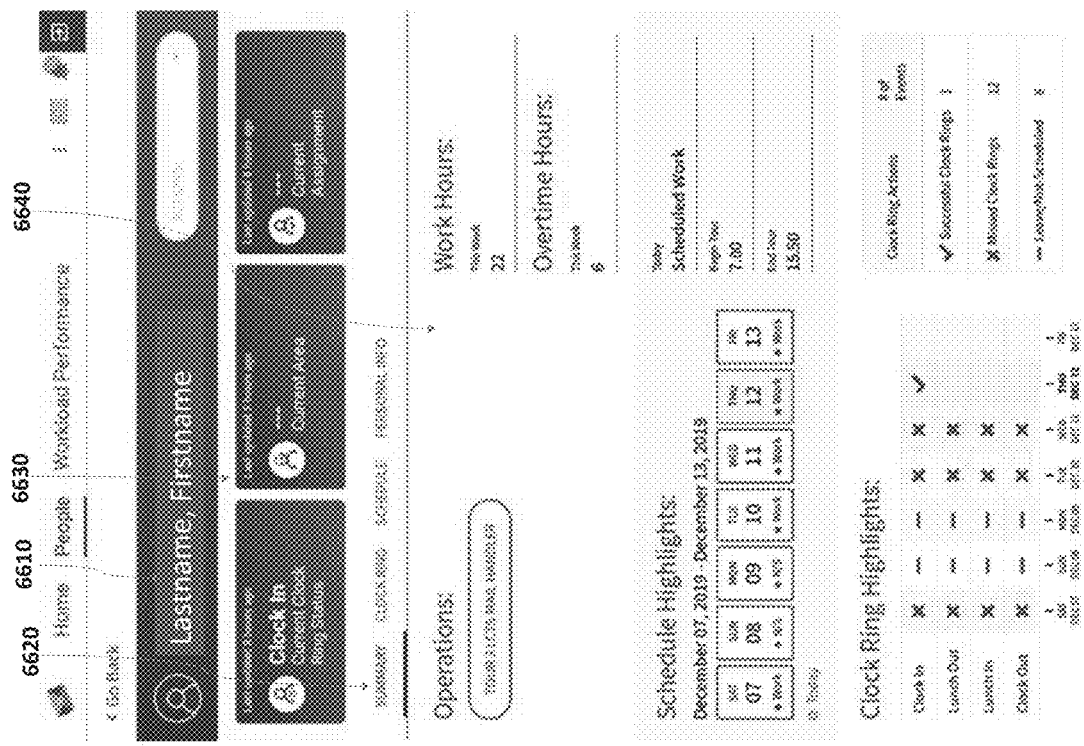
FIG. 66A illustrates an example image data or screenshot displayed in the user interface of the supervisor terminal showing an employee details screen page according to some embodiments.

FIG. 66A illustrates an example image data or screenshot displayed in the user interface 630 of the supervisor terminal 320 showing an employee details screen page according to some embodiments. Selecting an individual employee 6610 on the time clock screen page or the schedule screen page may show an employee details screen as shown in FIG. 66A.

FIG. 66A shows that a summary sub tab 6620 is selected. The employee details screen page of FIG. 66A may include an employee tile section 6630 and a summary section 6640. The employee tile section 6630 may allow the supervisor 510 to view one or more of the clock ring, current area, or current assignment of selected employee. The summary section 6640 may provide the supervisor 510 with an overview of one or more of a selected employee displaying operations, work hours, overtime hours, schedule highlights, or clock ring highlights.

Figure 66B:
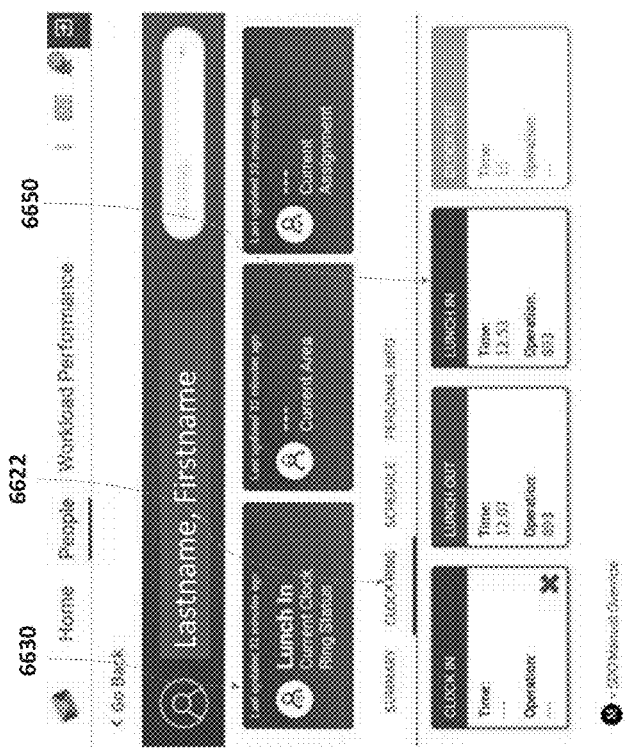
FIG. 66B illustrates another example image data or screenshot displayed in the user interface of the supervisor terminal showing the employee details screen page according to some embodiments.

FIG. 66B illustrates another example image data or screenshot displayed in the user interface 630 of the supervisor terminal 320 showing the employee details screen page according to some embodiments. FIG. 66B shows that a clock ring sub tab 6622 is selected. Selecting the clock ring sub tab 6622 may show a selected employee's clock rings for the day as shown in FIG. 66B. The employee details screen page of FIG. 66B may include the employee tile section 6630 and a clock ring section 6650. Similar to FIG. 66A, the employee tile section 6630 may allow the supervisor 510 to view one or more of the clock ring, current area, or current assignment of selected employee. The clock ring section 6650 may provide the supervisor 510 with an overview of one or more of a selected employee's clock rings displaying clock in, lunch out, or clocked out ring history for the day.

Figure 66C:
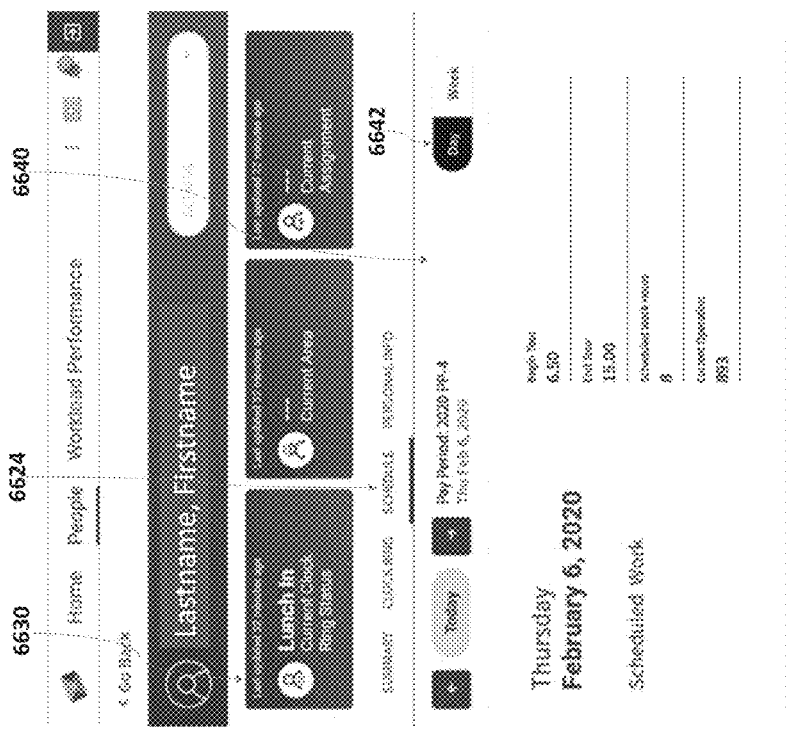
FIGS. 66C and 66D illustrate another example image data or screenshots displayed in the user interface of the supervisor terminal showing the employee details screen page according to some embodiments.

FIG. 66C illustrates another example image data or screenshot displayed in the user interface 630 of the supervisor terminal 320 showing the employee details screen page according to some embodiments. FIG. 66C shows that a schedule sub tab 6624 is selected. Selecting the schedule sub tab 6624 may show a selected employee's schedule for the day as shown in FIG. 66C, The employee details screen page of FIG. 66C may include the employee tile section 6630 and the summary section 6640. Similar to FIG. 66A, the employee tile section 6630 may allow the supervisor 510 to view one or more of the clock ring, current area, or current assignment of selected employee. The summary section 6640 may provide the supervisor 510 with an overview of a selected employee's schedule for the day, when a day tab 6642 is selected.

Figure 66D:
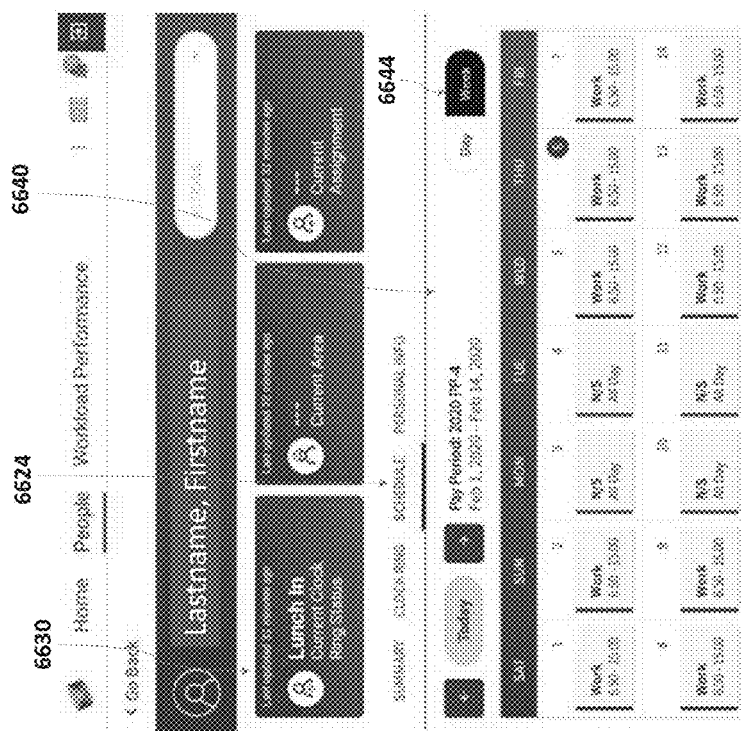

FIG. 66D illustrates another example image data or screenshot displayed in the user interface 630 of the supervisor terminal 320 showing the employee details screen page according to some embodiments. Similar to FIG. 66A, the employee tile section 6630 may allow the supervisor 510 to view one or more of the clock ring, current area, or current assignment of selected employee. The summary section 6640 may provide the supervisor 510 with an overview of a selected employee's weekly schedule for the day, when a week tab 6644 is selected.

Figure 66E:
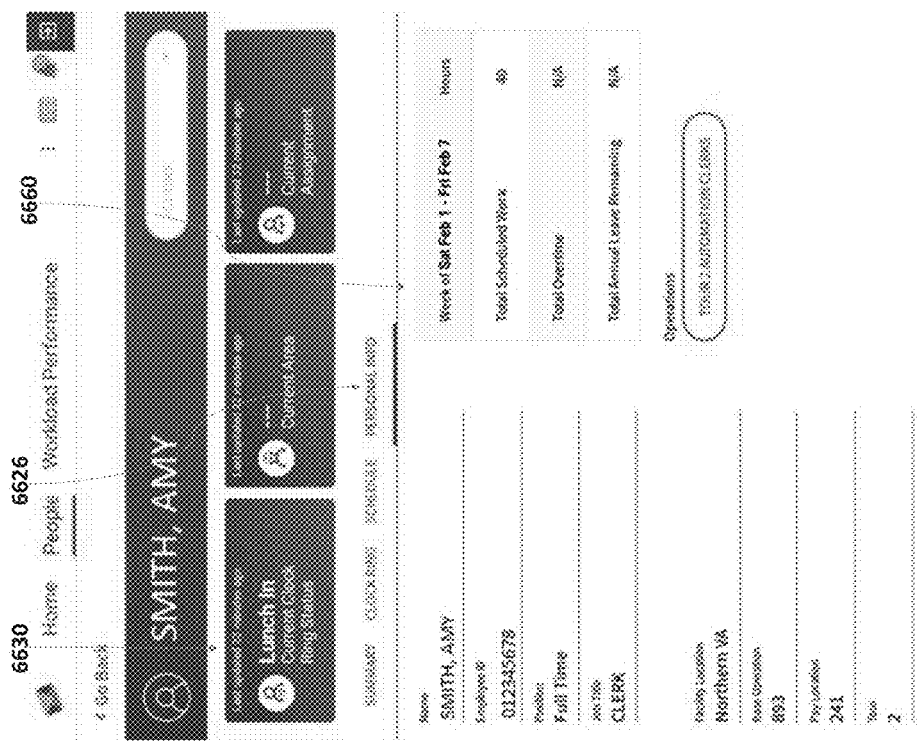
FIG. 66E illustrates another example image data or screenshot displayed in the user interface of the supervisor terminal showing the employee details screen page according to some embodiments.

FIG. 66E illustrates another example image data or screenshot displayed in the user interface 630 of the supervisor terminal 320 showing the employee details screen page according to some embodiments. FIG. 66E shows that a personal info sub tab 6626 is selected. Selecting the personal info sub tab 6626 may show a selected employee's personal information as shown in FIG. 66E. The employee details screen page of FIG. 66E may include the employee tile section 6630 and a personal info section 6660. Similar to FIG. 66A, the employee tile section 6630 may allow the supervisor 510 to view one or more of the clock ring, current area, or current assignment of selected employee. The personal info section 6660 may provide the supervisor 510 with an overview of a selected employee displaying one or more of name, employee ID, position, job title, facility location, base operation, pay location, tour total hours scheduled, total hours overtime, total annual leave remaining, or assigned operation. These are merely examples of a selected employee's personal information, and other personal information may also be provided.

Figure 67A:
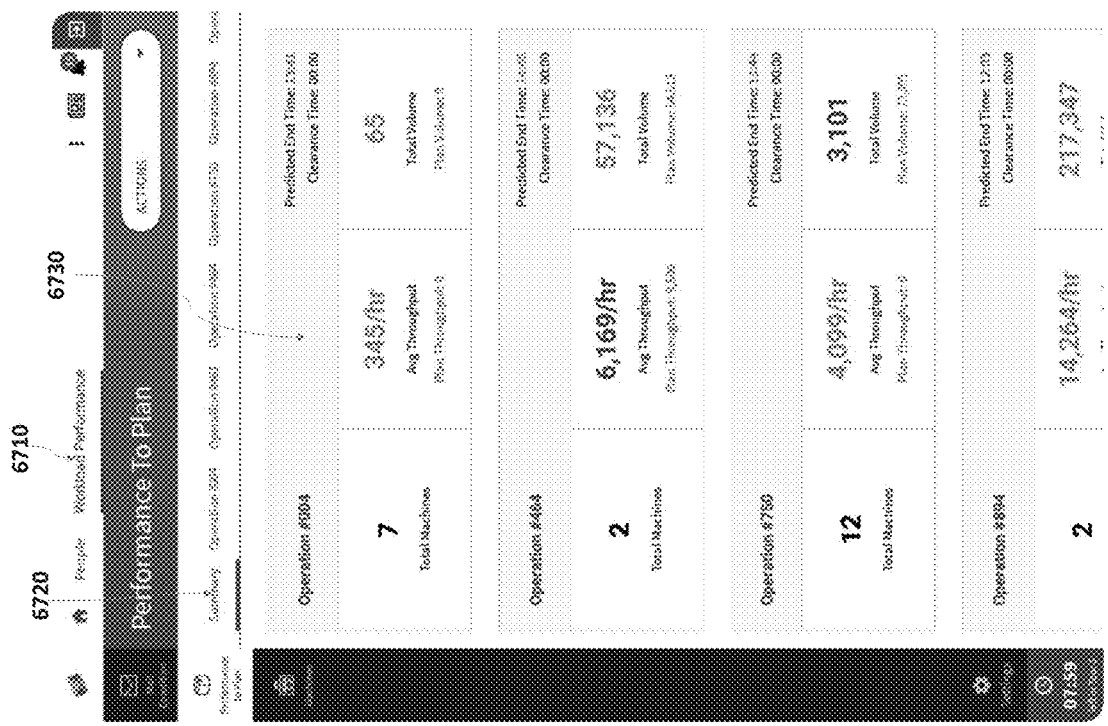
FIG. 67A illustrates an example image data or screenshot displayed in the user interface of the supervisor terminal showing a performance to plan screen page according to some embodiments.

FIG. 67A illustrates an example image data or screenshot displayed in the user interface 630 of the supervisor terminal 320 showing a performance to plan screen page according to some embodiments. The user interface 630 may display the performance to plan screen page when the supervisor 510 taps on a workload performance icon 6710. The performance to plan screen page of FIG. 67A may include a summary section 6720 and an operation section 6730. The summary section 6720 may allow the supervisor 510 to view one or more of the operation-specific status visibility on machine performance, volume throughput, or predictive and clearance times. The operation section 6730 may provide the supervisor 510 with a detailed list of the status of each machine in a single operation.

Figure 67B:
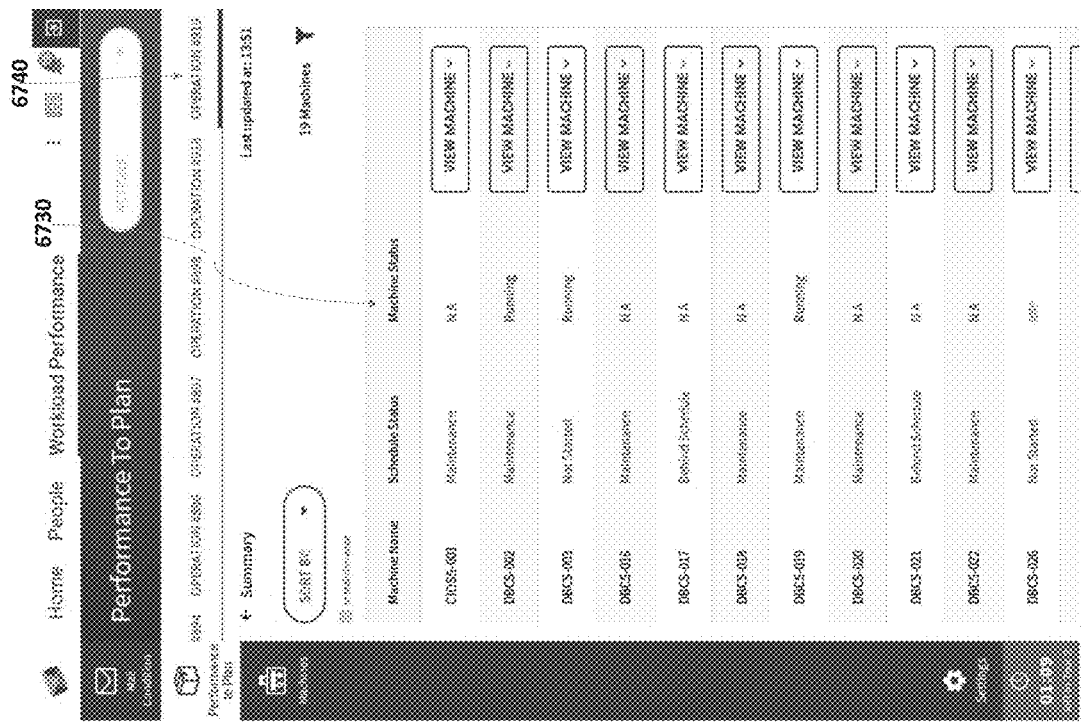
FIG. 67B illustrates another example image data or screenshot displayed in the user interface of the supervisor terminal showing the performance to plan screen page according to some embodiments.

FIG. 67B illustrates another example image data or screenshot displayed in the user interface 630 of the supervisor terminal 320 showing the performance to plan screen page according to some embodiments. FIG. 67B shows that an operation sub tab 6740 is selected. Selecting the operation sub tab 6740 may show detailed information around a selected operation. Similar to FIG. 67A, the operation section 6730 of FIG. 67B may allow the supervisor 510 to view a detailed list of the status of each machine in a single operation.

Figure 68:
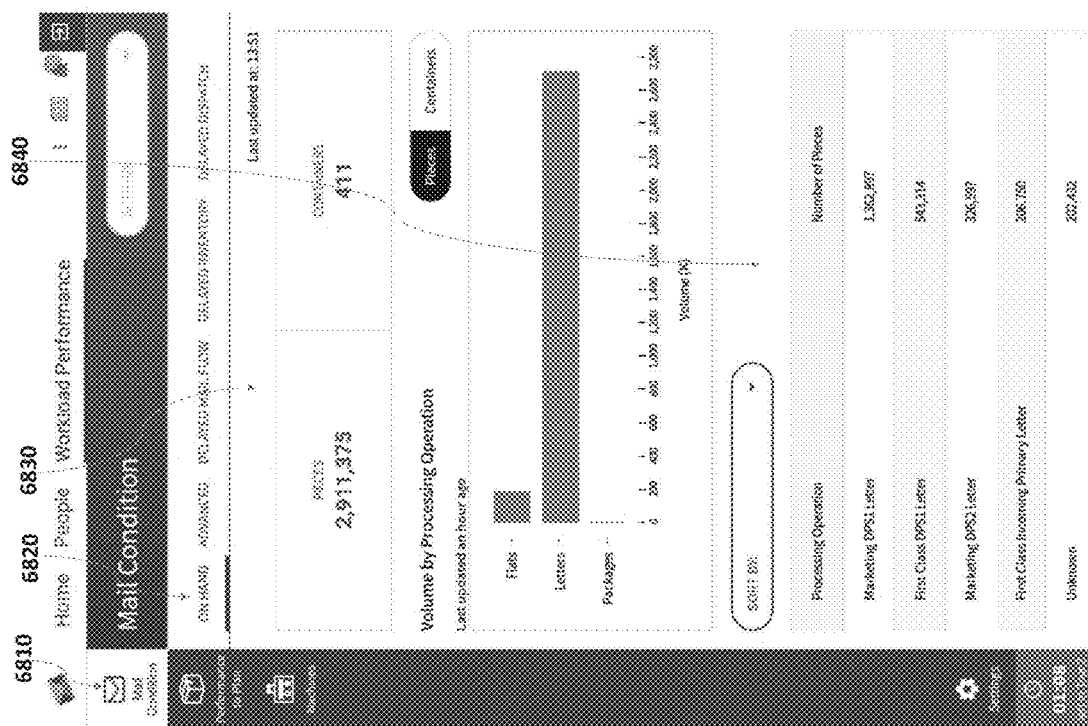
FIG. 68 illustrates an example image data or screenshot displayed in the user interface of the supervisor terminal showing a mail condition screen page according to some embodiments.

FIG. 68 illustrates an example image data or screenshot displayed in the user interface 630 of the supervisor terminal 320 showing a mail condition screen page according to some embodiments. Selecting a mail condition tab 6810 may allow the supervisor 510 to view a detailed breakdown of current mail condition as shown in FIG. 68, FIG. 68 also shows that an on hand sub tab 6820 is selected. Selecting the on hand sub tab 6820 may show an on-hand volume by pieces and containers, or leveraging key data fields from mail condition visualization (MCV). The mail condition page may include a mail type section 6830 and a mail volume section 6840. The mail type section 6830 may allow the supervisor 510 to view an on-hand volume, in pieces or containers, for each individual mail type (letters, flats, and packages, etc.). The mail volume section 6840 may allow the supervisor 510 to view a volume by processing operation, for example, visibility into mail volume for each mail condition category by mail processing operation.

FIG. 69 illustrates an example image data or screenshot displayed in the user interface 630 of the supervisor terminal 320 showing a machine screen page according to some embodiments. Selecting a machine tab 6910 may provide the supervisor 510 to view a detailed breakdown of current machine conditions. The machine page may include a machine summary section 6920 and a machine detail section 6930. The machine summary section 6920 may allow the supervisor 510 to view a list of machines in the operation including, but not limited to, throughput, total pieces ted, or total jams occurring. The machine details section 6930 may allow the supervisor 510 to view one or more of a breakdown of throughput, total pieces fed, or total jams by machine type.

The information shown in FIGS. 36-69 may include example image data or screenshot relating to mail processing activities. However, at least some of the information shown in FIGS. 36-69 may include data relating to customer service activities. Furthermore, the information shown in FIGS. 36-69 includes merely example mail processing data, additional mail processing data may be added, other mail processing data removed, or some customer service data added depending on the specification and requirements. The information shown in FIGS. 36-69 can be selected by the supervisor to display on the terminal, can be auto-populated based on a supervisors area of responsibility as determined on supervisor login, and/or can be dynamically displayed, such as based on the location of the terminals 320-340 within the facilities and along routes.

Variations

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

The technology is operational with numerous other general purpose or special purpose computing system environments or configurations. Examples of well-known computing systems, environments, and/or configurations that may be suitable for use with the development include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®. The system control may be written in any conventional programming language such as and ran under a conventional operating system. For example, any industry standard programming languages for which many commercial compilers can be used to create executable code may be used. The system control may also be written using interpreted languages.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present development.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present development. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

What is claimed is:

1. A supervisor mobile terminal for electronically managing customer service activities associated with a distribution facility, the supervisor mobile terminal comprising:
    a transceiver circuit configured to wirelessly communicate with a server computer a plurality of sets of data relating to the customer service activities, wherein the customer service activities comprise one or more of: managing office, managing street, miscellaneous activities, or navigation bar items associated with the distribution facility;
    a user interface configured to display at least one set of the plurality of sets of data and receive an instruction to modify the at least one set of data the plurality of sets of data; and
    a controller in data communication with the transceiver circuit and the user interface, and configured to:
    control the user interface to modify the at least one set of data based on the instruction;
    control the transceiver circuit to wirelessly communicate the modified data with the server computer such that the at least one set of data stored in the server computer is updated with the modified data;
    control the transceiver circuit to communicate with a carrier mobile terminal of a carrier associated with one or more of the customer service activities;
    access a delivery management system (DMS) processor via a communication network, the DMS processor configured to:
        communicate with the carrier mobile terminal of the carrier,
        monitor a location of the carrier mobile terminal, and
        generate a map showing a current location of the carrier mobile terminal and a distance between the current location of the carrier mobile terminal and an authorized travel path of the carrier;
    receive, from the DMS processor via the communication network, the map showing the current location of the carrier mobile terminal of the carrier relative to the authorized travel path of the carrier for item delivery and the distance between the current location of the carrier mobile terminal and the authorized travel path of the carrier;
    display the received map on the user interface, the map comprising information indicating that the carrier mobile terminal is away from the authorized travel path by the distance;
    display an identification tab of the carrier and a messaging icon on the user interface while the map is displayed on the user interface, the messaging icon configured to enable a supervisor of the carrier to send a message to the carrier from the user interface; and
    in response to the messaging icon on the user interface being selected by the supervisor while the map, the identification tab, and the messaging icon are displayed on the user interface, send an electronic message to the carrier mobile terminal, the electronic message comprising a request that the carrier return to the authorized travel path.

2. The supervisor mobile terminal of claim 1, wherein the controller is configured to control the transceiver circuit to wirelessly access the server computer so as to update the at least one set of data with the modified data.

3. The supervisor mobile terminal of claim 1, wherein the controller is configured to control the transceiver circuit to wirelessly transmit the modified data to the server computer so as to update the at least one set of data with the modified data.

4. The supervisor mobile terminal of claim 1, wherein the managing office comprises one or more of: reviewing checklists, capturing manual mail volume, or completing morning engagement tasks, the controller further configured to control the user interface to display data relating to carrier performance and route completion status.

5. The supervisor mobile terminal of claim 1, wherein the managing street comprises one or more of: monitoring carriers, reviewing exception events, or reporting accidents, the controller further configured to control the user interface to display data relating to delivery conditions on streets where the carrier is located.

6. The supervisor mobile terminal of claim 1, wherein the distribution facility is a customer service facility, and wherein the supervisor mobile terminal is configured to be operated by a supervisor working in the customer service facility.

7. The supervisor mobile terminal of claim 1, wherein the customer service activities comprise at least one abnormal item delivery event relating to a carrier working for the distribution facility, the controller further configured to:
    control the user interface to display at least one set of the plurality of sets of data;
    determine whether the at least one set of the plurality of sets of data includes or relates to the at least one abnormal item delivery event; and
    in response to determining that the at least one set of the plurality of sets of data includes or relates to the at least one abnormal item delivery event, control the transceiver circuit to wirelessly send a message to the carrier mobile terminal so as to address the at least one abnormal item delivery event.

8. The supervisor mobile terminal of claim 7, wherein the abnormal item delivery event comprises one or more of: late item delivery, an item delivery expected to be late, a heavy traffic, a car accident near a carrier's delivery area, or a delivery route deviation.

9. The supervisor mobile terminal of claim 7, further comprising a memory configured to store types of abnormal item delivery events, wherein the controller is configured to determine whether the at least one set of the plurality of sets of data includes or relates to the abnormal item delivery event based on the types of abnormal item delivery events stored in the memory.

10. The supervisor mobile terminal of claim 7, wherein the transceiver circuit is configured to receive information regarding the abnormal item delivery event from the server computer, and wherein the controller is configured to determine whether the at least one set of the plurality of sets of data includes or relates to the abnormal item delivery event based on the information received from the server computer.

11. The supervisor mobile terminal of claim 10, wherein the controller is configured to control the transceiver circuit to automatically send the message to the carrier mobile terminal in response to determining that the at least one set of the plurality of sets of data includes or relates to the at least one abnormal delivery event.

12. A method of electronically managing, at a supervisor mobile terminal, customer service activities associated with a distribution facility, the method comprising:
  wirelessly communicating, via a transceiver circuit of the supervisor mobile terminal, with a server computer, a plurality of sets of data relating to the customer service activities, wherein the customer service activities comprise one or more of: managing office, managing street, miscellaneous activities, or navigation bar items associated with the distribution facility;
  displaying, at a user interface of the supervisor mobile terminal, at least one set of the plurality of sets of data;
  receiving, at the user interface, an instruction to modify the at least one set of data;
  controlling the user interface to modify the at least one set of data based on the instruction;
  wirelessly communicating the modified data with the server computer such that the at least one set of data stored in the server computer is updated with the modified data;
  controlling the transceiver circuit to communicate with a carrier mobile terminal of a carrier associated with one or more of the customer service activities;
  accessing a delivery management system (DMS) processor via a communication network, the DMS processor configured to:
    communicate with the carrier mobile terminal of the carrier,
    monitor a location of the carrier mobile terminal, and
    generate a map showing a current location of the carrier mobile terminal and a distance between the current location of the carrier mobile terminal and an authorized travel path of the carrier;
  receiving, from the DMS processor via the communication network, the map showing the current location of the carrier mobile terminal of the carrier relative to the authorized travel path of the carrier for item delivery and the distance between the current location of the carrier mobile terminal and the authorized travel path of the carrier;
  displaying the received map on the user interface, the map comprising information indicating that the carrier mobile terminal is away from the authorized travel path by the distance;
  displaying an identification tab of the carrier and a messaging icon on the user interface while the map is displayed on the user interface, the messaging icon configured to enable a supervisor of the carrier to send a message to the carrier from the user interface; and
  in response to the messaging icon on the user interface being selected by the supervisor while the map, the identification tab, and the messaging icon are is-displayed on the user interface, sending an electronic message to the carrier mobile terminal, the electronic message comprising a request that the carrier return to the authorized travel path.

13. The method of claim 12, wherein the managing office comprises one or more of: reviewing checklists, capturing manual mail volume, or completing morning engagement tasks, the method further comprising controlling the user interface to display data relating to carrier performance and route completion status.

14. A server computer for electronically managing customer service activities associated with a distribution facility, the server computer comprising:
  a transceiver circuit configured to wirelessly communicate, with a supervisor mobile terminal, a plurality of sets of data relating to the customer service activities, wherein the customer service activities comprise one or more of: managing office, managing street, miscellaneous activities, or navigation bar items associated with the distribution facility;
  a memory configured to store the plurality of sets of data; and
  a controller in data communication with the transceiver circuit and the memory, and configured to:
    control the transceiver circuit to wirelessly receive a modified version of at least one set of the plurality of sets of data from the supervisor mobile terminal;
    control the memory to update the at least one set of data with the modified version of the data; and
    control the transceiver circuit to communicate with a carrier mobile terminal of a carrier associated with one or more of the customer service activities,
  the controller further configured to cause the supervisor mobile terminal to:
    access a delivery management system (DMS) processor via a communication network, the DMS processor configured to:
      communicate with the carrier mobile terminal of the carrier,
      monitor a location of the carrier mobile terminal, and
      generate a map showing a current location of the carrier mobile terminal and a distance between the current location of the carrier mobile terminal and an authorized travel path of the carrier;
    receive, from the DMS processor via the communication network, the map showing the current location of the carrier mobile terminal of the carrier relative to the authorized travel path of the carrier for item delivery and the distance between the current location of the carrier mobile terminal and the authorized travel path of the carrier;
    display the received map on the user interface, the map comprising information indicating that the carrier mobile terminal is away from the authorized travel path by the distance;
    display an identification tab of the carrier and a messaging icon on the user interface while the map is displayed on the user interface, the messaging icon configured to enable a supervisor of the carrier to send a message to the carrier from the user interface; and in response to the messaging icon on the user interface being selected by the supervisor while the map, the identification tab, and the messaging icon are is-displayed on the user interface, send an electronic message to the carrier mobile terminal, the electronic message comprising a request that the carrier return to the authorized travel path.

15. The server computer of claim 14, wherein the controller is further configured to selectively send the updated data to the carrier mobile terminal.

16. The server computer of claim 15, wherein the controller is further configured to wirelessly send the updated data to the carrier mobile terminal when the updated data satisfies a predetermined criteria.

17. The server computer of claim 16, wherein the controller is further configured to determine that the updated data satisfies the predetermined criteria when the updated data is relevant to i) the carrier mobile terminal or ii) responsibilities or performance of the carrier.

18. The server computer of claim 14, further comprising one or more of:
   the DMS processor configured to identify locations of carriers real-time and support carriers on their delivery routes;
   a delivery operation information system (DOIS) processor configured to manage delivery unit operations including daily office work and route adjustments;
   a GEO-delivery processor configured to create virtual geographic zones guiding delivery personnel to stay on schedule and on their routes;
   an overtime (OT) admin processor configured to manage overtimes of carriers;
   a time and attendance collection system (TACS) processor configured to maintain clock rings and employee information; and
   a regional intelligent mail server (RIMS) processor configured to provide local intelligent mail server (LIM) capability to delivery units.

19. The supervisor mobile terminal of claim 1, further comprising a proximity sensor configured to sense a type of mail facility equipment, wherein the controller is configured to control the user interface to display data relevant to the sensed facility equipment.

20. The supervisor mobile terminal of claim 1, wherein, in response to the supervisor terminal approaching a delivery truck in a unit facility, the proximity sensor is configured to sense the delivery truck and send sensed information to the controller, wherein the controller is configured to control the user interface to display data relating to the sensed delivery truck, and wherein the data relating to the sensed delivery truck comprises one or more of the number of incoming delivery trucks on a given day, or leaving and arriving time of delivery trucks.

21. The supervisor mobile terminal of claim 1, wherein the controller is configured to control the user interface to display text indicating that the carrier mobile terminal is away by the distance from the authorized travel path, and wherein the distance is at least 1000 feet.

22. The supervisor mobile terminal of claim 1, wherein the controller is further configured to directly send the electronic message to the carrier mobile terminal using the messaging icon without opening another email or messenger application.

* * * * *